United States Patent
Tokuchi

(10) Patent No.: US 11,106,338 B2
(45) Date of Patent: Aug. 31, 2021

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/372,422

(22) Filed: Apr. 2, 2019

(65) Prior Publication Data

US 2020/0117326 A1 Apr. 16, 2020

(30) Foreign Application Priority Data

Oct. 15, 2018 (JP) .............................. JP2018-194683

(51) Int. Cl.
*G06F 3/0484* (2013.01)
*G06Q 10/02* (2012.01)
*G06Q 30/06* (2012.01)

(52) U.S. Cl.
CPC ........... *G06F 3/0484* (2013.01); *G06Q 10/02* (2013.01); *G06Q 30/0641* (2013.01)

(58) Field of Classification Search
CPC ... G06F 3/0484; G06Q 10/02; G06Q 30/0641
See application file for complete search history.

(56) References Cited

U.S. PATENT DOCUMENTS

| | | | | |
|---|---|---|---|---|
| 8,392,852 | B2* | 3/2013 | Tokashiki | G06F 3/0481 |
| | | | | 715/839 |
| 8,694,501 | B1* | 4/2014 | Trandal | G06Q 10/087 |
| | | | | 707/736 |
| 8,869,044 | B2* | 10/2014 | Silbey | G06Q 50/01 |
| | | | | 715/753 |
| 9,401,095 | B2* | 7/2016 | Kubota | G09B 5/06 |
| 9,721,233 | B2* | 8/2017 | Norton | G06Q 10/06314 |
| 9,741,020 | B2* | 8/2017 | Min | G06Q 10/06314 |
| 9,766,079 | B1* | 9/2017 | Poel | G01S 5/0242 |
| 9,852,388 | B1* | 12/2017 | Swieter | H04Q 9/00 |
| 9,955,318 | B1* | 4/2018 | Scheper | G06Q 10/063114 |
| 10,121,113 | B1* | 11/2018 | Swieter | G06Q 10/06313 |
| 10,161,752 | B1* | 12/2018 | Poel | G01S 5/14 |
| 10,225,707 | B1* | 3/2019 | Scheper | G06Q 10/063114 |
| 10,311,383 | B2* | 6/2019 | Holmes | G06Q 10/06314 |
| 10,664,772 | B1* | 5/2020 | Poel | G06F 3/04817 |
| 10,970,662 | B2* | 4/2021 | Swieter | H04Q 9/00 |
| 2002/0032546 | A1* | 3/2002 | Imamura | G06F 30/13 |
| | | | | 703/1 |

(Continued)

FOREIGN PATENT DOCUMENTS

| | | |
|---|---|---|
| JP | 2001195481 | 7/2001 |
| JP | 2004086582 | 3/2004 |

(Continued)

*Primary Examiner* — Shen Shiau
(74) *Attorney, Agent, or Firm* — JCIPRNET

(57) ABSTRACT

An information processing apparatus includes a control section that controls a change of a display of a first image linked to a first reservation target such that the display of the first image is changed by a second image linked to a second reservation target on a reservation screen.

12 Claims, 58 Drawing Sheets

(56) References Cited

U.S. PATENT DOCUMENTS

| | | | |
|---|---|---|---|
| 2004/0267623 A1* | 12/2004 | Vivadelli | G06Q 10/06 379/212.01 |
| 2005/0022134 A1* | 1/2005 | Tokashiki | G06F 3/0489 715/764 |
| 2006/0015376 A1* | 1/2006 | Sattler | G06Q 10/06 705/5 |
| 2007/0162315 A1* | 7/2007 | Hodges | G06Q 10/0631 705/7.12 |
| 2007/0283285 A1* | 12/2007 | Buchmann | G06F 9/451 715/764 |
| 2008/0109289 A1* | 5/2008 | Vivadelli | G06Q 10/06 705/314 |
| 2013/0117059 A1* | 5/2013 | Norton | G06Q 10/06314 705/7.18 |
| 2013/0290044 A1* | 10/2013 | Webb | G06Q 30/02 705/5 |
| 2014/0022331 A1* | 1/2014 | Bansal | H04N 7/142 348/14.07 |
| 2014/0122346 A1* | 5/2014 | O'Brien | G06Q 30/0645 705/307 |
| 2014/0236643 A1* | 8/2014 | Comfort | G06F 8/38 705/5 |
| 2014/0278496 A1* | 9/2014 | Spencer | G06F 19/00 705/2 |
| 2014/0278594 A1* | 9/2014 | Vivadelli | G06Q 10/02 705/5 |
| 2015/0310541 A1* | 10/2015 | Pamir | H04L 63/08 705/14.66 |
| 2017/0026806 A1* | 1/2017 | Jampani | G01S 5/02 |
| 2017/0177747 A1* | 6/2017 | Atherton | G06F 30/13 |
| 2017/0193406 A1* | 7/2017 | Berman | G06Q 10/1095 |
| 2017/0357915 A1* | 12/2017 | Holmes | G06F 3/04883 |
| 2017/0357917 A1* | 12/2017 | Holmes | G06Q 10/06314 |
| 2018/0189687 A1* | 7/2018 | Oikawa | G06F 3/0484 |
| 2018/0240274 A1* | 8/2018 | Cronin | G06F 3/011 |
| 2018/0267594 A1* | 9/2018 | Meier | G06Q 10/08 |
| 2018/0308187 A1* | 10/2018 | Rotem | G06T 19/003 |
| 2019/0034851 A1* | 1/2019 | Swieter | H04Q 9/00 |
| 2019/0128046 A1* | 5/2019 | Tokuchi | G05B 15/02 |
| 2019/0130314 A1* | 5/2019 | Baba | G06Q 10/1093 |
| 2019/0130315 A1* | 5/2019 | Tokuchi | G10L 25/18 |
| 2019/0130316 A1* | 5/2019 | Tokuchi | G06Q 10/02 |
| 2019/0130467 A1* | 5/2019 | Tokuchi | G06F 16/24578 |
| 2019/0243809 A1* | 8/2019 | Shtaygrud | G06F 9/451 |
| 2019/0310761 A1* | 10/2019 | Agarawala | G06F 3/04815 |
| 2019/0334907 A1* | 10/2019 | Rodden | G06Q 10/063116 |
| 2020/0011673 A1* | 1/2020 | Poel | G01S 5/0242 |
| 2020/0226501 A1* | 7/2020 | Holmes | G06F 3/04883 |

FOREIGN PATENT DOCUMENTS

| | | |
|---|---|---|
| JP | 2005196643 | 7/2005 |
| JP | 2008027073 | 2/2008 |

\* cited by examiner

FIG. 37
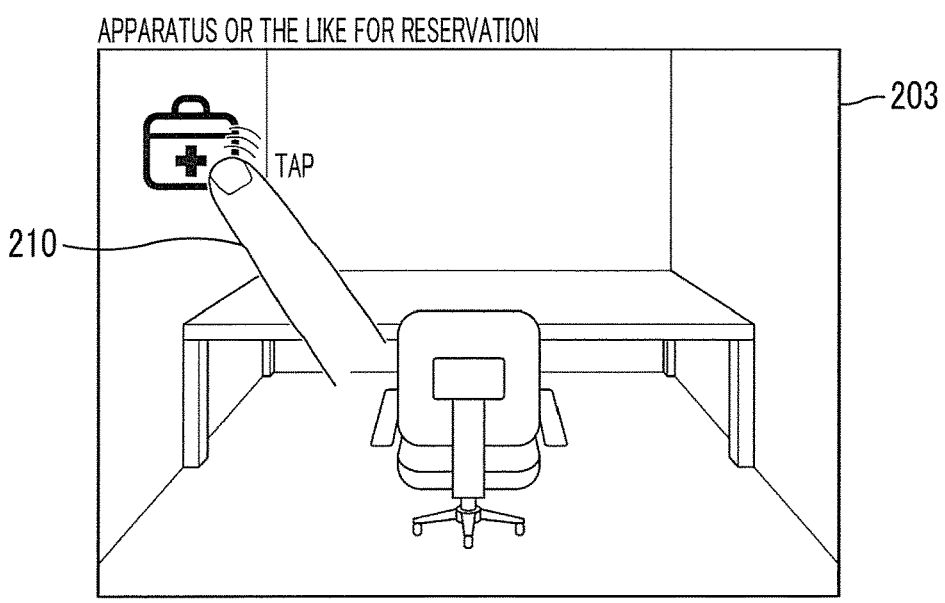
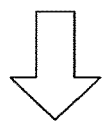
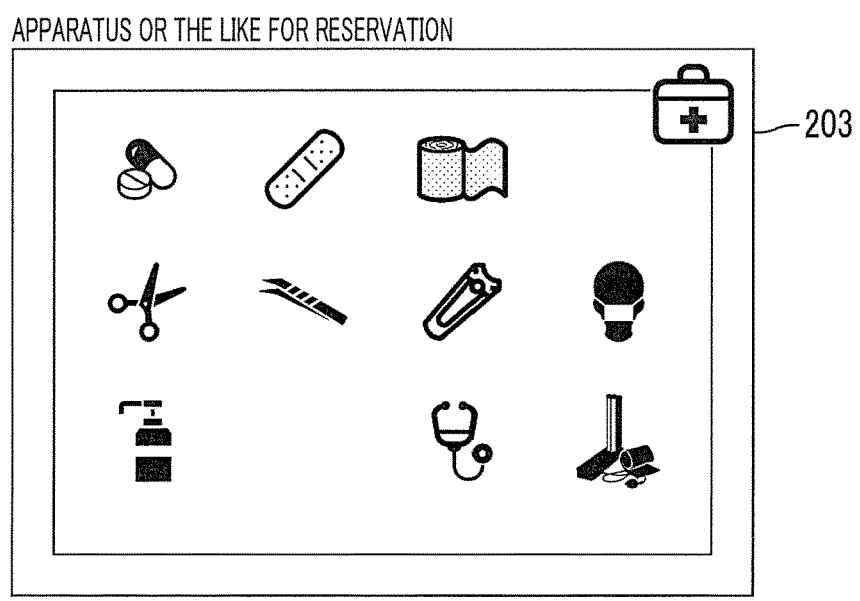

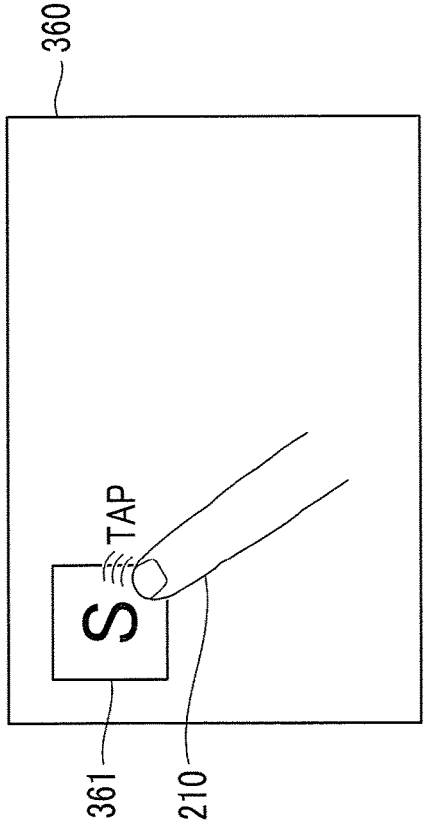
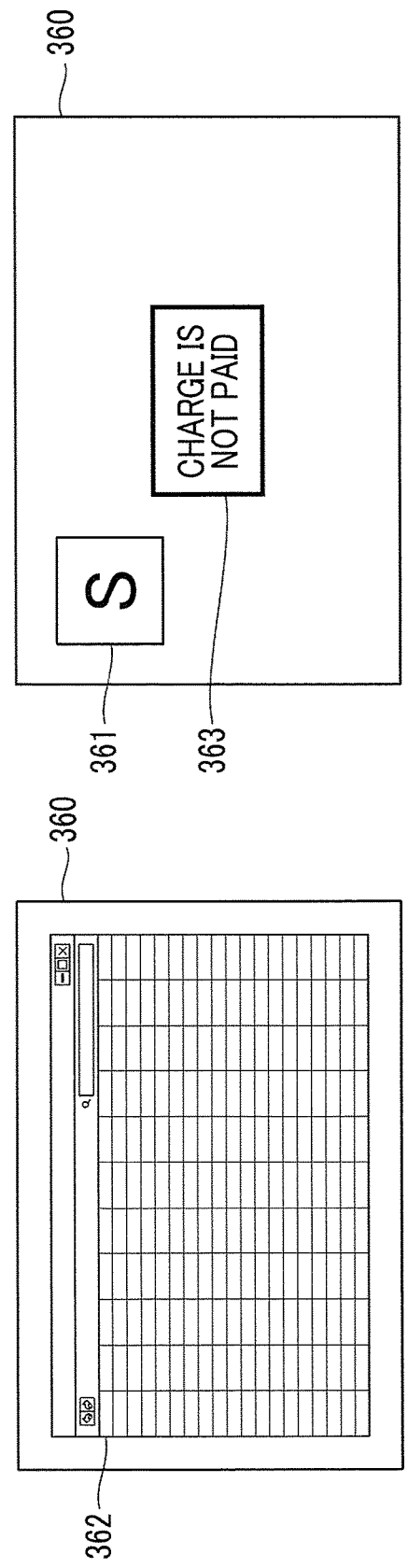
FIG. 48

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-194683 filed Oct. 15, 2018.

BACKGROUND

(i) Technical Field

The present invention relates to an information processing apparatus and a non-transitory computer readable medium storing a program.

(ii) Related Art

A system that manages multiple rented booths as a group through a communication network and manages authentication of a user, entering and exiting, and the like is suggested.

JP2004-086582A is an example of the related art.

SUMMARY

A reservation accompanied by a reservation for a space may be made in only a separate region on a separate screen. In this case, it is not easy to find a correspondence between the space and the accompanying reservation.

Aspects of non-limiting embodiments of the present disclosure relate to an information processing apparatus and a non-transitory computer readable medium storing an program for easy recognition of a correspondence between a first reservation target and a second reservation target accompanied by the first reservation target, compared to making a reservation for the second reservation target accompanied by the first reservation target in only a separate region on a separate screen.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a control section that controls a change of a display of a first image linked to a first reservation target such that the display of the first image is changed by a second image linked to a second reservation target on a reservation screen.

BRIEF DESCRIPTION OF THE DRAWINGS

Exemplary embodiment(s) of the present invention will be described in detail based on the following figures, wherein:

FIG. 23A illustrates a change of a display in a case where an icon of drawing software is dragged, FIG. 23B illustrates a change of the display in a case where an icon of word processor software is dragged, and FIG. 23C illustrates a change of the display in a case where an icon of office software 1 is dragged;

FIG. 25A illustrates a change of the display in a case where an icon of a scan function is dragged, FIG. 25B illustrates a change of the display in a case where an icon of a copy function is dragged, and FIG. 25C illustrates a change of the display in a case where an icon of a function corresponding to both of the scan function and the copy function is dragged;

FIG. 37 is a diagram describing an example in which the content is expanded and displayed as a list on condition that the reservation holder taps an icon with a finger;

FIG. 48 is a diagram describing an example of control enabling the use of reserved software on condition that payment of the charge for use is checked;

DETAILED DESCRIPTION

Hereinafter, exemplary embodiments of the present invention will be described with reference to the drawings.

Exemplary Embodiment 1

Overall Configuration of Reservation System

An environment in which various information can be accessed outside an office is provided along with an improvement in communication speed and a decrease in size of a communication terminal. Conversations or information related to business are highly confidential. Thus, a quiet and secure environment is required.

In the present exemplary embodiment, a reservation system for a space satisfying the requirement as a reservation target will be described. The space described in the present exemplary embodiment is not limited for business use and can be used by individuals.

Figure 1:
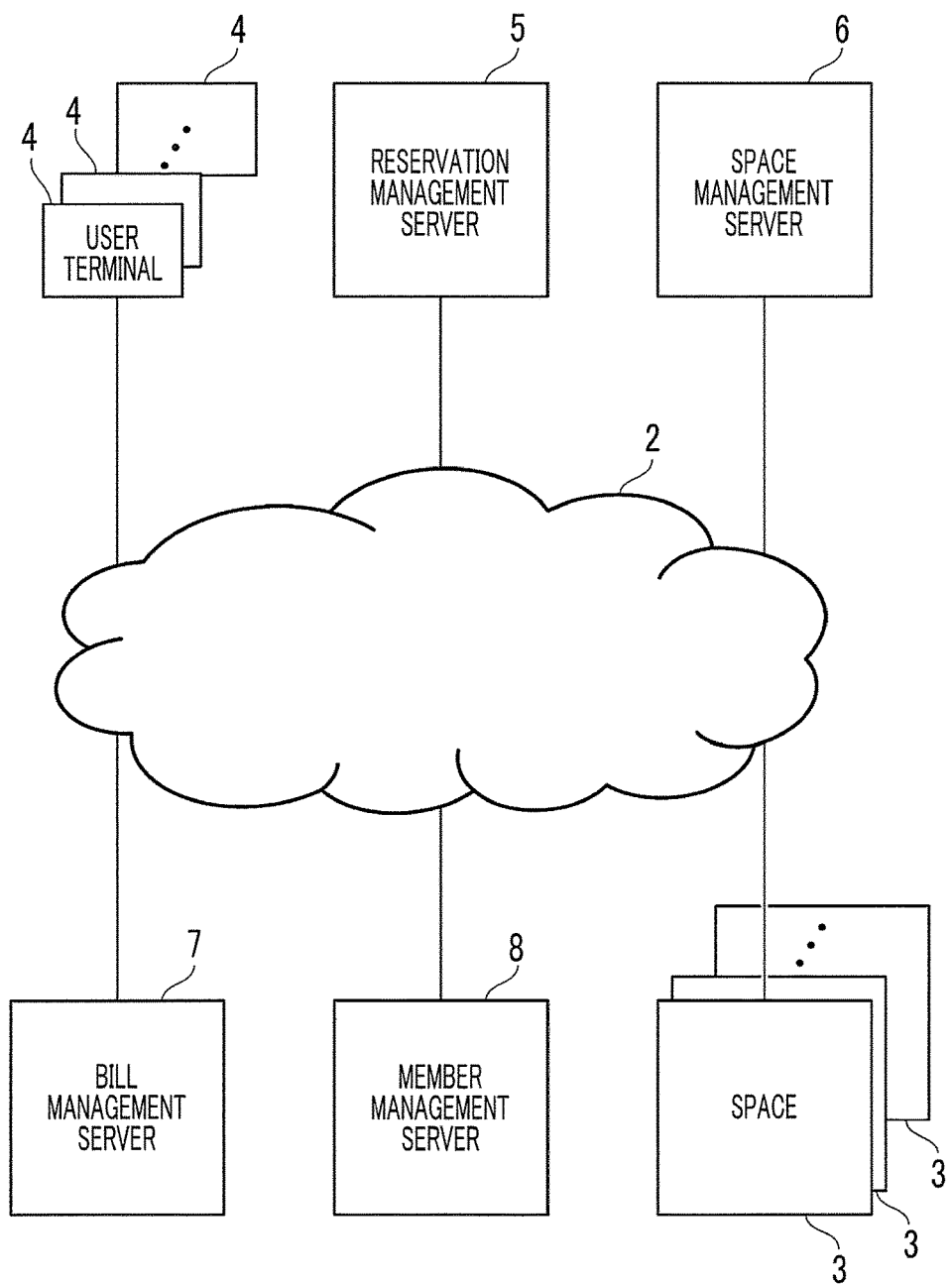
FIG. 1 is a diagram schematically illustrating an example of an overall configuration of a reservation system.

FIG. 1 is a diagram schematically illustrating an example of an overall configuration of a reservation system 1.

As illustrated in FIG. 1, the reservation system 1 is configured with various terminals connected to a cloud network 2.

As examples of the terminals constituting the reservation system 1, FIG. 1 illustrates a space 3 as the reservation target, a user terminal 4 operated by a user, a reservation management server 5 managing a reservation for the space 3, a space management server 6 managing the status of use of the space 3, a bill management server 7 managing a bill for the user, and a member management server 8 managing information related to the user who can use the space 3. Any of those terminals is one example of an information processing apparatus.

The space 3 in the present exemplary embodiment can be used 24 hours a day and 365 days a year except for a time for use for maintenance or the like.

While one server is prepared for each purpose or function in FIG. 1, a plurality of servers may be prepared for each purpose. One server may be responsible for a plurality of purposes or functions.

A provider providing a reservation service for the space 3 may be a single provider or a plurality of providers. For example, different providers may be responsible for management of the reservation, management of entering and exiting, the status of use inside a room, and the like, management related to billing of a charge for use to the user, and management of a member registered as the user. In addition, management for one purpose or function may be provided in cooperation between a plurality of providers.

In addition, a plurality of servers may be prepared for one purpose or function. In a case where a single provider prepares a plurality of servers for one purpose or function or prepares a plurality of servers corresponding to a plurality of purposes or functions, the plurality of servers may be connected through an intranet.

In addition, the space 3 may be provided by not only a single provider but also by a plurality of providers.

That is, the reservation system 1 may be implemented as a collection of services provided by a plurality of providers.

In the present exemplary embodiment, an electronic key is used for locking and unlocking the space 3. The electronic key is stored in the portable type user terminal 4 or an integrated circuit (IC) card, not illustrated, supporting short-range wireless communication.

In the present exemplary embodiment, a smartphone is assumed as the portable type user terminal 4. The portable type user terminal 4 may be a so-called wearable terminal or may be a game terminal in a case where the game terminal has an Internet communication function.

In a case where the user terminal 4 is used as the electronic key, the electronic key is transmitted to the user terminal 4 from the reservation management server 5 after the reservation is confirmed. In a case where the IC card is used as the electronic key, the IC card on which the electronic key is recorded is distributed to the user from the reservation management server 5 after the reservation is confirmed.

In the case of the electronic key, a time for enabling locking or unlocking can be freely determined. In addition, the electronic key required for using one space 3 is easily issued in plural number.

The space 3 may be locked or unlocked by preparing a physical key for each reserved time in plural numbers. In addition, authentication of the user may be used instead of the key, or authentication of the user may be used as a means for supplementing the electronic key or the physical key. Face authentication, fingerprint authentication, vein authentication, authentication based on text input, authentication based on gesture, or the like and other well-known authentication technologies can be applied for the authentication of the user.

For example, the reservation management server 5 manages various information related to the reservation. The reservation management server 5 in the present exemplary embodiment receives a reservation for the space 3 24 hours a day and 365 days a year except for a time secured for maintenance or the like. In addition, the reservation management server 5 receives a reservation for an object or a service associated with the space 3. While details will be described below, an object or a service that can be rented or permitted for use is assumed. In addition, an object or a service that wears during use is included in a target.

The reservation management server 5 may issue the electronic key or execute an authentication process for the user terminal 4 as required. The authentication process may be performed by the space management server 6.

For example, the space management server 6 manages entering and exiting of the individual space 3 by the user and the status of use of the individual space 3. In addition, the space management server 6 communicates with an authentication unit, not illustrated, arranged in the space 3 and manages, for example, whether or not to permit entrance by the user. In the authentication, the space management server 6 communicates with the reservation management server 5 and the like.

In addition, the space management server 6 collects information from various apparatuses arranged inside or outside the space 3. Various apparatuses include a motion sensor, a monitoring camera, a temperature sensor, a humidity sensor, an illuminance sensor, and the like.

In addition, the space management server 6 controls operations of various apparatuses arranged in the space 3. In the present exemplary embodiment, the control of the apparatus related to the reservation is executed by the reservation management server 5. While the space management server 6 is arranged on the cloud network 2 in the example in FIG. 1, a part or all of the function of the space management server 6 may be provided by a control apparatus in the space 3.

The bill management server 7 has a function of issuing a bill for each member based on reservation information, information related to the user, information related to entering and exiting, and the like. The member may be either a natural person or a legal person. The bill management server 7 obtains the reservation information from the reservation management server 5, obtains information related to entering and exiting from the space management server 6, and obtains member information from the member management server 8.

The member management server 8 manages information related to the registered member and information related to the user. In a case where the member is a natural person, the member matches the user. In a case where the member is a legal person, individual users are registered and managed for each member. In the present exemplary embodiment, schedules of individual members are also registered in the member management server 8.

Exterior Configuration of Space

Figure 2:
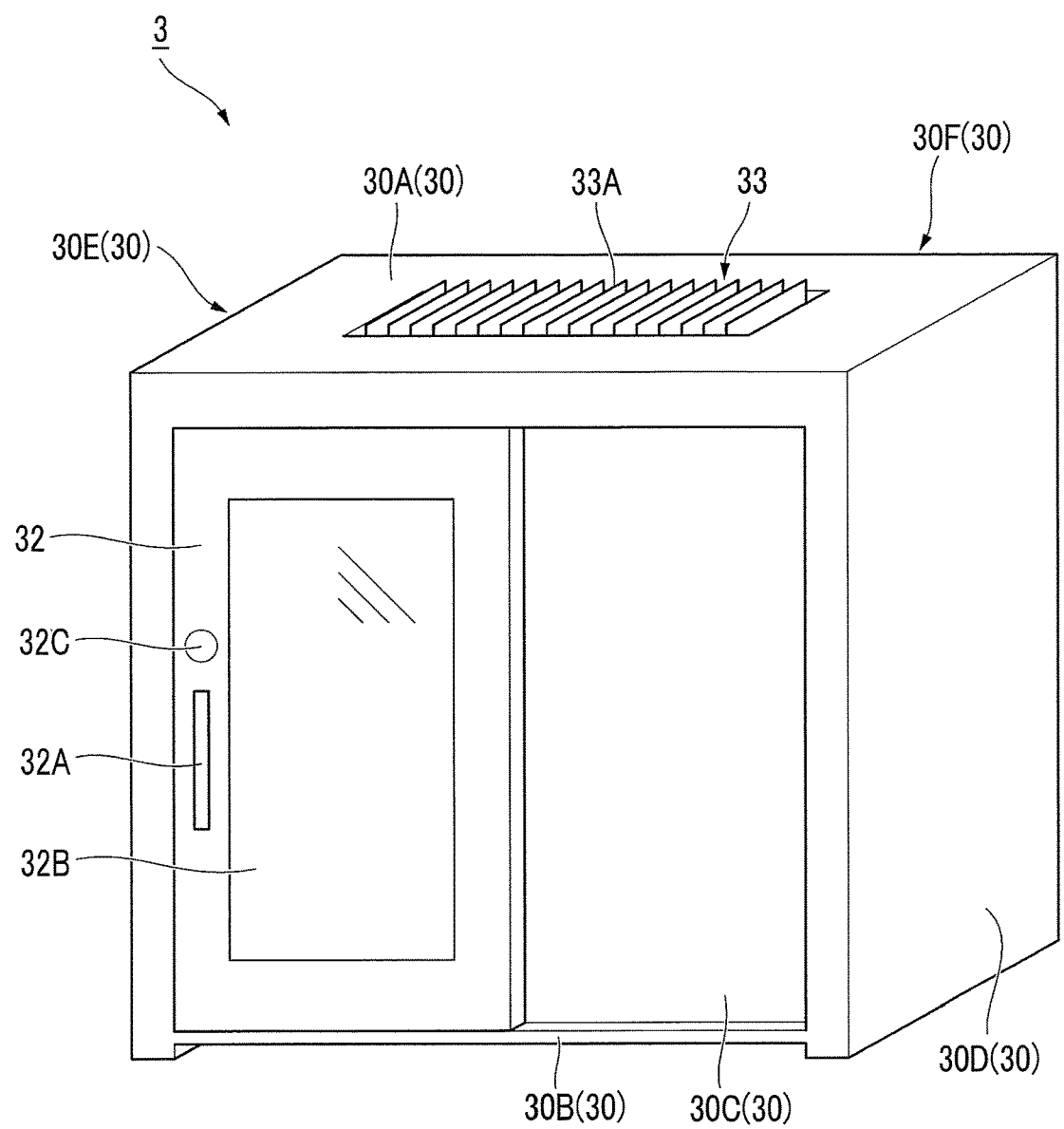
FIG. 2 is a diagram describing an exterior configuration example of a space as a reservation target.

FIG. 2 is a diagram describing an exterior configuration example of the space 3 as the reservation target.

For example, the space 3 in the present exemplary embodiment is arranged in either an indoor location or an outdoor location in the inside of a station, an airport, an office building, a commercial facility such as a restaurant or a department store, a bank, a library, an art gallery, a museum, a public organization or facility, a connecting passage, or a park.

In the present exemplary embodiment, a small room is assumed as the space 3. In this sense, the space 3 is one example of a closed space. In the present exemplary embodiment, a closed type is not used in the sense of airtightness and is used in the sense of including a practical soundproofing capability. Accordingly, an opening or a gap such as an air vent or a small window may be disposed in a part of a frame 30 constituting the space 3. In addition, the window may be openable and closable.

In FIG. 2, the frame 30 is configured with a ceiling 30A, a floor surface 30B, a wall surface 30C to which an openable and closable door 32 is attached, two wall surfaces 30D and 30E positioned on both sides of the wall surface 30C, and a wall surface 30F positioned on the opposite side from the door 32.

In FIG. 2, a ventilation port 33 is disposed on the ceiling 30A. A louver 33A that can adjust the area of opening is attached to the ventilation port 33. The louver 33A in FIG. 2 is in a fully open state.

In the present exemplary embodiment, the door 32 is assumed to be a sliding door that can move along the wall surface 30C. While the door 32 in FIG. 2 is a single sliding type such that one door is slid, the door 32 may be either a crossed sliding type such that two or more doors are open and closed by crossing each other, or a separating sliding type such that two doors are slid leftward and rightward.

The door 32 is not limited to a sliding door. For example, the door 32 may be a single hinged door such that one member moves on an arc trajectory, or may be a double hinged door such that one opening portion is divided by two door members.

In addition, the door 32 may be a folding door that opens such that one set of two door members connected through a hinge is folded. The folding door also has a type that opens only in a single direction, and a type that opens in both directions.

In addition, as a special type, the door 32 may be a pocket door or a partition door that is drawn into a wall when the door 32 is accommodated.

The door 32 may be either open inward or open outward.

In the present exemplary embodiment, a handle 32A that the user grasps at the time of opening and closing is attached to the door 32.

In addition, a member 32B on which a treatment considering confidentiality and crime prevention is performed is arranged in the center part of the door 32. For example, the member 32B may be a transparent plate in which a metal plate in which multiple holes are arranged (for example, perforated metal) is attached to the inner side of the transparent plate, a transparent plate in which a member as a blind is attached to the inner side of the transparent plate with a gap therebetween, a transparent plate to which a film through which it is easy to check the inside from the front side of the film and it is difficult to check the inside from an inclined direction is bonded, or a transparent plate on which a treatment decreasing the visibility of the inside is performed.

For example, glass or acrylic resin is used in the transparent plate. In addition, characteristics related to the transmissivity of the film bonded for confidentiality and crime prevention are determined in the relationship between the position of the door 32 and an operation position of the user. In a case where the user performs an operation at an inner place from the front side of the door 32, a film through which it is difficult to check the inside from the front side of the film and it is easy to check the inside from an inclined direction may be used.

The film may be a liquid crystal film that can electrically switch between transparency and opacity, or a polarization film of which the transmittance can be electrically controlled.

In addition, for example, the treatment decreasing the visibility includes making a small scratch on the surface of the member to scatter light.

The treatment may be performed on a part of the member 32B. For example, a structure in which the surrounding area of the floor surface and the ceiling is transparent and the visibility in a range in which a monitor is viewed during the operation is decreased by the treatment may be used.

By arranging the member 32B, the presence or absence of the user can be checked from the outside while hiding the screen of the monitor from the outside.

Besides, an electronic lock 32C that can be unlocked by the electronic key is attached to the door 32.

The treatment considering confidentiality and crime prevention may also be performed on a member other than the door 32. For example, the treatment considering confidentiality and crime prevention may be performed on at least a part of the wall surfaces 30D, 30E, and 30F.

The number of people using the space 3 is approximately determined by the capacity of the space 3. The space 3 in the present exemplary embodiment is assumed to be an individual room type that is basically used by one person. The space 3 may be a large room that can accommodate a large number of people. The large room may be configured as a single room or may be formed by connecting a plurality of spaces 3 with one or both of the wall surfaces 30D and 30E of the space 3 removed.

The individual room type does not mean that only one person can use the individual room type, and is used in the sense that a small number of people such as two to three people can use the individual room type.

The shape, the structure, provided equipment, and the performance of the frame 30 constituting the space 3 are not limited. For example, a configuration in which the ceiling 30A is removed can be used.

In the present exemplary embodiment, one desk and one chair, not illustrated, are arranged inside the frame 30. Supplied equipment and apparatuses, reserved equipment and apparatuses, and the like are arranged on the desk.

Configuration of Terminal

Figure 3:
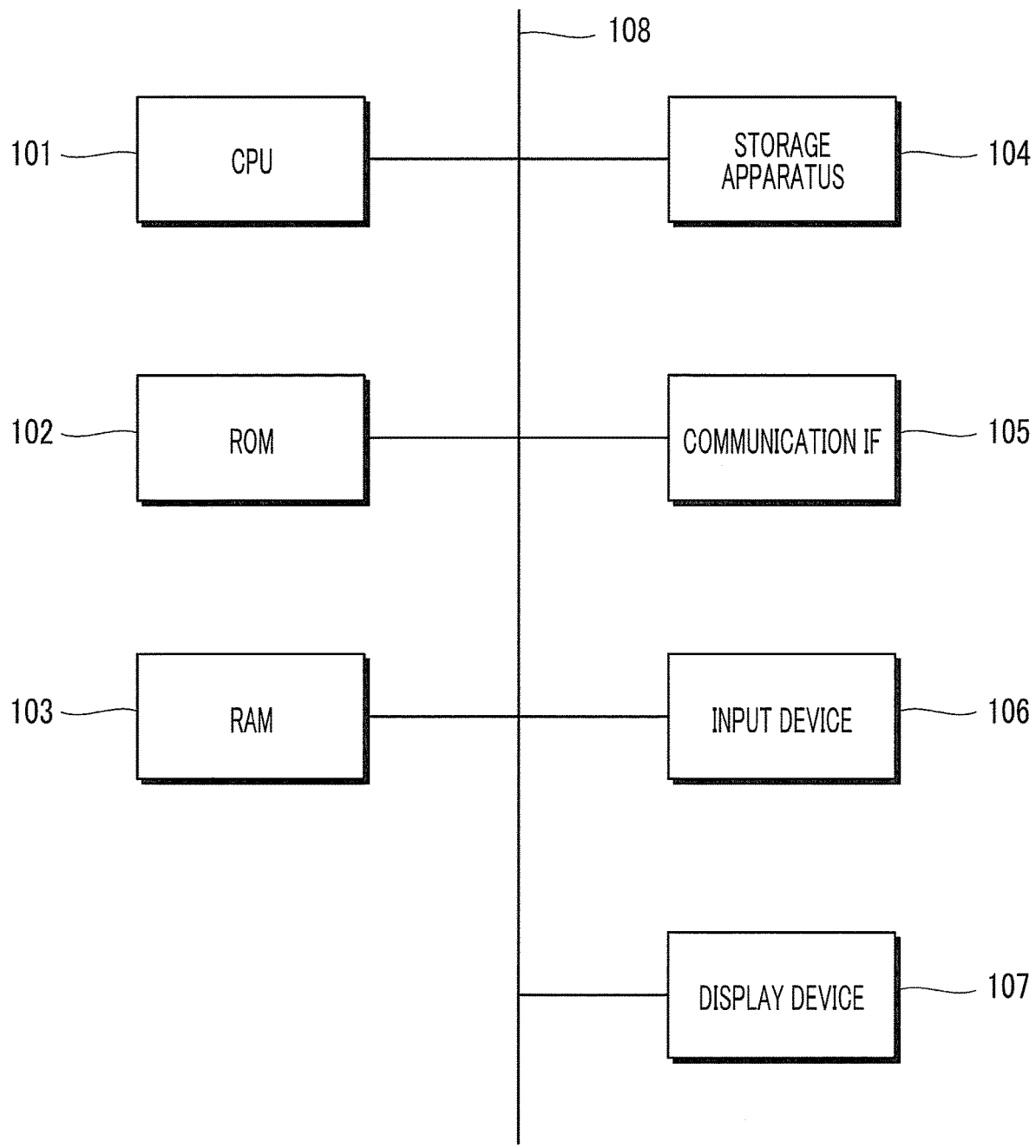
FIG. 3 is a diagram describing an example of a hardware configuration used in a user terminal and a management server.

FIG. 3 is a diagram describing an example of a hardware configuration used in the user terminal 4 (refer to FIG. 1) and a management server. The management server is the reservation management server 5 (refer to FIG. 1), the space management server 6 (refer to FIG. 1), the bill management server 7 (refer to FIG. 1), or the member management server 8 (refer to FIG. 1).

The user terminal 4 and the management server include a central processing unit (CPU) 101 providing various management functions through execution of a program, a read only memory (ROM) 102 as a storage region storing a basic input output system (BIOS) and the like, and a random access memory (RAM) 103 used as an execution region of the program.

The program includes firmware and an operation system.

In addition, the user terminal 4 and the management server include a storage apparatus 104 storing an application program implementing a dedicated management function and various management data, a communication interface (communication IF) 105 used for external communication, an input device 106 configured with a touch panel, a keyboard, and the like, and a display device 107 used for information display.

In the case of the portable type user terminal 4, for example, a non-volatile memory is used as the storage apparatus 104. In the case of the user terminal 4 other than the portable type and the management server, for example, a hard disk apparatus is used as the storage apparatus 104.

In the case of the portable type user terminal, for example, a touch panel is used in the input device 106. In the case of the user terminal 4 other than the portable type and the management server, for example, a keyboard and a mouse are used in the input device.

For example, a liquid crystal display or an organic electro luminescence (EL) display is used in the display device 107.

The CPU 101 and various devices are connected through a bus 108 and a signal line, not illustrated.

Functional Configuration of Reservation Management Server

The reservation management server 5 (refer to FIG. 1) will be described as providing functions illustrated below alone. A part of the functions illustrated below may be executed in the user terminal 4 or may be executed in the management server other than the reservation management server 5.

Figure 4:
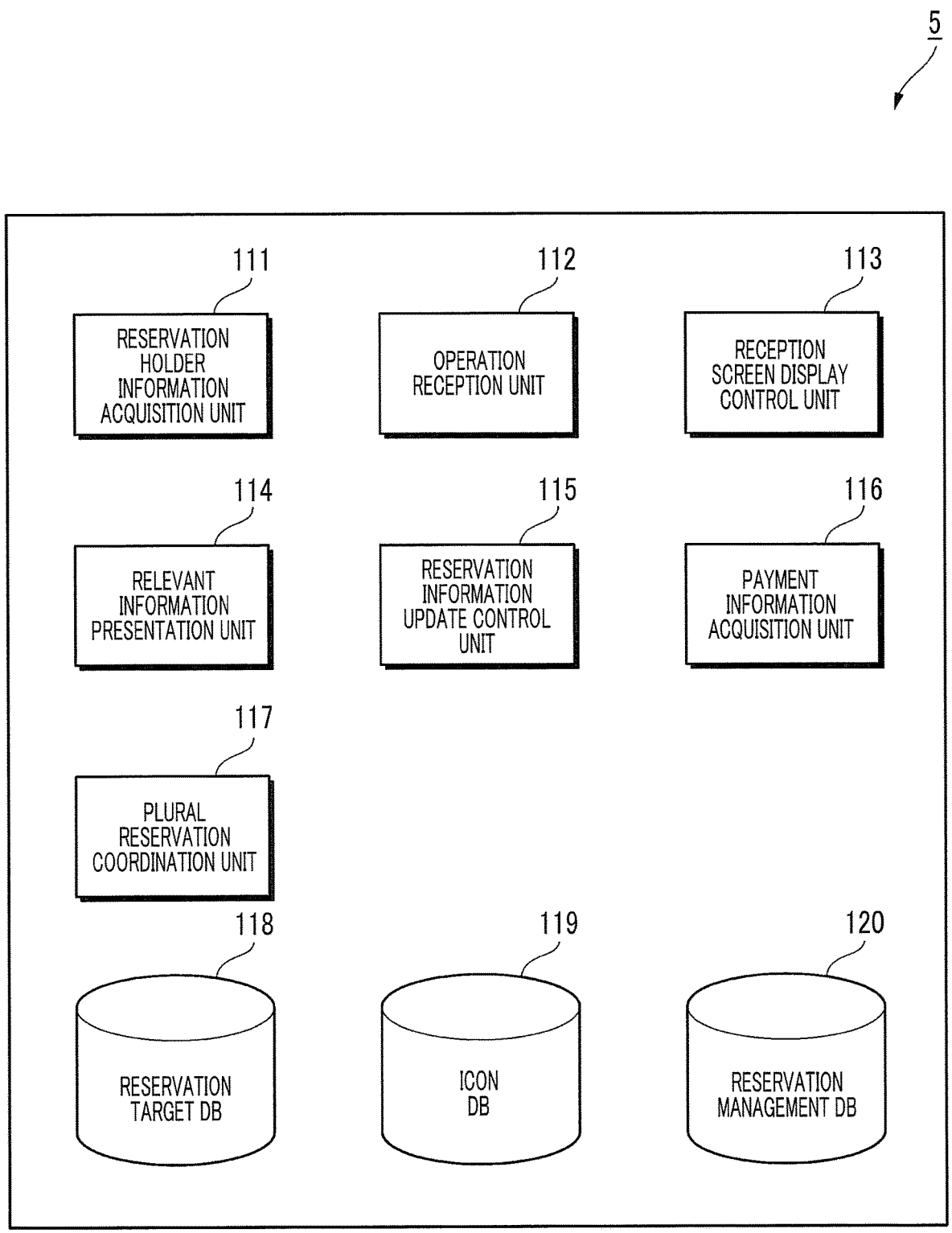
FIG. 4 is a diagram describing an example of a functional configuration of a reservation management server.

FIG. 4 is a diagram describing an example of a functional configuration of the reservation management server 5.

The function of the reservation management server 5 is implemented through execution of the program.

The reservation management server 5 according to the present exemplary embodiment has functions as a reservation holder information acquisition unit 111 obtaining information that is related to the user (hereinafter, referred to as a "reservation holder") and is input through a reservation reception screen, an operation reception unit 112 receiving an operation related to the reservation, a reception screen display control unit 113 controlling display of the reservation reception screen, a relevant information presentation unit 114 presenting information related to the space 3 (refer to FIG. 1) as the reservation target, a reservation information update control unit 115 controlling an update of the reservation information in response to a change of an image on the reception screen, a payment information acquisition unit 116 obtaining payment information related to a cost for the reservation, and a plural reservation coordination unit 117 coordinating a plurality of reservations.

In the present exemplary embodiment, the storage apparatus 104 (refer to FIG. 3) of the reservation management server 5 stores a reservation target database (reservation target DB) 118 storing information related to the space 3 as the reservation target and information related to a service or an object as the reservation target with respect to the space 3, an icon database (icon DB) 119 storing icons representing the space, the service, and the object as the reservation target by a figure, a sign, and the like, and a reservation management database (reservation management DB) 120 managing information related to a confirmed reservation.

The icon in the present exemplary embodiment may include a thumbnail image obtained by reducing the size of a captured image of the space, the object, or the like as the reservation target.

In addition, all or a part of the databases may be arranged in a storage server on the cloud network 2.

For example, the reservation holder information acquisition unit 111 obtains information associated with the name, a member number, and an employee number of the reservation holder input on a reservation screen or selected on the reservation screen from the member management server 8 (refer to FIG. 1). The reservation holder is not necessarily one person and may be a plurality of people. For example, in the case of a participant in a group chat or a web conference, information related to a plurality of people as the reservation holder is obtained. In addition, the reservation holder who is performing the operation may be specified from apparatus information related to the user terminal 4 (refer to FIG. 1) used for the reservation. An operation person of the reservation does not necessarily match the reservation holder. For example, a secretary or a colleague may perform the reservation operation as a representative.

The operation reception unit 112 receives the content of the operation performed on the reception screen displayed on the user terminal 4 (refer to FIG. 1). The reason is that in the present exemplary embodiment, the user terminal 4 is used as an input output apparatus, and the actual process is executed in the reservation management server 5. In the operation reception unit 112, a specific space 3 (refer to FIG. 1) desired for the reservation and a time of use may be provided, and a desired condition may be input. In a case where the desired condition is provided, candidates of the space 3 satisfying the condition are presented to the operation person. The candidates of the space 3 are stored in the reservation target database 118.

The reception screen display control unit 113 controls display of the reception screen depending on the received content of the operation. For example, the reception screen displays information for making the reservation for using the space 3 and information for making the reservation for the service or the object assumed to be used in the space 3. A specific example of the reception screen will be described below. The reception screen display control unit 113 is one example of a control section.

The relevant information presentation unit 114 provides a function of presenting information associated with the space 3 as the reservation target. Information associated with the space 3 is the service or the object assumed to be used in the space 3 and is stored in the reservation target database 118. The relevant information presentation unit 114 displays the icon of the service or the object available for reservation in relation to the space 3 as the reservation target on the reception screen. The icon is stored in the icon database (icon DB) 119.

The reservation information update control unit 115 provides a function of controlling the update of the reservation information in response to a change of the reception screen accompanied by the operation of the reservation holder. In the present exemplary embodiment, the reception screen is regarded as one example of the image. More specifically, in a case where the icon representing the service or the object described above is arranged in an input field for reservation, the reservation information update control unit 115 regards the arrangement of the icon as a change of a display of the image associated with the space 3 as the reservation target and updates the reservation information. The reservation information is stored in the reservation management database (reservation management DB) 120. The reservation information update control unit 115 is also one example of the control section.

The payment information acquisition unit 116 obtains the payment information related to the cost for the reservation through communication with the bill management server 7 (refer to FIG. 1) and controls the reserved service or the object to be in a usable state depending on the status of payment.

The plural reservation coordination unit 117 provides a function of coordinating reservations for the plurality of spaces 3. For example, in a case where reservation display fields corresponding to the plurality of spaces 3 are connected on the reception screen, the plural reservation coordination unit 117 displays the total of the costs of the plurality of reservations on the screen. In addition, in a case where the display fields of the plurality of reservations are connected on the reception screen, the plural reservation coordination unit 117 sets a network of the terminal used in each space 3 such that a web conference can be executed between the plurality of spaces 3 as reservation targets. The setting of the network may be limited to a case where an instruction from the user is provided. In addition, a terminal that is specified from the user may be included in a setting target in addition to the terminal prepared in the space 3 as the reservation target. The plural reservation coordination unit 117 is also one example of the control section.

Example of Reception Screen

Figure 5:
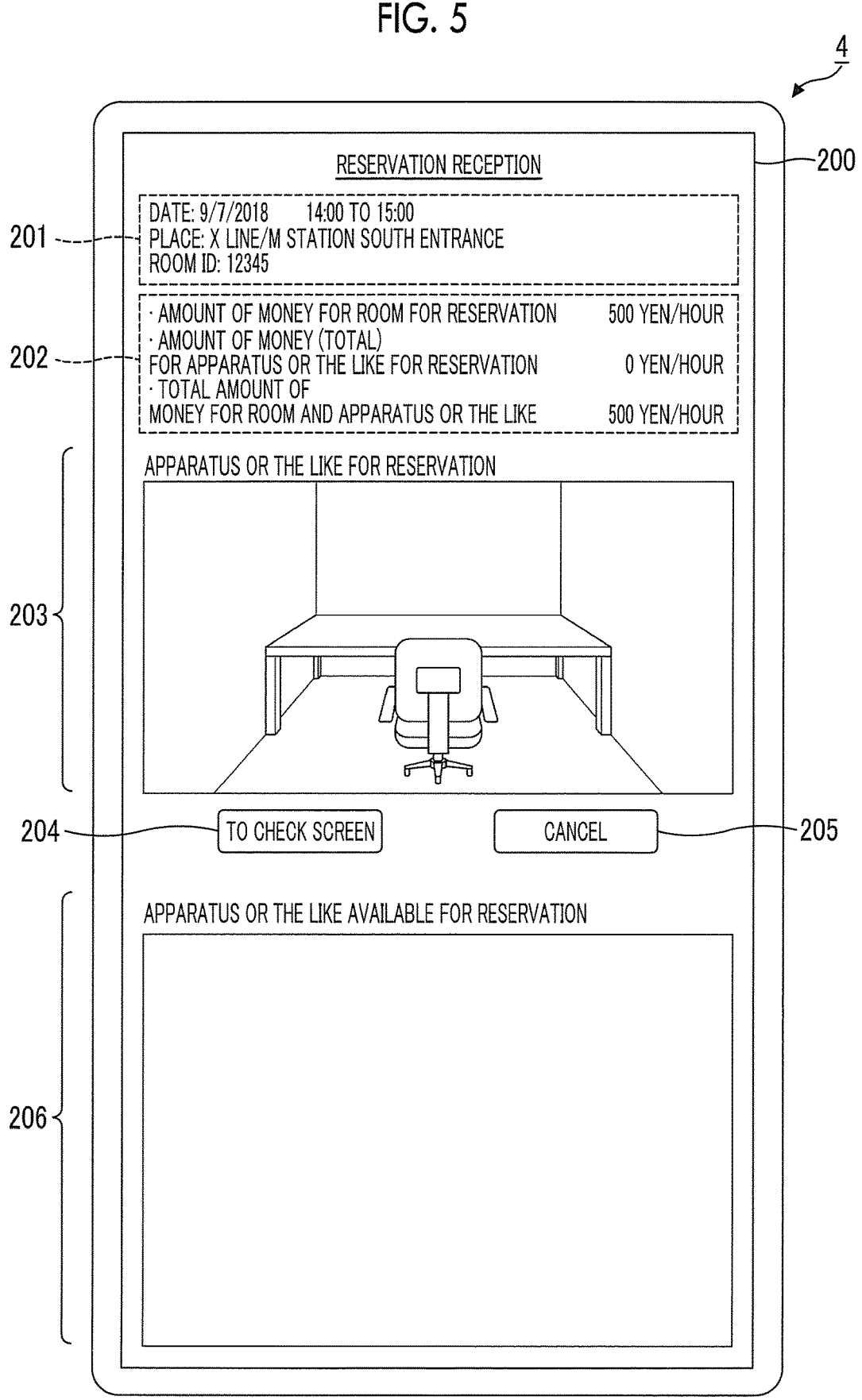
FIG. 5 is a diagram describing an example of a reservation reception screen displayed on a display device of the user terminal.

FIG. 5 is a diagram describing an example of a reservation reception screen 200 displayed on the display device 107 (refer to FIG. 3) of the user terminal 4.

The reception screen 200 in the present exemplary embodiment includes a display field 201 showing information related to the space 3 (refer to FIG. 1) as the reservation target, a display field 202 showing the cost of the reservation, an input field 203 for the apparatus or the like for reservation in association with the space 3, a check button 204 providing an instruction to transition to a check screen displayed before confirmation of the reservation, a button 205 providing an instruction to cancel the reservation operation, and a display field 206 in which candidates of the apparatus or the like available for reservation are displayed as a list.

The space 3 is one example of a first reservation target. In addition, the apparatus or the like reserved in association with the space 3 is one example of a second reservation target. In addition, the display field 206 is one example of a list screen.

In FIG. 5, a reservation date is "Sep. 7, 2018", and a reservation time is one hour of "14:00-15:00". In addition, the space 3 as the reservation target is positioned at the south entrance of M station on X line and is provided with a room ID (identification) "12345".

In the example in FIG. 5, the space 3 is represented as the "room". The representation of a place where the space 3 is arranged may use a name or the like that is provided to enable the reservation holder to arrive at the location without being lost. For example, the representation may include an address, a building name, and a landmark.

In the display field 202 in which the amount of money to be paid as the cost of the reservation is displayed, not only the amount of money for the room but also the amount of money for the apparatus or the like for reservation and the total amount are displayed.

The apparatus or the like includes the service. For example, the service includes a service and a meal provided in the reserved space 3, a provided computer, and an application program executed in the computer as the reservation target. In FIG. 5, the reservation target is mainly the object. Thus, a representation "apparatus or the like" is used.

A representation indicating the amount of money as the cost of the reservation accompanied by the room may be fixed or may change in connection with the object (including the apparatus) or the content of the service actually reserved for the user. For example, in a case where only the apparatus is the reservation target, a representation "amount of money (total) for the object for reservation" may be used. In addition, for example, in a case where both the apparatus and the service are the reservation target, a representation "amount of money (total) for the apparatus and the service for reservation" may be used.

In addition, the amount of money related to the reservation for the object (including the apparatus) and the amount of money related to the reservation for the service may be separately displayed. Specifically, the "amount of money (total) for the object for reservation" and the "amount of money (total) for the service for reservation" may be separately displayed in the display field 202.

In FIG. 5, the icon representing the object or the like as the reservation target is not displayed in the input field 203. Thus, the "amount of money (total) for the apparatus or the like for reservation" in the display field 202 is "0 yen/hour". While the amount of money on an hourly basis is displayed in the example in FIG. 5, the representation may be changed depending on the minimum unit. In a case where different representations coexist, the reservation holder may make an erroneous determination. Thus, it is desired to unify the representations of the unit. Apparently, the unification of the representations is not obligatory.

In the present exemplary embodiment, an image, a drawing, or a photo representing the room as the reservation target is displayed in the input field 203. By displaying the image or the like representing the reservation target, it is easy to visually image the reservation target, and it is also easy to image the relationship between the reservation target and the apparatus or the like for reservation at the same time. That is, the arrangement of the icon does not provide an instruction for a position at which the apparatus or the like corresponding to the icon is arranged, and only indicates the association between the apparatus as the reservation target and the room as the reservation target.

In the example in FIG. 5, an image in which the inside of the room as the reservation target is seen from an entrance side is arranged in the input field 203. A plan view or an exterior view representing the layout of the room may also be arranged.

While the representation "apparatus or the like for reservation" is used as a caption (title) of the input field 203 in the example in FIG. 5, a representation "room for reservation" that explicitly indicates the reservation target may be used, or a caption that represents the content or the type of the target available for reservation accompanied by the room for reservation may be used.

For example, in a case where the reservation can be made for only the apparatus in relation to the room as the reservation target, the "apparatus for reservation" may be displayed as the caption of the input field 203. In addition, in a case where the reservation can be made for only the service in relation to the room as the reservation target, the "service for reservation" may be displayed as the caption of the input field 203.

The "apparatus or the like for reservation" in FIG. 5 indicates that the reservation can be made for other than the apparatus.

While the content of the display of the caption of the input field 203 may be determined on a system side depending on the content of the target available for reservation, the caption of the input field 203 may be switched by an instruction from the user.

The switching operation may be executed each time the reservation is made, or may be executed on a screen for a setting operation for a display item.

In the example in FIG. 5, information related to the apparatus or the like available for reservation is not described in the display field 206. The reason is that in this example, the equipment such as the apparatus installed in the space 3 as the reservation target is in a state where the reservation holder is allowed to freely use the equipment, and the reservation is not particularly necessary.

In the present exemplary embodiment, the input field 203 is one example of a first image associated with the space 3 as the reservation target.

Figure 6:
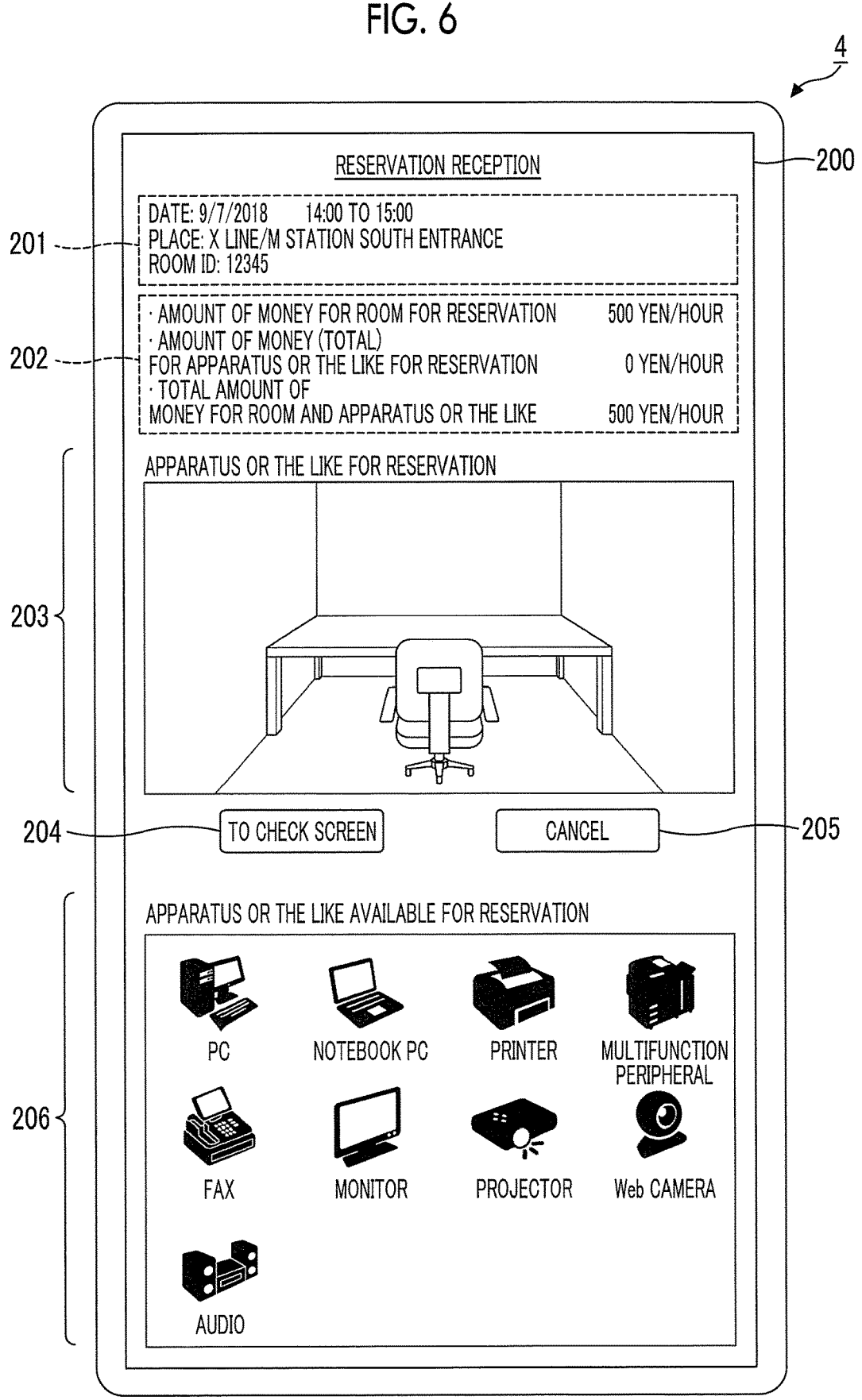
FIG. 6 is a diagram describing an example in which an icon of an apparatus or the like available for reservation is displayed on the reception screen.

FIG. 6 is a diagram describing an example in which the icon of the apparatus or the like available for reservation is displayed on the reception screen 200. In FIG. 6, parts corresponding to FIG. 5 are designated by corresponding reference signs.

In FIG. 6, icons corresponding to a desktop type computer (PC), a notebook type computer (notebook PC), a printer, a multifunction peripheral, a fax, a monitor, a projector, a web camera, and an audio apparatus are displayed as a list in the display field 206 as objects available for reservation accompanied by the space 3 as the reservation target.

The multifunction peripheral is an image forming apparatus having a plurality of functions and for example, has a fax function of transmitting and receiving a fax document, a copy function of generating a copy of an original document, a scan function of reading the original document, a print function of printing an image on a paper and other recording media, and the like.

Each icon displayed in the display field 206 is one example of a second image related to the space 3. In addition, the display of the icon is executed by the relevant information presentation unit 114 (refer to FIG. 4).

While a charge in the case of making the reservation for the apparatus corresponding to each icon is not displayed in the display field 206 illustrated in FIG. 6, the charge is not illustrated for want of space. The same applies to other drawings.

The caption (title) of the display field 206 may be determined on the system side depending on the object or the content of the service available for reservation accompanied by the space 3 as the reservation target. For example, in a case where the reservation can be made for not only the object but also the service, "apparatus available for reservation" may be displayed in a tab of a window in which the icons of the objects available for reservation are gathered, and "service available for reservation" may be displayed in a tab of a window in which the icons of the services available for reservation are gathered. In this case, the content available for reservation accompanied by the room for reservation is easily perceived by a caption provided to the tab.

The tab may be prepared for each type such as a service, a meal, and an application program.

Whether to employ display for each type or display the icon corresponding to the object or the service as a whole may be switched by selection of the user. The switching may be executed each time the reservation is made, or may be executed on the screen for the setting operation for the display item.

Example 1 of Reservation Operation

Figure 7:
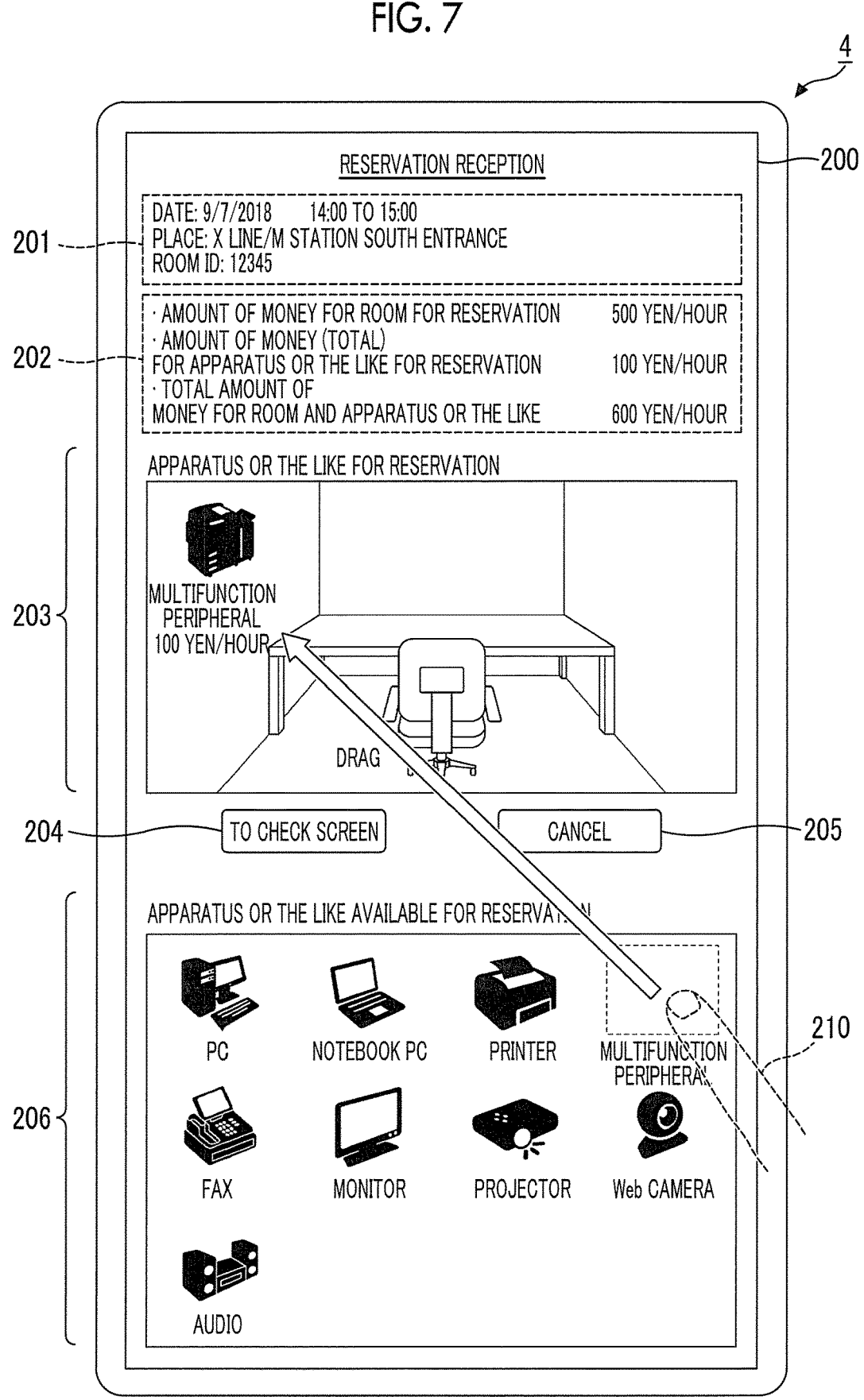
FIG. 7 is a diagram describing an operation example in a case where the reservation is also made for the apparatus or the like in making a reservation for the space.

FIG. 7 is a diagram describing an operation example in a case where the reservation is also made for the apparatus or the like in the reservation for the space 3.

In FIG. 7, parts corresponding to FIG. 6 are designated by corresponding reference signs.

The example illustrated in FIG. 7 is an example in which the reservation is made by dragging the icon. In FIG. 7, the icon of the multifunction peripheral that can be used at 100 yen per hour is dragged into the input field 203 from the display field 206 with a finger 210. Since the icon is moved, the icon of the multifunction peripheral is removed from the display field 206. The movement of the icon of the multifunction peripheral accompanied by the operation changes the input field 203 associated with the space 3 as the reservation target. The movement of the icon is received by the operation reception unit 112 (refer to FIG. 4).

In FIG. 7, in a case where the icon of the multifunction peripheral is arranged in the input field 203, the amount of money required for the reservation for the apparatus corresponding to the icon is shown.

In addition, moving the icon of the multifunction peripheral to the input field 203 used for the reservation for the service or the object changes the display content of the display field 202. Specifically, it is shown that 100 yen per hour is required as the cost of the reservation for the multifunction peripheral, and the reservation holder is required to pay 600 yen per hour including the reservation for the space 3. The change of the content displayed in the display field 202 is executed by the reception screen display control unit 113 (refer to FIG. 4). In addition, the update of the reservation information stored in the reservation management database 120 is executed by the reservation information update control unit 115 (refer to FIG. 4). The update of the reservation information by the reservation information update control unit 115 may be executed in a stage where the reservation is confirmed.

The display form of the icon arranged in the input field 203 may be changed compared to a case where the icon is arranged in the display field 206. The change of the icon achieves the effect of visually informing the user of the reservation target.

Figure 8:
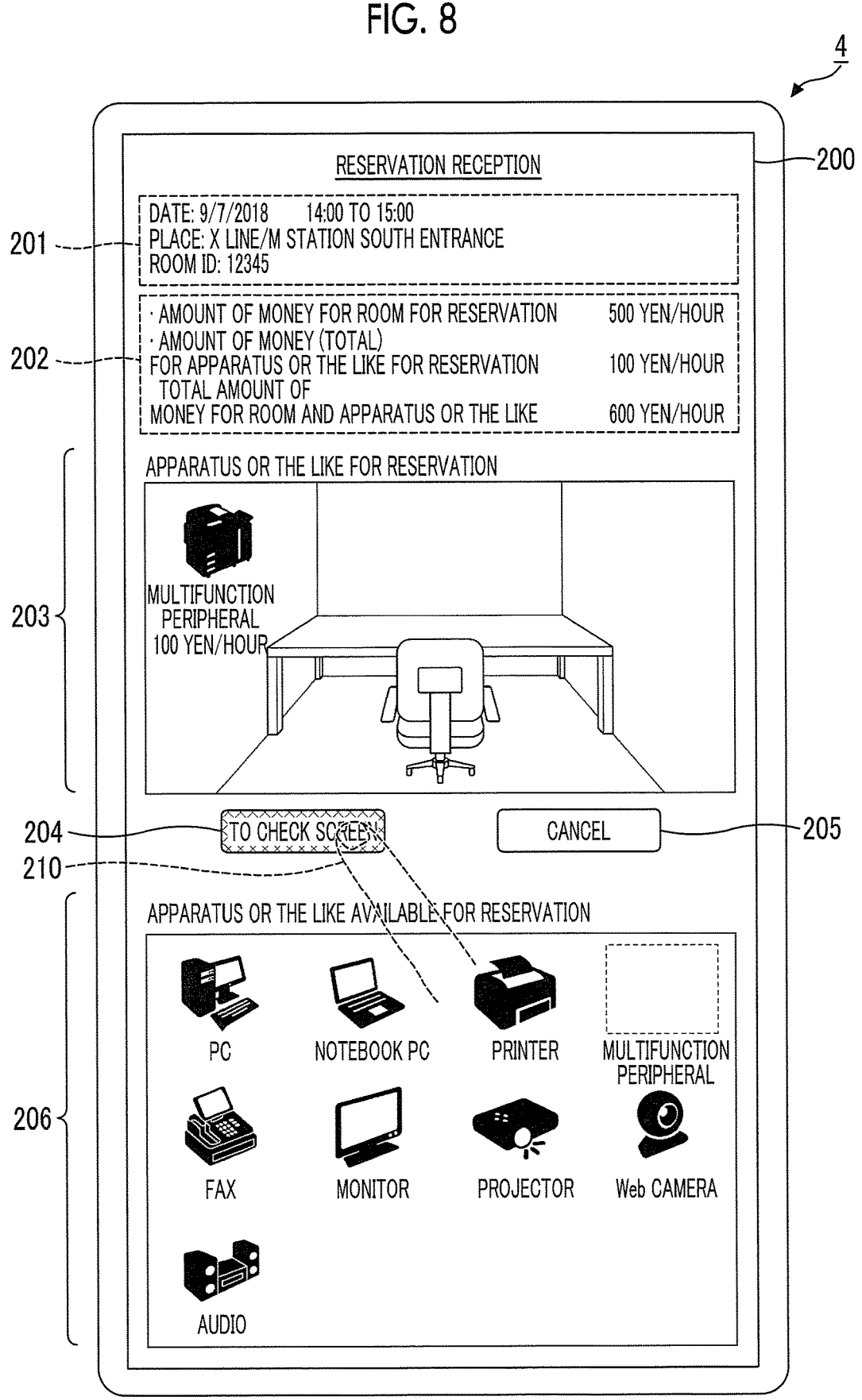
FIG. 8 is a diagram describing a state where a reservation holder operates a check button in order to confirm the reservation.

FIG. 8 is a diagram describing a state where the reservation holder operates the check button 204 in order to confirm the reservation. In FIG. 8, parts corresponding to FIG. 7 are designated by corresponding reference signs.

In FIG. 8, a state where the check button 204 is selected by a tap with the finger 210 is represented by hatching the check button 204.

In a case where the amount of money in the display field 202 showing the cost of the reservation exceeds an upper limit amount of money specified by the user, a transition to the check screen may be prevented by displaying an alert text indicating the excess of the amount of money on the uppermost layer of the reception screen 200 even in a case where the check button 204 is operated. In a case where the alert text is displayed, the user changes the apparatus as the reservation target such that the amount of money becomes less than or equal to the upper limit amount of money. The change of the apparatus is performed by deleting an icon corresponding to a specific apparatus from the input field 203.

Alternatively, dropping of the icon corresponding to the apparatus or the like in the input field 203 may be prevented. The case where the icon cannot be dropped in the input field 203 may include not only a case where the upper limit amount of money is already exceeded at the time of dragging the icon, but also a case where the upper limit amount of money is not exceeded at the time of selecting the icon, but the upper limit amount of money is exceeded in a case where the icon is dropped in the input field 203. In the latter case, for example, it is desired that a description text describing to the user that the excess of the upper limit amount of money is the cause is displayed on the reception screen 200.

While FIG. 7 and FIG. 8 illustrate a case where the dimension of the icon corresponding to the apparatus or the like does not change before and after the drag, the size of the icon may be adjusted for the dimension on the reception screen 200 in the input field 203 in which the icon corresponding to the apparatus for reservation is arranged, or the display field 206 in which the candidates of the apparatus or the like available for reservation are displayed as a list.

Figure 9:
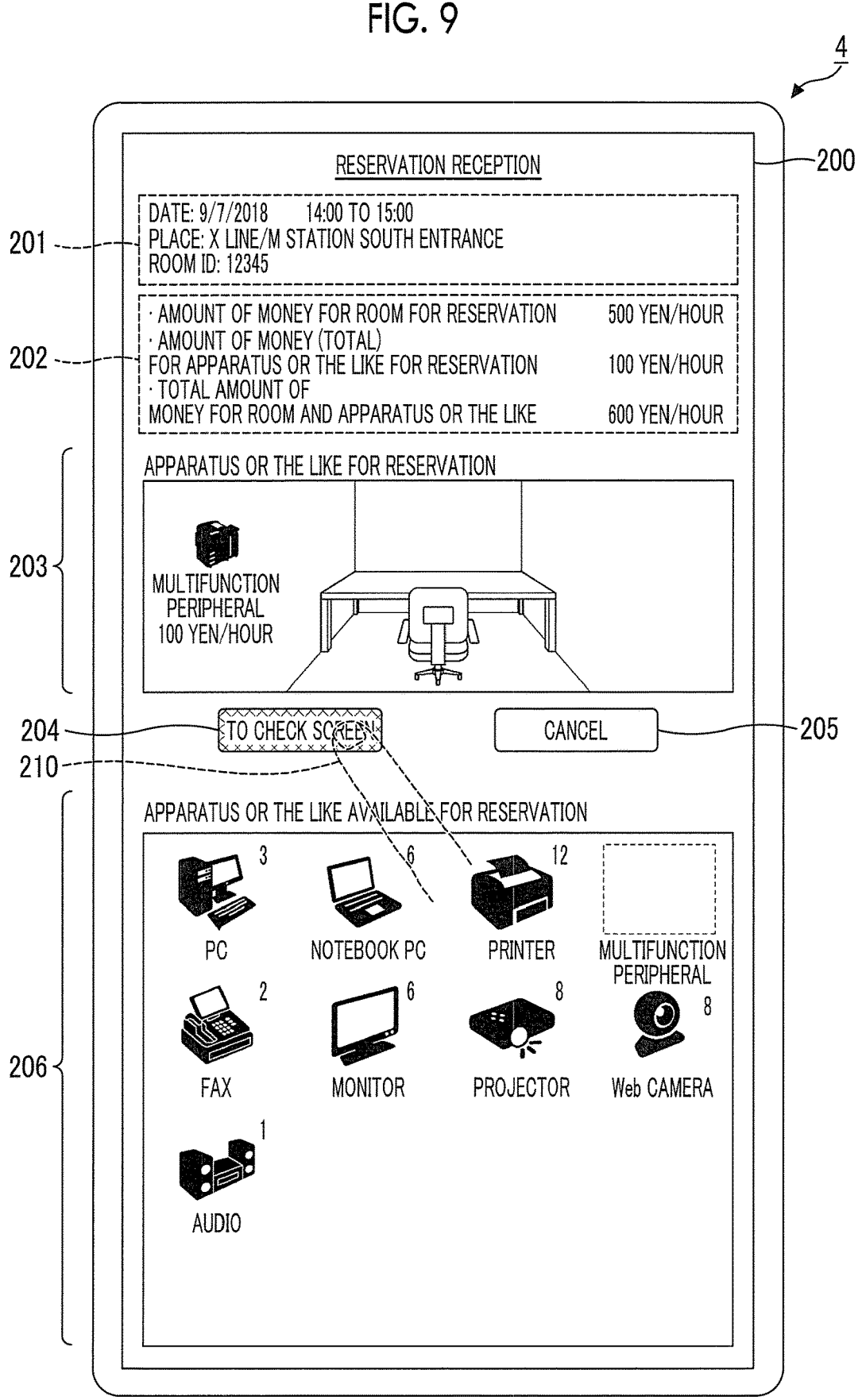
FIG. 9 is a diagram describing an example in which the dimension of the icon of the apparatus or the like is decreased depending on an input field of a drag destination.

FIG. 9 is a diagram describing an example in which the dimension of the icon of the apparatus or the like is decreased depending on the input field of the drag destination. In FIG. 9, parts corresponding to FIG. 8 are designated by corresponding reference signs. The example in FIG. 9 represents an example in which the dimension assigned to the input field 203 on the reception screen 200 is small, and thus, the dimension of the icon after the drag is decreased from the dimension before the drag.

The example in FIG. 9 also represents another display example of the display field 206. While only the icon of the apparatus available for reservation is displayed in the case of the display field 206 in FIG. 6 to FIG. 8, a number representing the remaining quantity available for reservation may be displayed in association with each icon as in FIG. 9.

In FIG. 9, it is clear that the remaining quantity available for reservation includes three desktop type computers (PC), six notebook type computers (notebook PC), 12 printers, two faxes, six monitors, eight projectors, eight web cameras, and one audio apparatus.

In a case where a specific icon is dragged and dropped in the input field 203 by the user, the corresponding number next to the icon is updated to a value smaller by one than the number.

In FIG. 9, in a case where the total number is zero, the icon is not displayed. Thus, the icon of the multifunction peripheral is not present.

Even in a case where the remaining quantity of multifunction peripherals available for reservation is zero, the remaining quantity may be displayed by a number in the same manner as a case where the remaining quantity is present.

In addition, the user may be alerted by changing the color of the icon depending on the remaining quantity. For example, in a case where the remaining quantity is one, the icon may be displayed in red. In addition, in a case where the remaining quantity is zero, the color of the icon may be displayed as a color, for example, gray, distinguished from an available reservation state. In addition, the icon corresponding to the apparatus or the like of which the remaining quantity becomes zero may be displayed in a semi-transparent manner.

Figure 10:
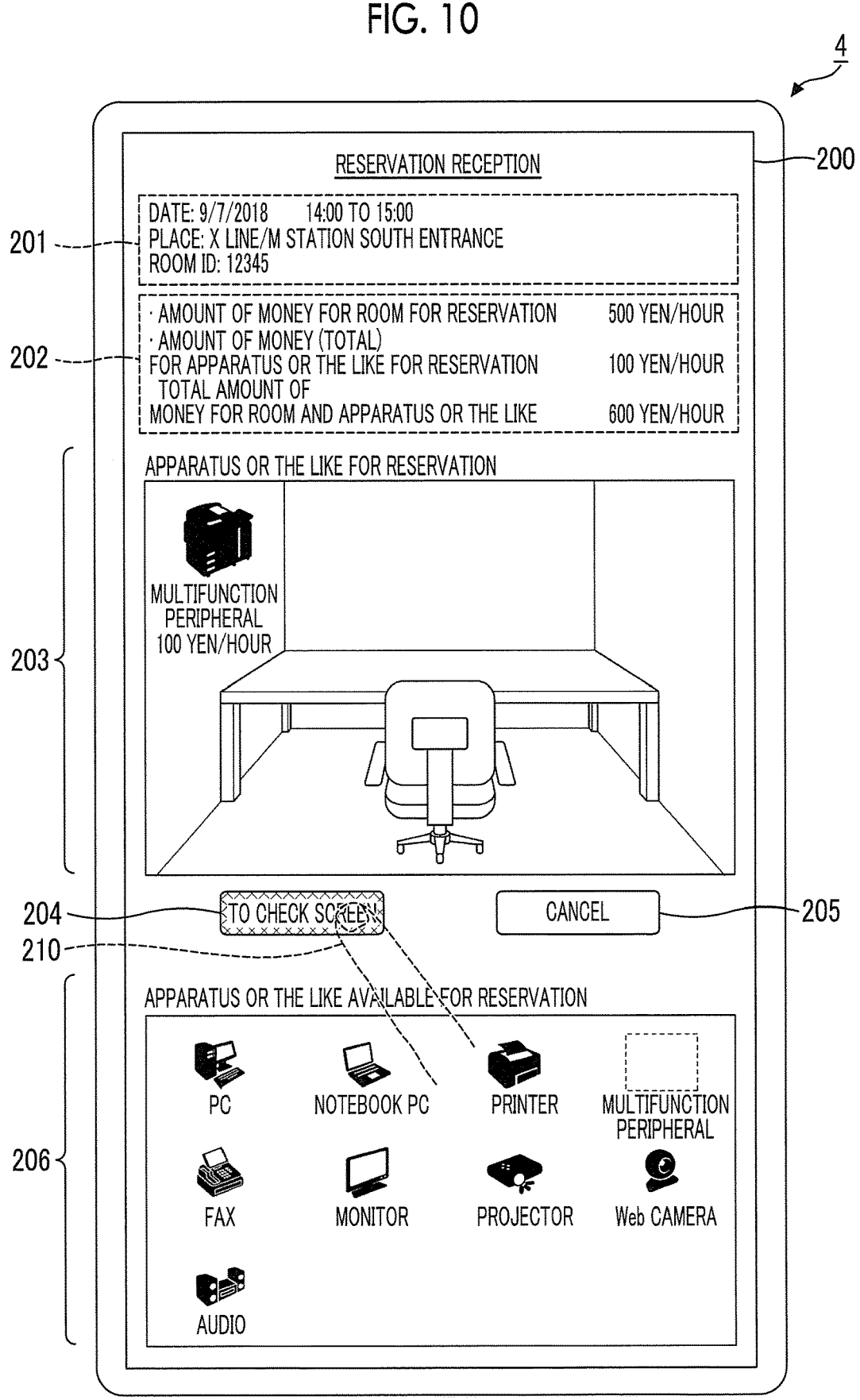
FIG. 10 is a diagram describing an example in which the dimension of the icon of the apparatus or the like is increased depending on the input field of the drag destination.

FIG. 10 is a diagram describing an example in which the dimension of the icon of the apparatus or the like is increased depending on the input field of the drag destination. In FIG. 10, parts corresponding to FIG. 8 are designated by corresponding reference signs. In contrast to FIG. 9, FIG. 10 represents an example in which the dimension assigned to the input field 203 on the reception screen 200 is large, and thus, the dimension of the icon after the drag is increased from the dimension before the drag.

Figure 11:
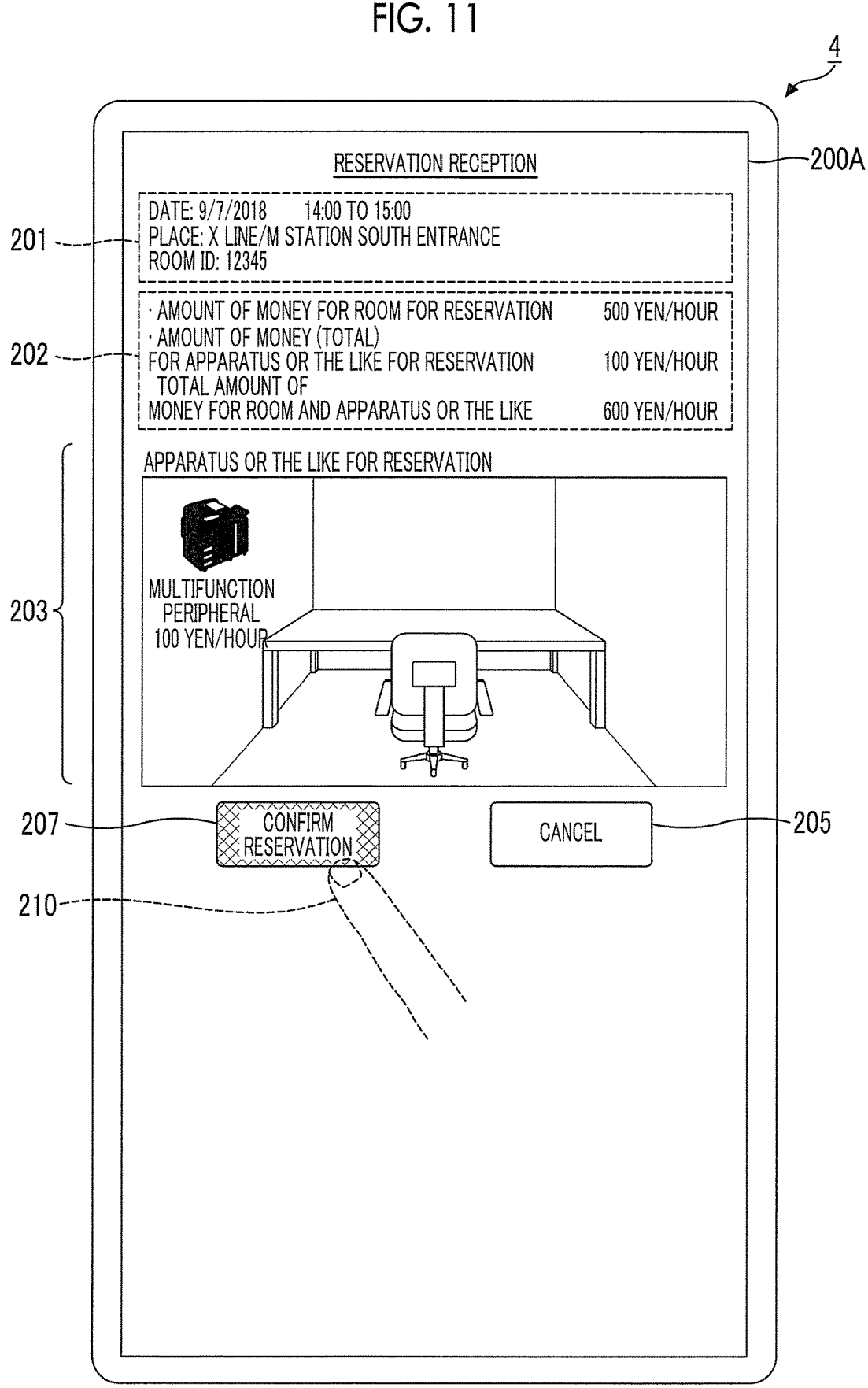
FIG. 11 is a diagram illustrating an example of a reservation check screen.

FIG. 11 is a diagram illustrating an example of a reservation check screen 200A. In FIG. 11, parts corresponding to FIG. 5 are designated by corresponding reference signs.

The check screen 200A and the reception screen 200 in the present exemplary embodiment have two differences such that the display field 206 in which the candidates of the apparatus or the like available for reservation are displayed is not present on the check screen 200A, and a confirmation button 207 that provides an instruction to confirm the reservation is arranged instead of the check button 204 providing an instruction to transition to the check screen 200A.

In FIG. 11, a state where the confirmation button 207 is selected by a tap with the finger 210 is represented by hatching the confirmation button 207.

In a case where the button 205 providing an instruction for cancellation is tapped, the content of the display screen returns to the reception screen 200 (refer to FIG. 8).

Example 2 of Reservation Operation

Figure 12:
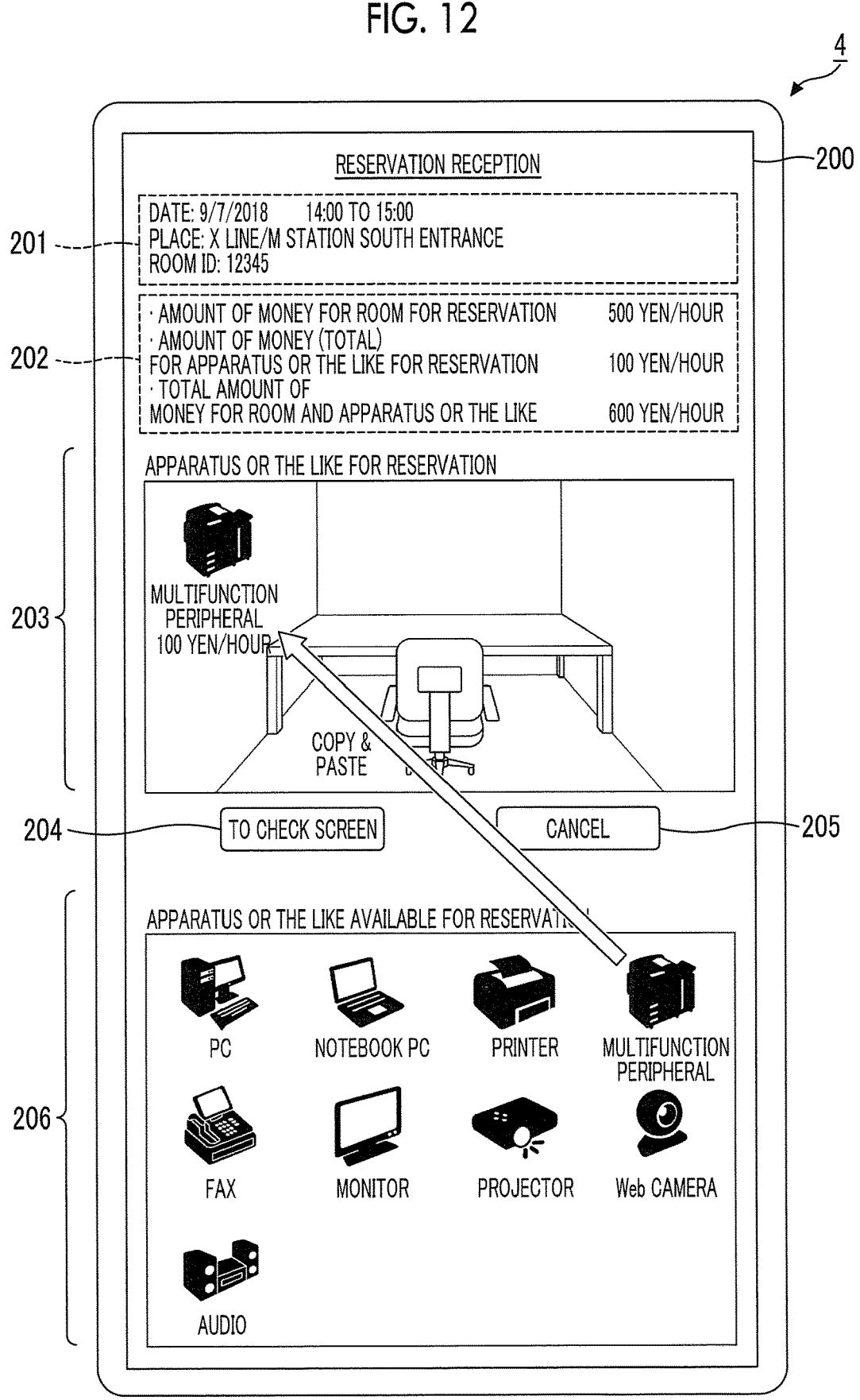
FIG. 12 is a diagram describing another operation example in a case where the reservation is also made for the apparatus or the like in making a reservation for the space.

FIG. 12 is a diagram describing another operation example in a case where the reservation is also made for the apparatus or the like in the reservation for the space 3.

In FIG. 12, parts corresponding to FIG. 6 are designated by corresponding reference signs.

The example illustrated in FIG. 12 is an example in which the reservation is made by performing a copy & paste operation on the icon. In FIG. 12, the icon of the multifunction peripheral that can be used at 100 yen per hour is the target of the operation. Since the copy & paste operation is performed, the icon of the multifunction peripheral remains in the display field 206 in which the candidates of the apparatus or the like available for reservation are displayed. An operation icon, not illustrated, is used for each of the copy operation and the paste operation. Those operations are also received by the operation reception unit 112 (refer to FIG. 4).

In FIG. 12, pasting the icon of the multifunction peripheral in the input field 203 used for the reservation for the service or the object changes the display content of the display field 202. Specifically, it is shown that 100 yen per hour is required as the cost of the reservation for the multifunction peripheral, and the reservation holder is required to pay 600 yen per hour including the reservation for the space 3. The change of the content displayed in the display field 202 is also executed by the reception screen display control unit 113 (refer to FIG. 4). In addition, the update of the reservation information stored in the reservation management database 120 is executed by the reservation information update control unit 115 (refer to FIG. 4).

Other Examples of Reception Screen and Reservation Operation

Hereinafter, other examples of the reception screen 200 (refer to FIG. 5) and the reservation operation will be described.

Example 1

Figure 13:
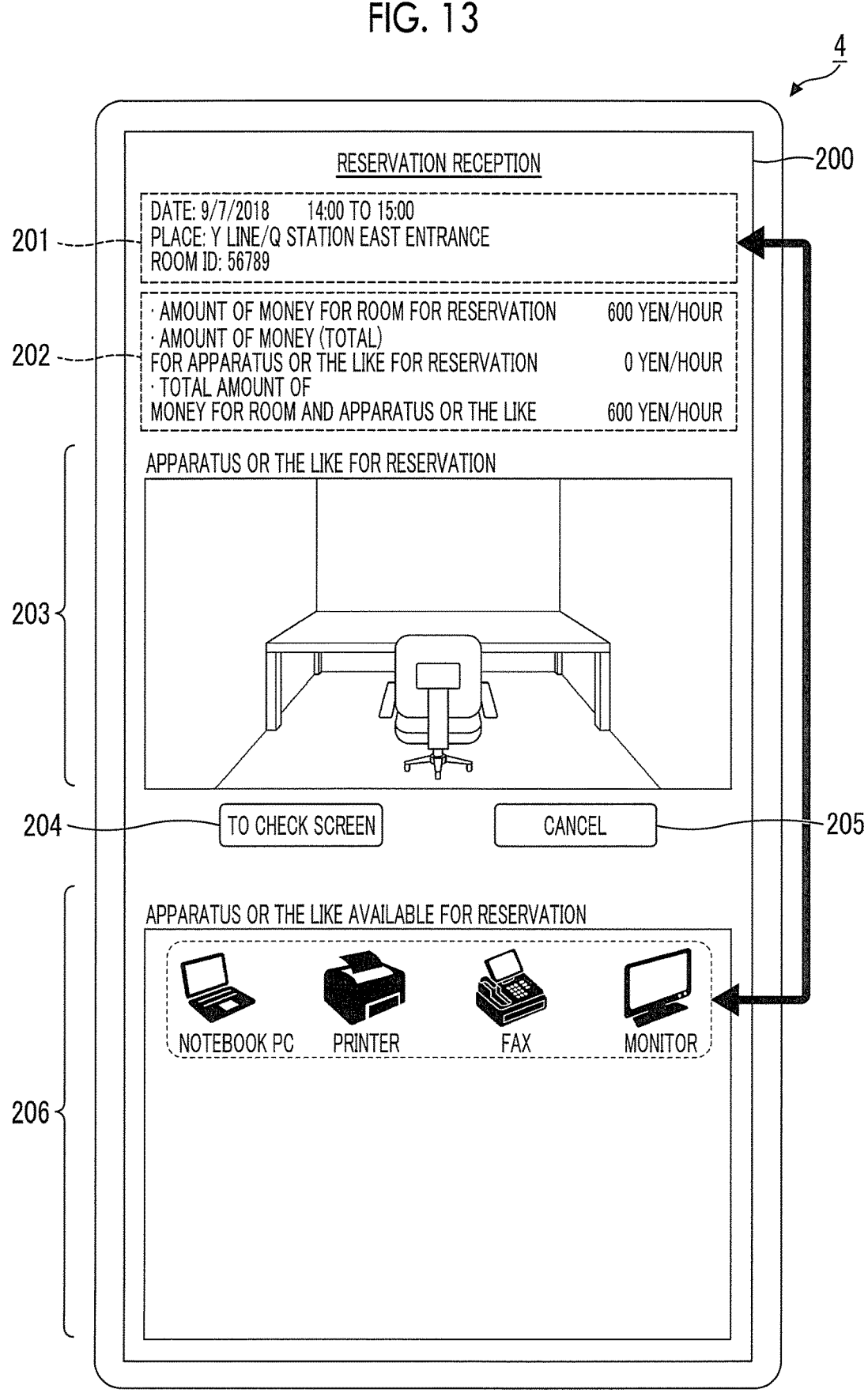
FIG. 13 is a diagram describing a relationship between the space as the reservation target and candidates of the apparatus or the like available for reservation displayed in a display field.

FIG. 13 is a diagram describing a relationship between the space 3 (FIG. 1) as the reservation target and the candidates of the apparatus or the like available for reservation displayed in the display field 206. In FIG. 13, parts corresponding to FIG. 5 are designated by corresponding reference signs.

In FIG. 13, the date and time of the reservation are the same as those on the reception screen 200 illustrated in FIG. 6, but the space 3 as the reservation target is different from that in FIG. 6. Specifically, the room ID of the space 3 in FIG. 13 is "56789". In addition, the space 3 is positioned at the east entrance of Q station on Y line.

In the case of the space 3 illustrated in FIG. 13, the object available for reservation includes the notebook type computer (notebook PC), the printer, the monitor, and the FAX. Thus, the icons corresponding to those four apparatuses are displayed in the display field 206. By displaying only the icon corresponding to the apparatus available for reservation in the display field 206, the reservation holder does not select an apparatus not available for reservation. In addition, information related to the apparatus available for reservation can be perceived before the icon is selected. In addition, in a case where the reservation has to be made for a specific apparatus, the reservation holder quickly notices that the space 3 as the reservation target does not match the need of the reservation holder.

Example 2

The apparatus not available for reservation can also be arranged in the display field 206 without distinction.

Figure 14:
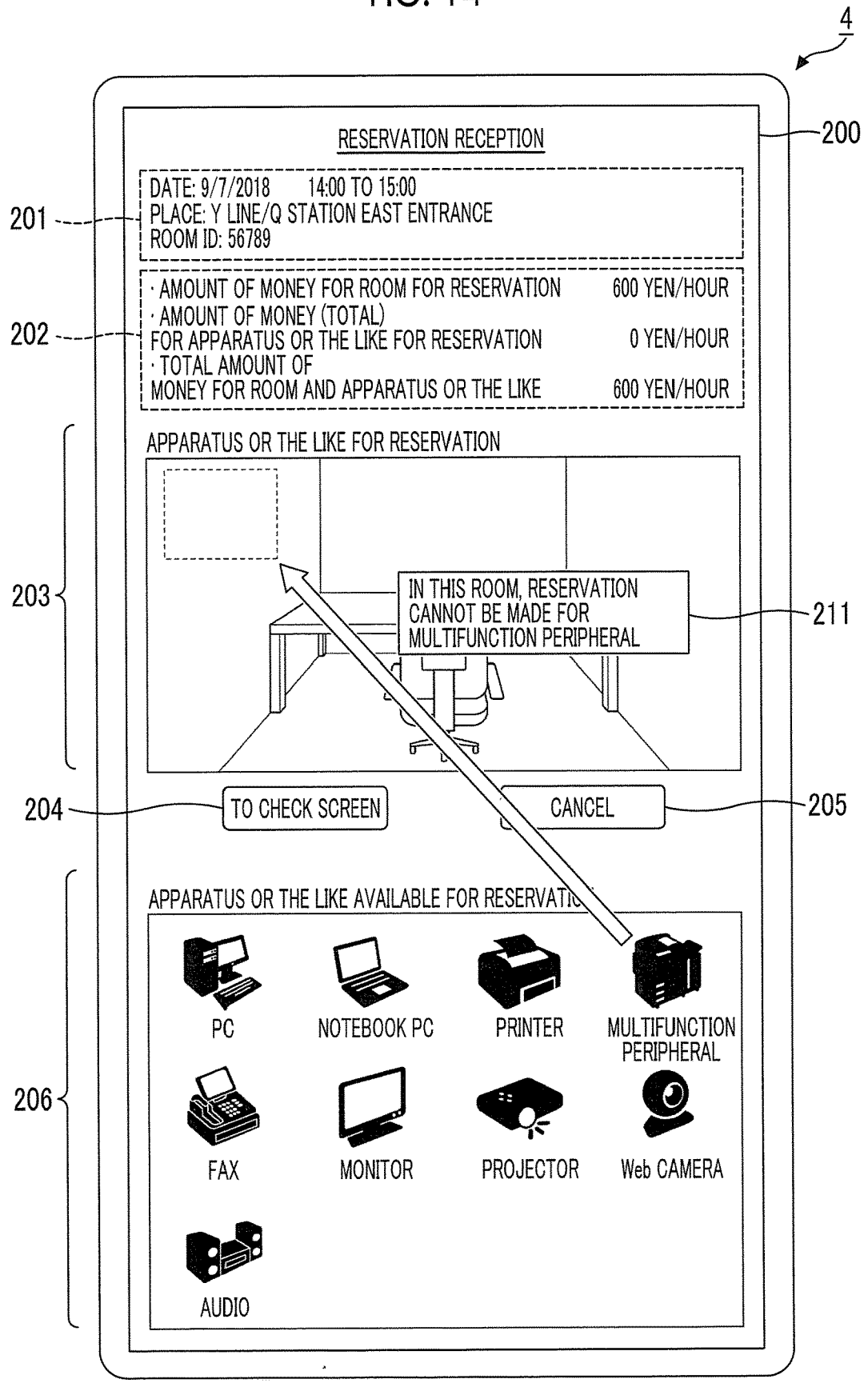
FIG. 14 is a diagram describing a display example of the reception screen when an apparatus not available for reservation is selected by a user in a case where the apparatus not available for reservation is also displayed in the display field without distinction.

FIG. 14 is a diagram describing a display example of the reception screen 200 when the apparatus not available for reservation is selected by the user in a case where the apparatus not available for reservation is also displayed in the display field 206 without distinction.

In FIG. 14, parts corresponding to FIG. 13 are designated by corresponding reference signs. That is, the space 3 as the reservation target is the same as that in FIG. 13.

In FIG. 14, the icon of the apparatus not available for reservation is also displayed in the display field 206 for the space 3 managed by the room ID "56789".

FIG. 14 represents a state where the icon of the multifunction peripheral not available for reservation is dragged into the input field 203 from the display field 206 for the space 3 managed by the room ID "56789". Apparently, the icon of the multifunction peripheral cannot be arranged in the input field 203. Since the icon cannot be arranged, the user perceives the apparatus not available for reservation.

Meanwhile, only disabling the arrangement of the icon may lead to a misunderstanding that software erroneously operates in a case where the reservation holder is not familiar with the operation. Thus, in FIG. 14, a description text 211 informing the reservation holder that the reservation cannot be made for the multifunction peripheral is displayed in the input field 203.

In a case where the icon for which the reservation cannot be made due to use by another user is shown in the display field 206, the icon may be displayed in a different display form (for example, displayed in gray) from the icon in a case where the reservation can be made. By employing such display, a state where the reservation can be originally made but currently cannot be made is easily checked.

Example 3

Figure 15:
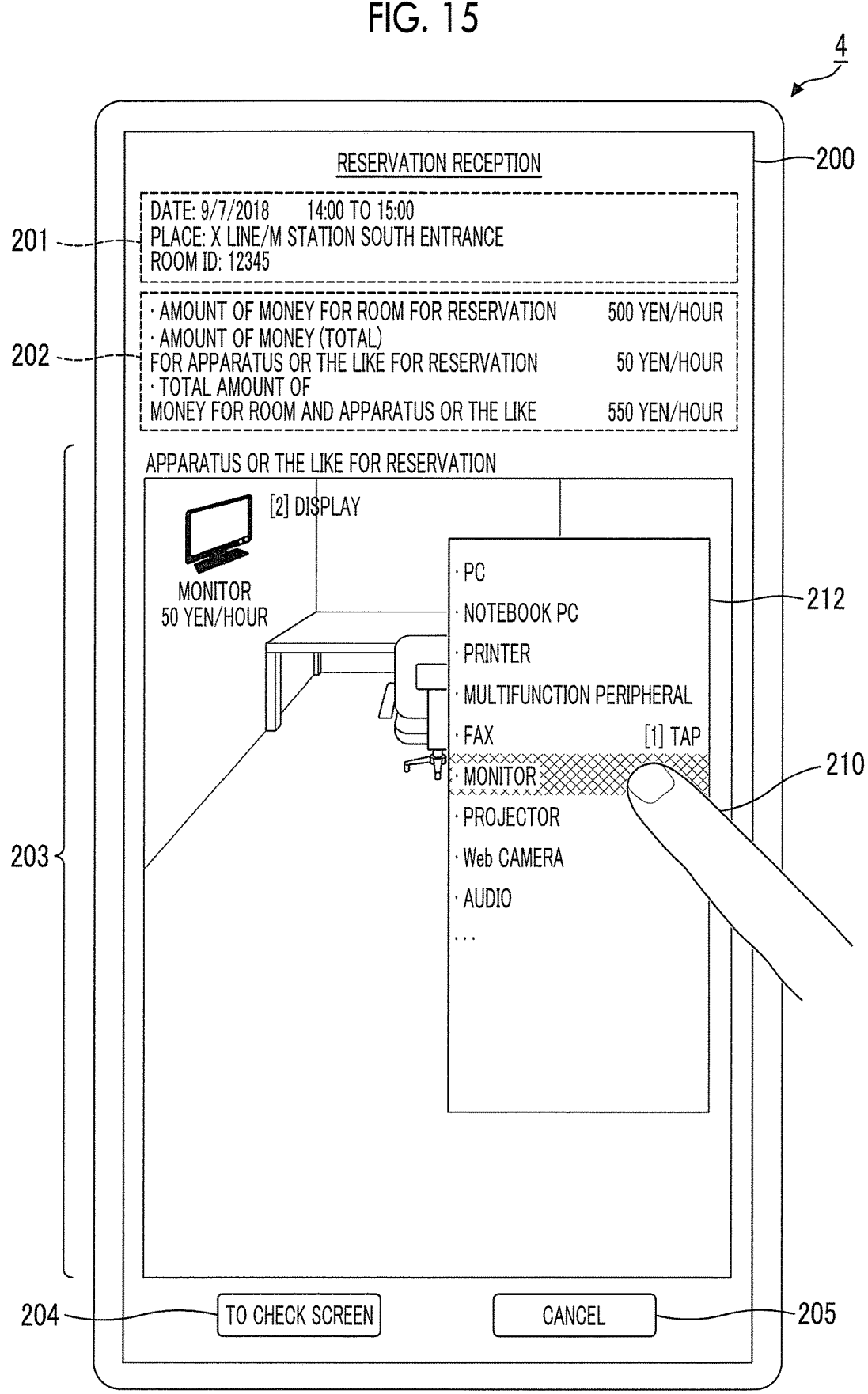
FIG. 15 is a diagram describing another input method for the apparatus available for reservation.

FIG. 15 is a diagram describing another input method for the apparatus available for reservation. In FIG. 15, parts corresponding to FIG. 7 are designated by corresponding reference signs.

The difference between FIG. 15 and FIG. 7 is such that the display field 206 in which the icon of the apparatus available for reservation is displayed is not present on the reception screen 200 illustrated in FIG. 15.

In the case of the reception screen 200 illustrated in FIG. 15, the reservation holder first opens a list table 212 in which the name of the apparatus or the like available for reservation is described by tapping the input field 203. Next, the reservation holder taps the name of the apparatus desired for reservation in the list table 212. Consequently, the icon of the selected monitor is displayed in the input field 203 in the same manner as the other example described above.

Since the cost of the reservation for the monitor is 50 yen per hour, the content of the display field 202 in which the content of the amount of money accompanied by the reservation is displayed is changed.

In a case where the input field 203 is tapped, the display field 206 described above may be displayed on the reception screen 200.

Example 4

Even in a case where an object is available for reservation along with the space 3, in actuality, the quantity available for reservation has an upper limit, and the object may not be installed in the reserved space 3 at the start of the reservation. For example, in a case where installation or change of the setting of the object or the like requires assistance, it is necessary to consider a time required for moving or operating the object.

In the present exemplary embodiment, the number of objects available for reservation is set based on the convenience of management by the provider performing the arrangement or change of the setting of the object or the like.

Figure 16:
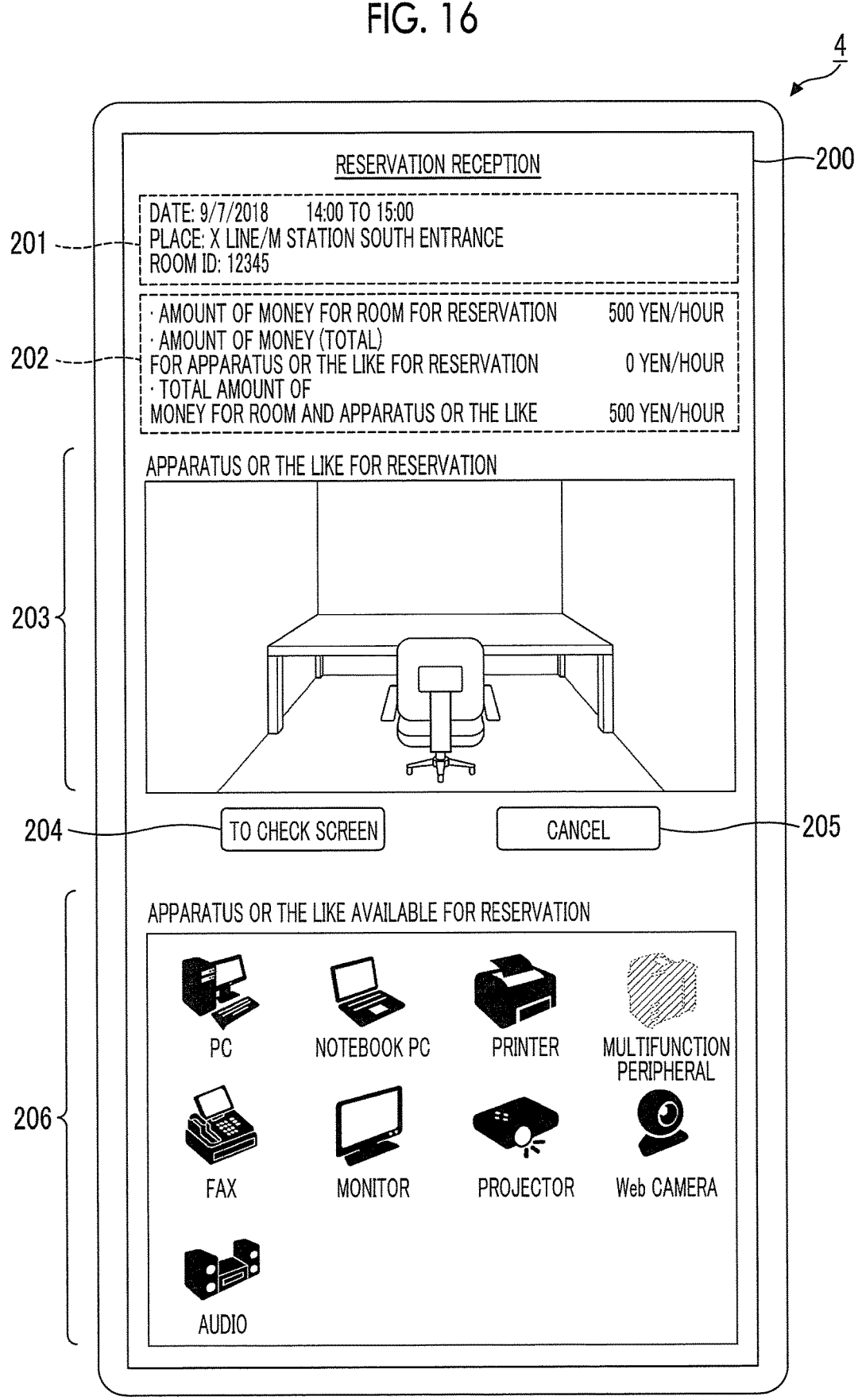
FIG. 16 is a diagram describing a display example of the reception screen in a case where the apparatus is temporarily not available for reservation.

FIG. 16 is a diagram describing a display example of the reception screen 200 used in a case where the apparatus is temporarily not available for reservation. In FIG. 16, parts corresponding to FIG. 6 are designated by corresponding reference signs.

In the present exemplary embodiment, the multifunction peripheral is set as the apparatus available for reservation for the space 3 managed by the room ID "12345" as illustrated in FIG. 6.

At the time of reservation for the space 3 managed by the room ID "12345", the reservation may be made for all of the prepared multifunction peripherals in association with another space 3.

In addition, even in a case where the time of reservation does not overlap, a vacant time required for moving the multifunction peripheral from the other space 3 to the subsequent space 3 may not be secured.

In FIG. 16, the multifunction peripheral temporarily not available for reservation is represented by displaying the icon in gray scale.

The display of the icon in gray scale may be used for representing the apparatus for which the reservation cannot be made in relation to a specific space 3.

Example 5

Figure 17:
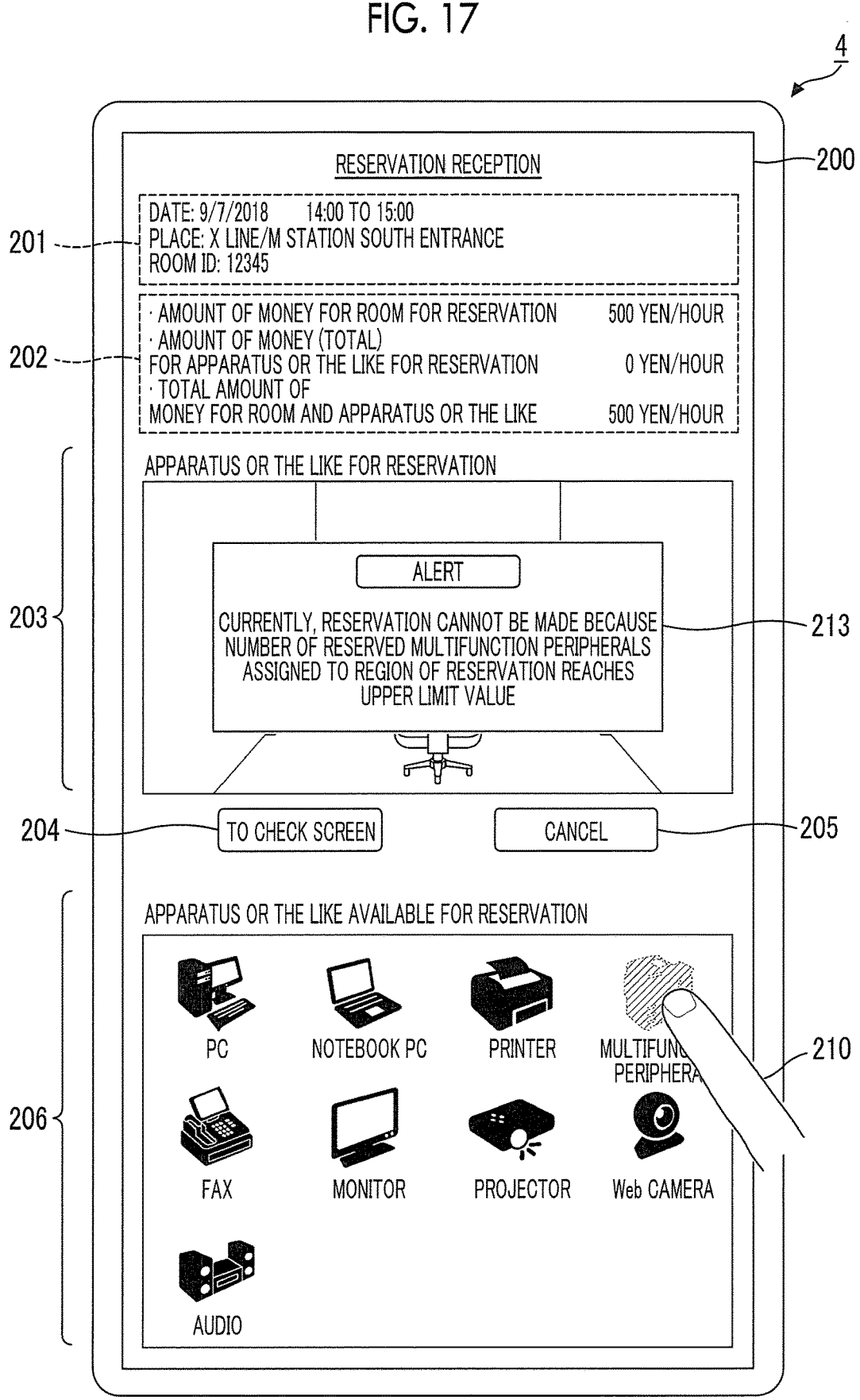
FIG. 17 is a diagram illustrating an example in which a screen for notifying the reservation holder that the apparatus is temporarily not available for reservation is displayed on the reception screen.

FIG. 17 is a diagram illustrating an example in which a screen for notifying the reservation holder that the apparatus is temporarily not available for reservation is displayed on the reception screen 200. In FIG. 17, parts corresponding to FIG. 16 are designated by corresponding reference signs.

In FIG. 17, in a case where the reservation holder taps the icon of the multifunction peripheral displayed in the display field 206 with the finger 210, an alert text 213 "Currently, the reservation cannot be made because the number of reserved multifunction peripherals assigned to the region of reservation reaches the upper limit value" is displayed in the input field 203.

By this display, even in a case where the reservation holder does not perceive the reason that the icon is displayed in gray scale, the reservation holder can be informed of the reason that the reservation cannot be made for the multifunction peripheral.

Example 6

Figure 18:
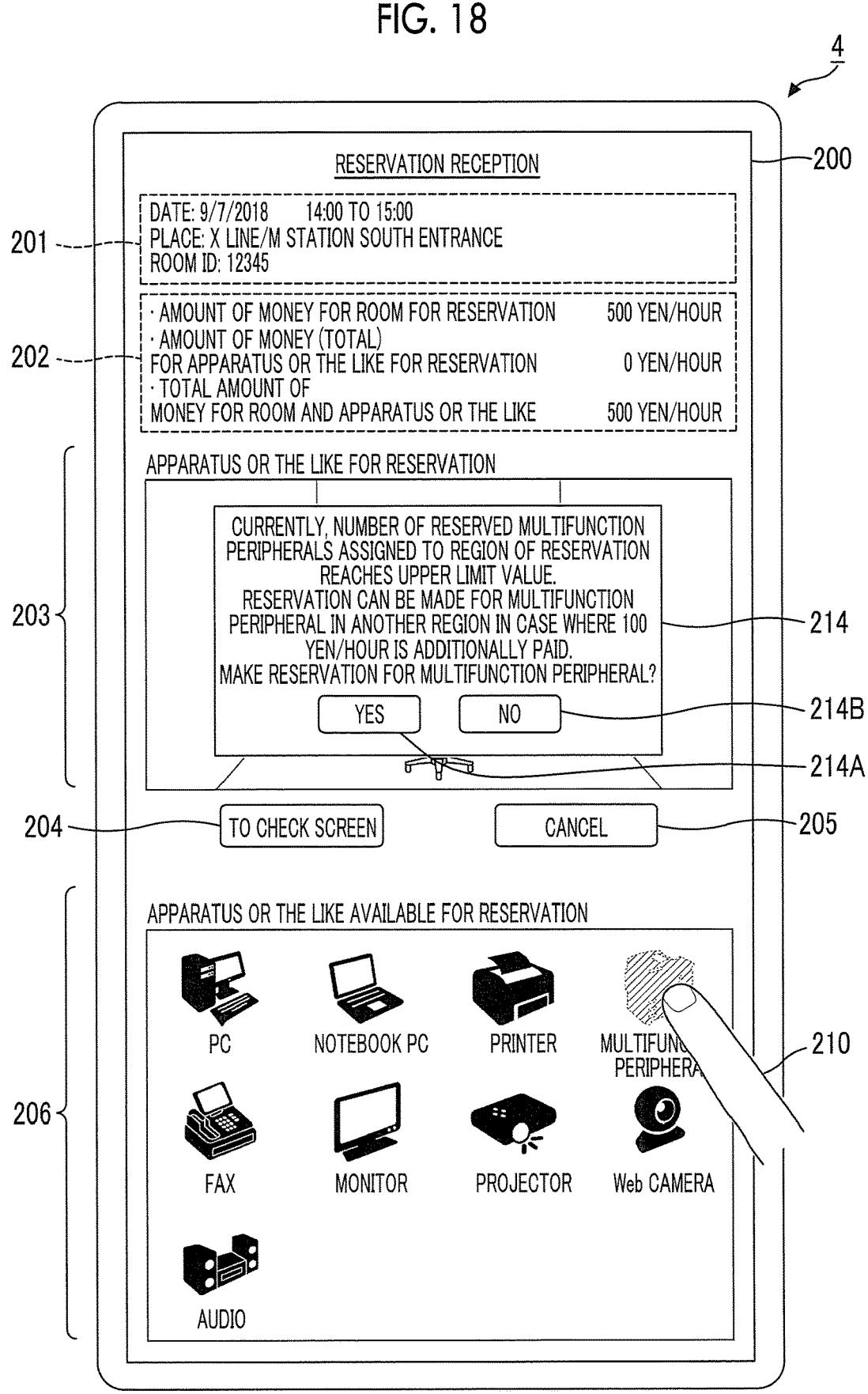
FIG. 18 is a diagram illustrating a display example of the reception screen enabling a reservation for the apparatus assigned to another region on condition that an additional amount of money is paid.

FIG. 18 is a diagram illustrating a display example of the reception screen 200 enabling the reservation for the apparatus assigned to another region on condition that an additional amount of money is paid. In FIG. 18, parts corresponding to FIG. 17 are designated by corresponding reference signs.

As described above, in a case where the object is included in the reservation target, it is necessary to deliver and set the reserved object in a specified place each time the reservation is made, except for a case where the object is set in the space 3 at all times. Thus, the region to which the object as the reservation target is delivered is set in advance. However, even in a case where the object is insufficient in a certain region, the reservation may not be made for the object in another region. In such a case, in a case where the object assigned to another region can be used in the reservation, the availability of the object is increased, and it is desired for both the reservation holder and the provider receiving the reservation.

Moving the object to another region requires additional effort.

FIG. 18 represents an example in which the reservation for the multifunction peripheral is received on condition that the reservation holder completes payment of the additional charge.

In FIG. 18, an inquiry text 214 displayed in the input field 203 displays three texts "Currently, the number of reserved multifunction peripherals assigned to the region of reservation reaches the upper limit value.", "The reservation can be made for the multifunction peripheral in another region in a case where 100 yen/hour is additionally paid.", and "Make the reservation for the multifunction peripheral?".

The first text is substantially the same as the alert text 213 illustrated in FIG. 17. The second text illustrates a condition for enabling the reservation. In this example, the condition is addition of 100 yen/hour. The third text is for checking whether or not to make the reservation even by paying 100 yen/hour. In a case where a button 214A is tapped with the finger 210, the icon of the multifunction peripheral is displayed in the input field 203. In a case where a button 214B is tapped with the finger 210, the reservation for the multifunction peripheral is not made, and a return is made to the state of the reception screen 200 illustrated in FIG. 16.

Example 7

While the above example describes a case where the candidate available for reservation in relation to the space 3 is the object, addition of a function to the reserved apparatus may be available for reservation.

Figure 19:
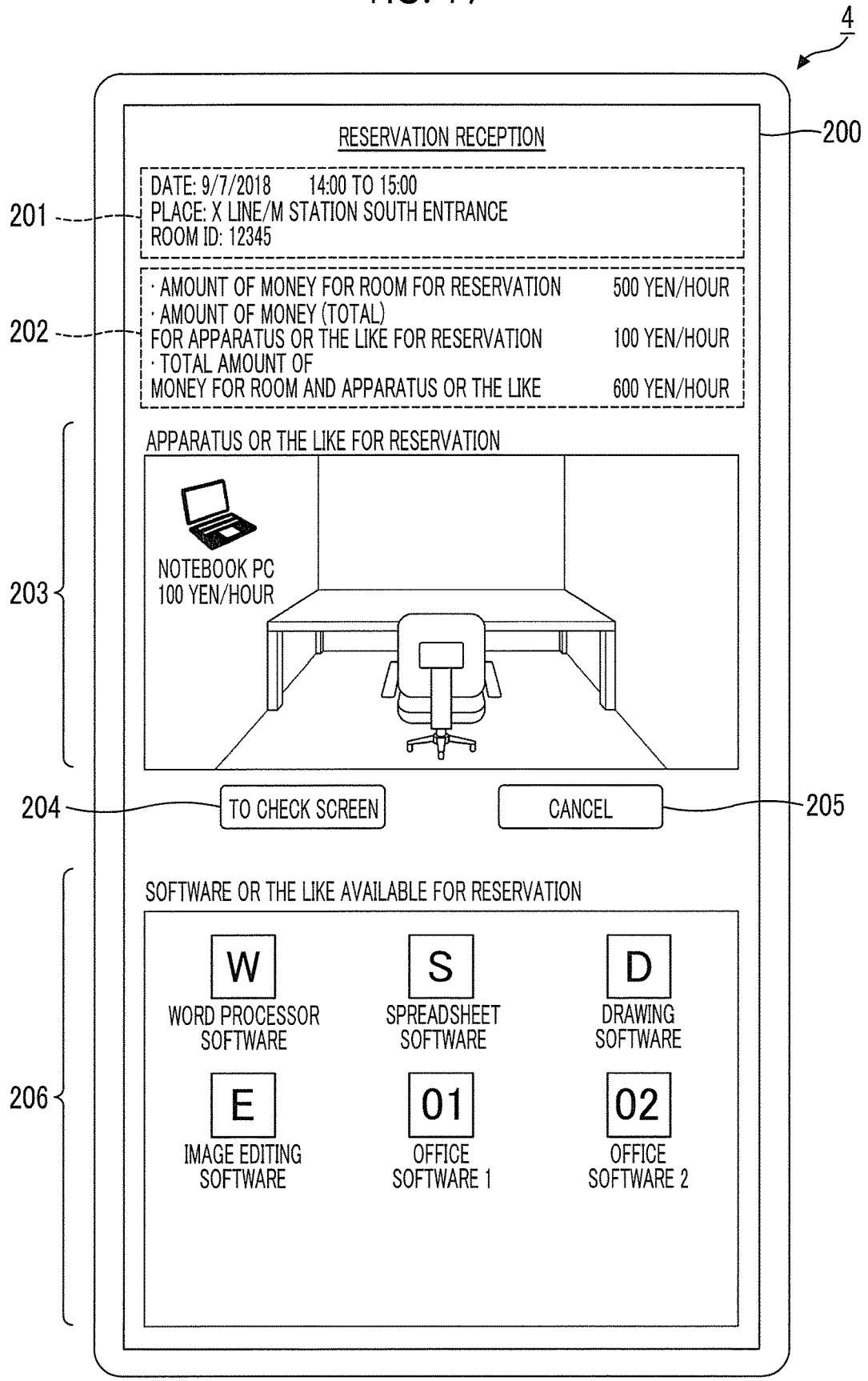
FIG. 19 is a diagram describing an example in which a reservation can be individually made for software executable in a notebook type computer reserved at 100 yen per hour.

FIG. 19 is a diagram describing an example in which the reservation can be individually made for software executable in the notebook type computer reserved at 100 yen per hour. In FIG. 19, parts corresponding to FIG. 6 are designated by corresponding reference signs.

The use of the computer may not only be charged but also be free of charge. For example, the computer may be installed at all times in the space 3 such that the reservation holder can freely use the computer.

The reservation for the software is not limited to two alternatives between enabling the use of all functions and forbidding the use of the whole functions. For example, the reservation for the software also includes a case where only a part of the functions can be used free of charge, and control is performed to set a state where all functions can be used in a case where an additional charge is paid.

In the example in FIG. 19, the title of the display field 206 is changed from "apparatus or the like available for reservation" to "software or the like available for reservation".

In FIG. 19, six pieces of software including word processor software, spreadsheet software, drawing software, image editing software, office software 1 as a collection of a plurality of software, and office software 2 including a different combination of software constituting the collection are illustrated as the software available for reservation.

While the icon of each software displayed in the display field 206 as the reservation target is represented by a different text in the example in FIG. 19, the icon may be distinguished by a combination of a color, a tone, a design, and the like.

A part of the software such as the office software starts providing a cloud service permitting the use of the latest software to a registered user. The registered user has a permission of use with a vendor of the software. Thus, in a case where the provider of the space collects a charge, the registered user is charged twice. Meanwhile, on the side of the provider of the space, it is not clear whether or not the reservation holder has a permission of use for specific software. Therefore, in the case of making the reservation for the software, for example, it is desired that a screen for checking whether or not the reservation holder has a permission of use for the software is displayed on the reception screen 200.

Figure 20:
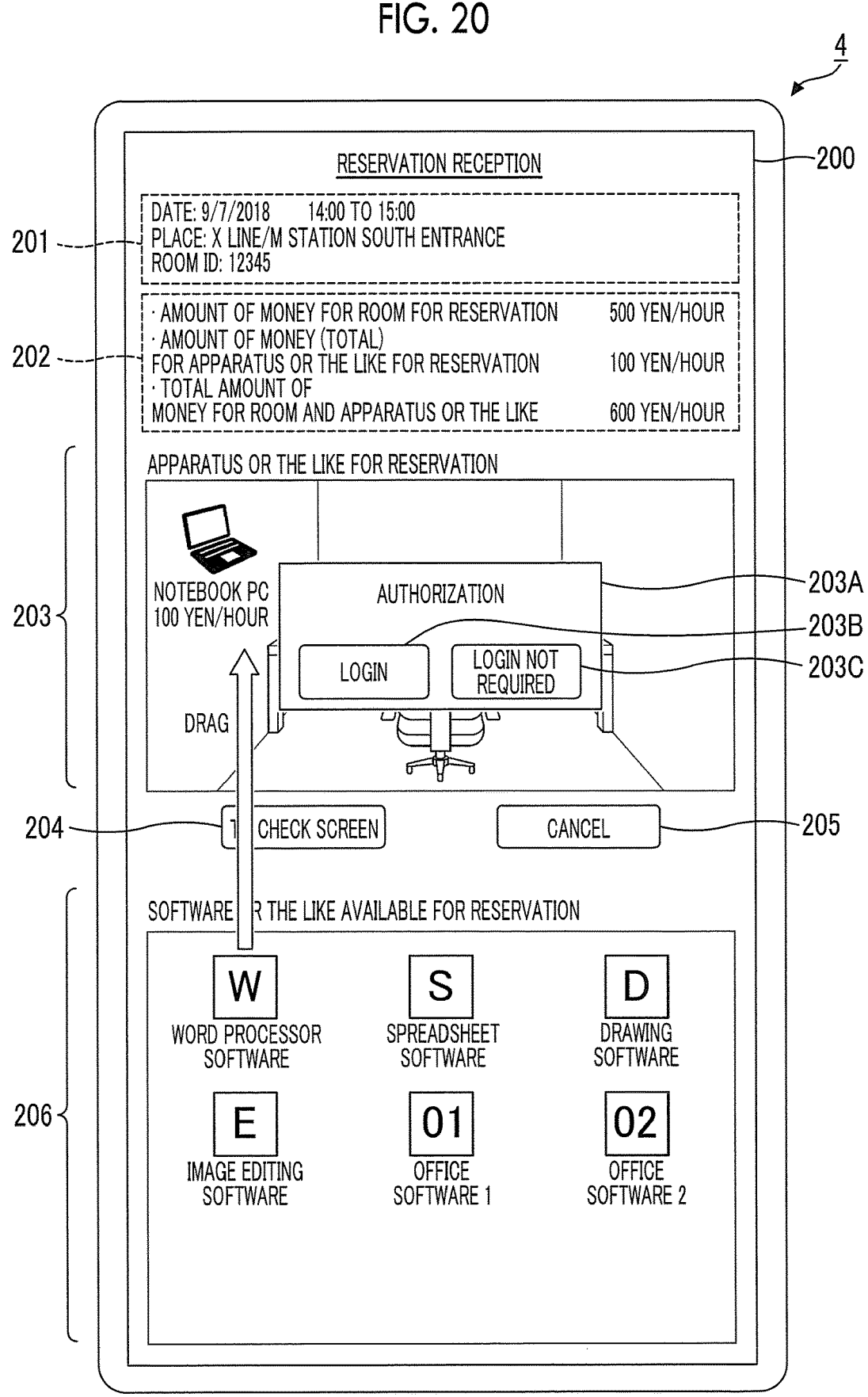
FIG. 20 is a diagram illustrating an example of an authentication screen for the software as a reservation target.

FIG. 20 is a diagram illustrating an example of an authentication screen 203A for the software as the reservation target. In FIG. 20, parts corresponding to FIG. 19 are designated by corresponding reference signs.

On the authentication screen 203A illustrated in FIG. 20, a title indicating authentication of the specified software is displayed, and a login button 203B and a login not required button 203C are arranged.

The login button 203B is a button operated by the registered user having a permission of use for the cloud service. In a case where the reservation holder operates the login button 203B, the reservation management server 5 (refer to FIG. 1) connects to a site of the vendor of the software and displays the authentication screen 203A on the reception screen 200.

In a case where the vendor checks that the reservation holder is the registered user for the software desired for reservation and has a permission of use for the cloud service, the reservation management server 5 excludes the reserved software from a charging target.

In a case where the software as the reservation target is not installed on the notebook type computer as the reservation target at the time of making the reservation, control is performed to set a state where the reservation holder can use the software in the reserved notebook type computer by, for example, downloading the software before the time of reservation starts.

The login not required button 203C is a button operated by the reservation holder who does not have a permission of use for the cloud service. In a case where the reservation holder operates the login not required button 203C, the authentication screen 203A is closed.

In the example in FIG. 20, one icon of the notebook type computer is arranged in the input field 203. Thus, the computer in which the reservation is made for the use of the software is uniquely specified. In a case where a plurality of icons of the notebook type computers are arranged, it is not clear which computer is to be set to be in a state where the software can be used.

Figure 21:
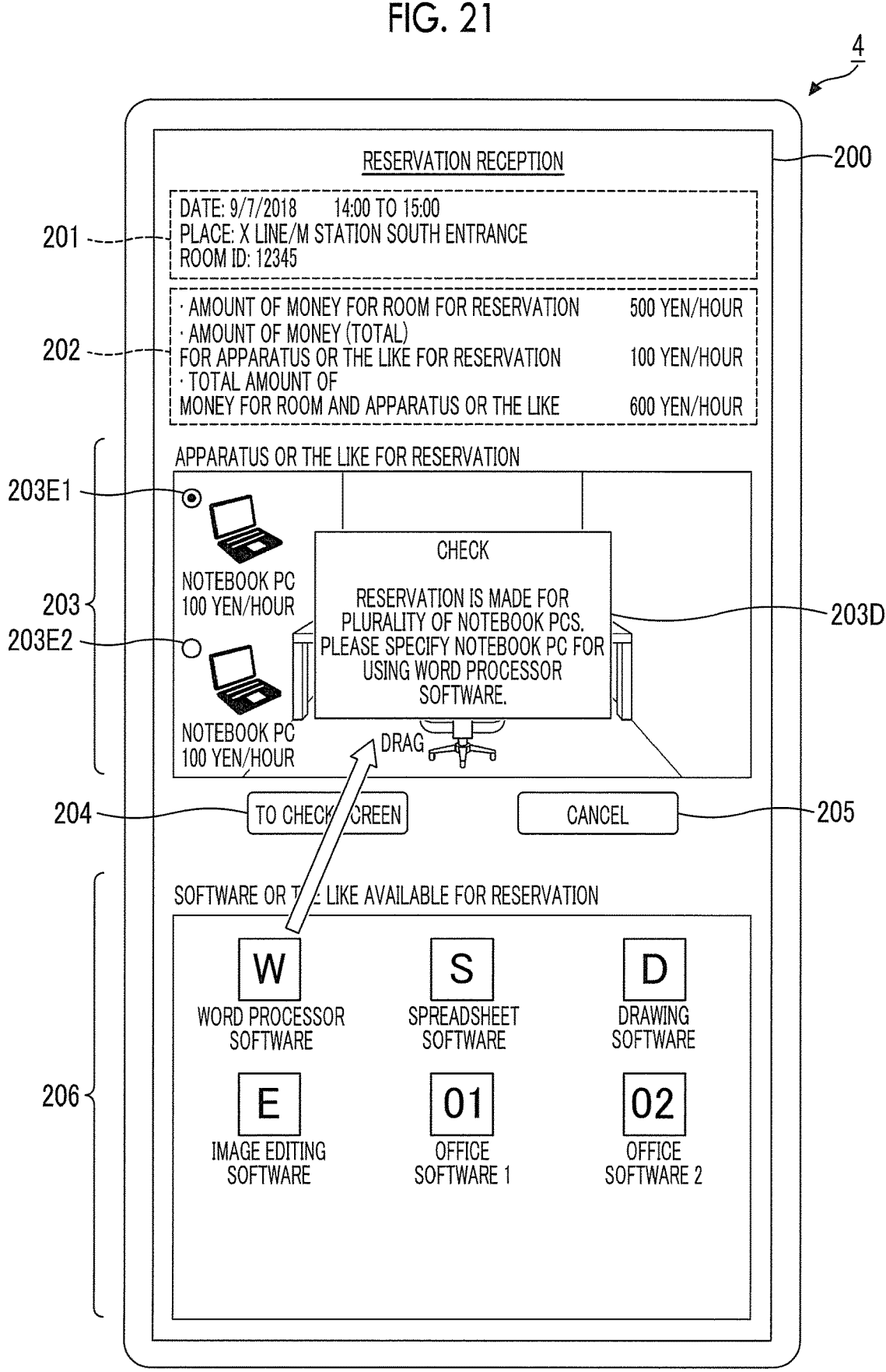
FIG. 21 is a diagram illustrating an example of a screen prompting specifying of the notebook type computer to which the software for reservation is linked.

FIG. 21 is a diagram illustrating an example of a screen prompting specifying of the notebook type computer to which the software for reservation is linked. In FIG. 21, parts corresponding to FIG. 19 are designated by corresponding reference signs.

In the example in FIG. 21, the icon of the word processor software is dragged into the input field 203 in a case where two icons of the notebook type computers are displayed in the input field 203.

At this point, in the input field 203, a check screen 203D is displayed, and a specifying buttons 203E1 and 203E2 are displayed in association with the icons of the notebook type computers.

For example, a description text "The reservation is made for a plurality of notebook PCs. Please specify a notebook PC for using the word processor software." is displayed on the check screen 203D illustrated in FIG. 21.

In the example in FIG. 21, an icon in the upper part of the input field 203 is specified by the reservation holder as a computer for using the word processor software. Thus, the specifying button 203E1 is changed to a display indicating a selection state.

The number of computers specified for using the word processor software is not limited to one. That is, the reservation can be made for the use of the word processor software in two computers as the reservation target. In this case, the specifying button 203E2 is also switched to the display of the selection state.

While operating the software in the computer requires base software and requires the specifications of the apparatus to satisfy requirements of the software, the computer available for reservation may not necessarily execute all software.

Figure 22:
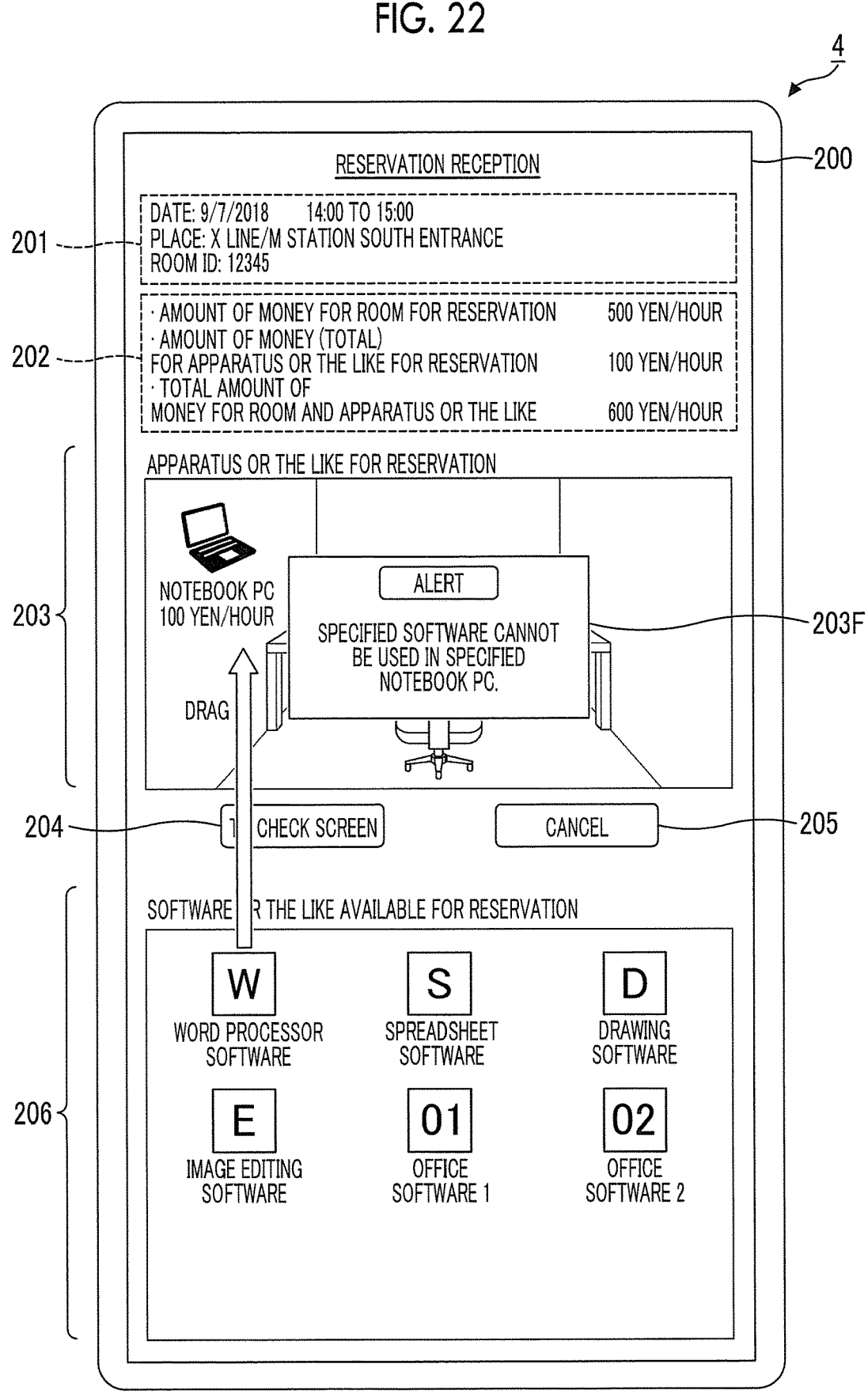
FIG. 22 is a diagram illustrating an example of a screen for reporting that the software for reservation cannot be executed in the notebook type computer for reservation.

FIG. 22 is a diagram illustrating an example of an alert screen 203F for reporting that the software for reservation cannot be executed in the notebook type computer for reservation. In FIG. 22, parts corresponding to FIG. 19 are designated by corresponding reference signs.

For example, a description text "The specified software cannot be used in the specified notebook PC." is displayed on the alert screen 203F illustrated in FIG. 22. By displaying the alert screen 203F, the reservation holder has to stop making the reservation for the software but can select whether or not to specify another computer satisfying the specifications as the reservation target.

Figure 23A:
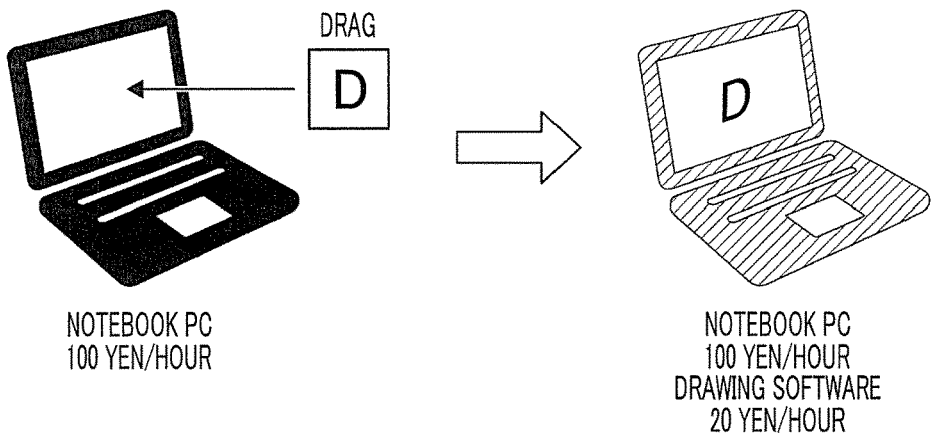
FIGS. 23A to 23C are diagrams describing a change of an icon in a case where an icon of the software for reservation is dragged into the input field.
Figure 23B:
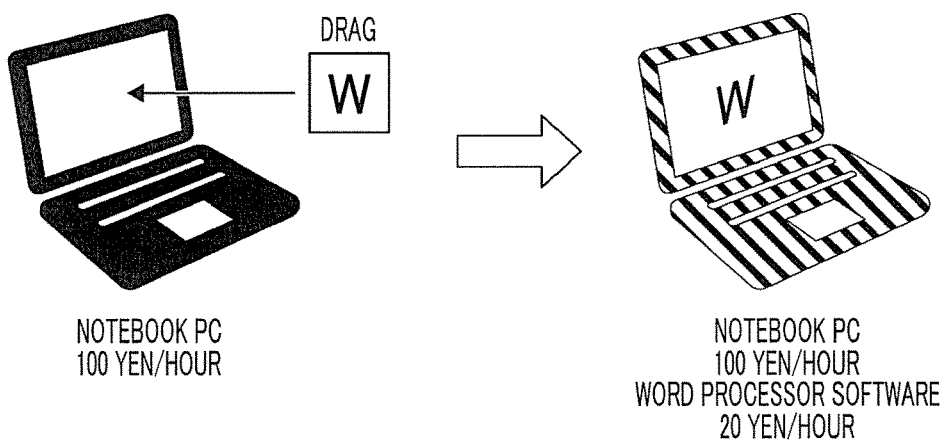
Figure 23C:
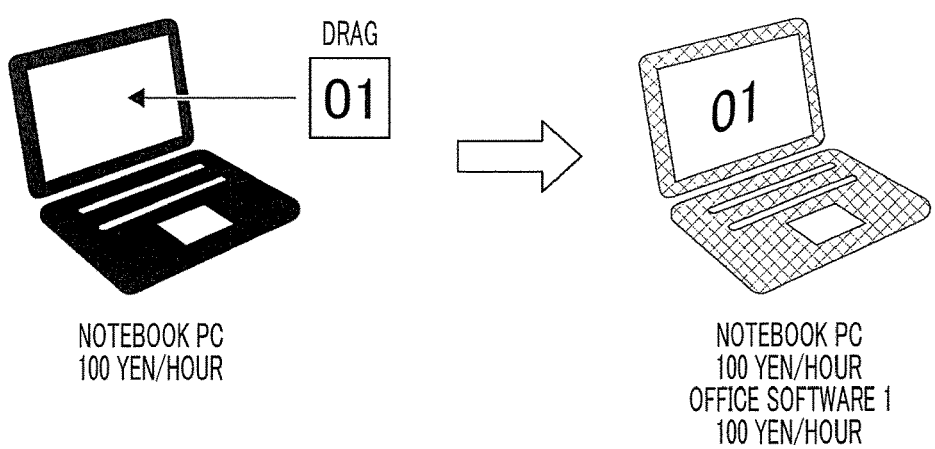

FIGS. 23A to 23C are diagrams describing a change of the icon in a case where the icon of the software for reservation is dragged into the input field 203. FIG. 23A illustrates a change of a display in a case where the icon of the drawing software is dragged. FIG. 23B illustrates a change of the display in a case where the icon of the word processor software is dragged. FIG. 23C illustrates a change of the display in a case where the icon of the office software 1 is dragged.

In FIGS. 23A to 23C, the icon of the computer is combined with a sign of the dragged icon of the software. Furthermore, the color of the icon is changed. The change of the icon is for informing the reservation holder that the reservation is received.

The icon of the software may be arranged on the icon of the apparatus in the input field 203 (refer to FIG. 19) by copying & pasting the icon of the software.

In addition, in the example in FIGS. 23A to 23C, the content of the amount of money displayed along with the icon is changed after addition of the function. For example, a representation indicating the content of the reserved software and the amount of money is added to a case where only 100 yen per hour is displayed in the case of making the reservation for the notebook type computer alone.

Whether or not the software can be started may be controlled by the reservation information update control unit 115 (refer to FIG. 4). For example, the start of the software is managed by switching a password or an account.

Example 8

While Example 7 describes a case where the reservation is individually made for the software desired to be executed in the computer, a case where the reservation is individually made for a function included in the apparatus or the like as the reservation target will be described here.

Figure 24:
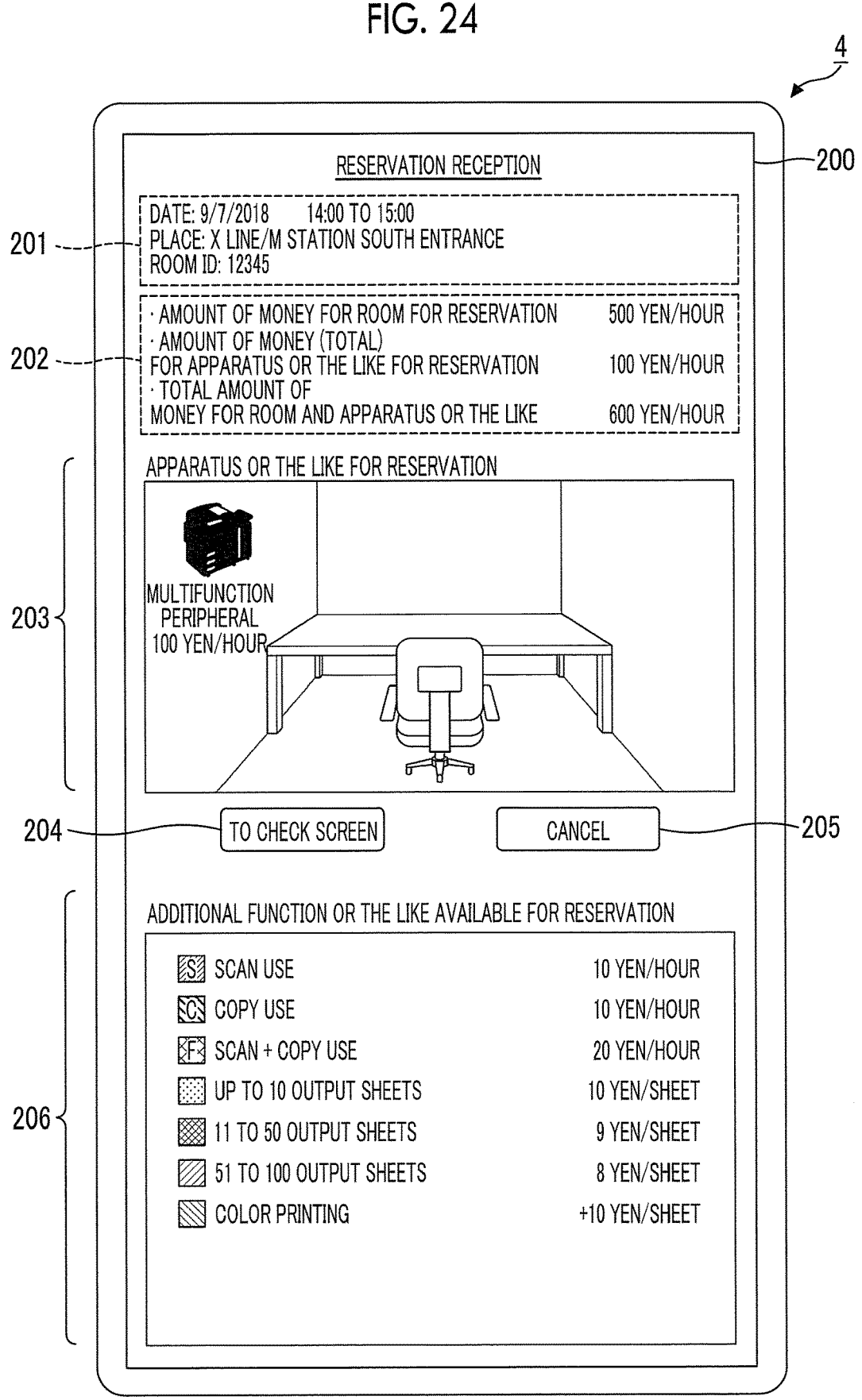
FIG. 24 is a diagram describing an example in which the reservation is individually made for a function included in a multifunction peripheral as a reservation target.

FIG. 24 is a diagram describing an example in which the reservation is individually made for a function included in the multifunction peripheral as the reservation target. In FIG. 24, parts corresponding to FIG. 6 are designated by corresponding reference signs.

In this example, even in a case where the function is included in the multifunction peripheral, it is necessary to make the reservation for using the function. The reservation can be made not only in advance but also after the start of the time of reservation.

In FIG. 24, the title of the display field 206 is the "additional function or the like available for reservation". In FIG. 24, using the scan function requires 10 yen per hour. Using the copy function requires 10 yen per hour. Using both of the scan function and the copy function requires 20 yen per hour. In addition, the reservation can be made at a charge of 10 yen per sheet for up to 10 output sheets. The reservation can be made at a charge of 9 yen per sheet for 11 to 50 output sheets. The reservation can be made at a charge of 8 yen per sheet for 51 to 100 output sheets. In addition, the reservation can be made for color printing in a case where 10 yen per sheet is added. In the present exemplary embodiment, in a case where the actual number of output sheets reaches the reserved number of sheets, the output of the paper is stopped until confirmation of a new reservation.

Figure 25A:
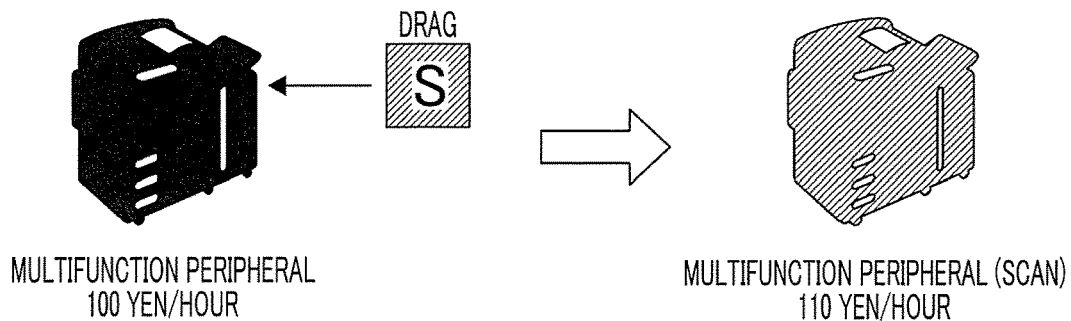
FIGS. 25A to 25C are diagrams describing a change of an icon in a case where an icon of a function available for reservation is dragged into the input field.
Figure 25B:
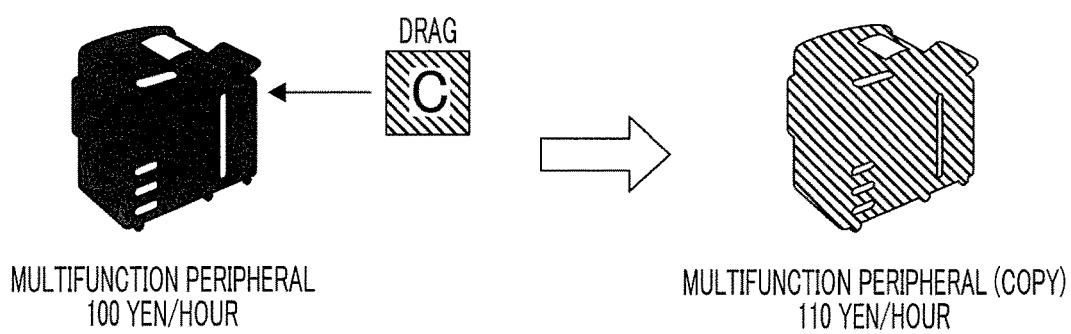
Figure 25C:
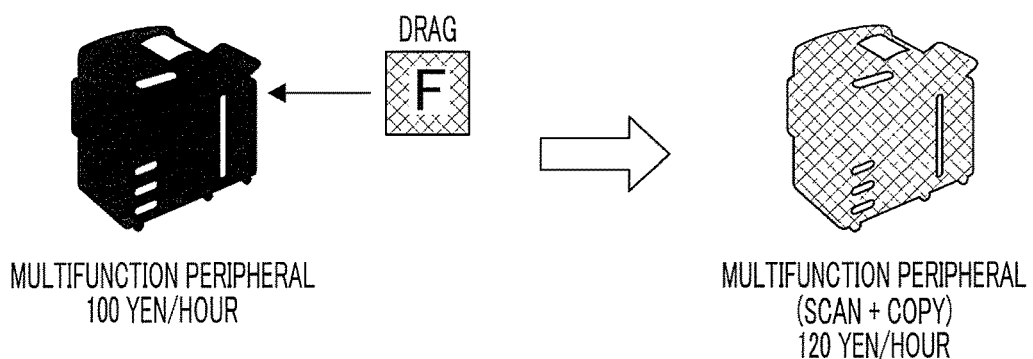

FIGS. 25A to 25C are diagrams describing a change of the icon in a case where an icon of a function available for reservation is dragged into the input field 203. FIG. 25A illustrates a change of the display in a case where an icon of a scan function S is dragged. FIG. 25B illustrates a change of the display in a case where an icon of a copy function C is dragged. FIG. 25C illustrates a change of the display in a case where an icon of a function F corresponding to both of the scan function and the copy function is dragged.

In FIGS. 25A to 25C, the color of the icon of the multifunction peripheral is changed to the color of the dragged icon. In FIGS. 25A to 25C, the name of the multifunction peripheral is changed depending on the content of the added function. For example, in the case of the reservation for enabling the use of the scan function, the name of the multifunction peripheral is changed to "multifunction peripheral (scan)". The change of the icon is for informing the reservation holder that the reservation is received.

In addition, in the example in FIGS. 25A to 25C, the content of the amount of money displayed along with the icon is changed. For example, for the multifunction peripheral in which the reservation is made for the scan function, 100 yen per hour is changed to 110 yen per hour. In addition, for example, for the multifunction peripheral in which the reservation is made for the function of both of the scan function and the copy function, 100 yen per hour is changed to 120 yen per hour.

The availability of each function and the limitation of the number of output sheets may be controlled by the reservation information update control unit 115 (refer to FIG. 4).

While the addition of the function is implemented by dragging the icon in FIGS. 25A to 25C, the addition of the function may be executed by copying & pasting the icon. In addition, while the color of the multifunction peripheral is changed by arranging the icon indicating the function in FIGS. 25A to 25C, the design, the dimension, and the like of the icon may be changed.

Example 9

While the above example describes a case where the reservation is individually made for the object associated with the space 3 (refer to FIG. 1), it is convenient for the reservation holder in a case where a past reservation can be used.

Figure 26:
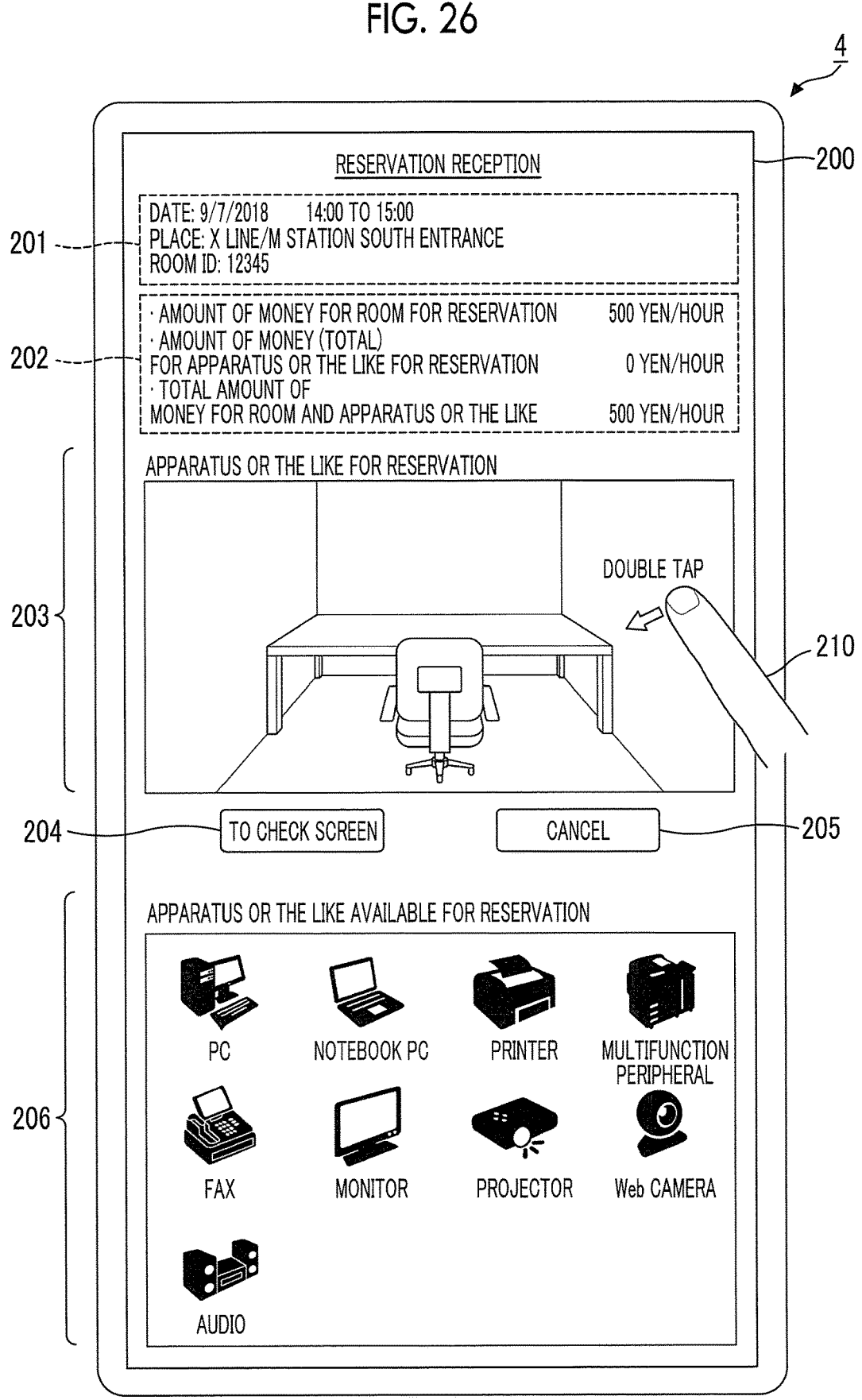
FIG. 26 is a diagram describing an example of the reception screen on which a past reservation used by the reservation holder can be read.

FIG. 26 is a diagram describing an example of the reception screen 200 on which a past reservation used by the reservation holder can be read. In FIG. 26, parts corresponding to FIG. 6 are designated by corresponding reference signs.

The example in FIG. 26 is a case where double tapping of the input field 203 is registered as an operation for the reservation holder to read the content of the past reservation. Accordingly, the double tapping illustrated in FIG. 26 is one example of an operation used for reading the content of the past reservation.

Figure 27:
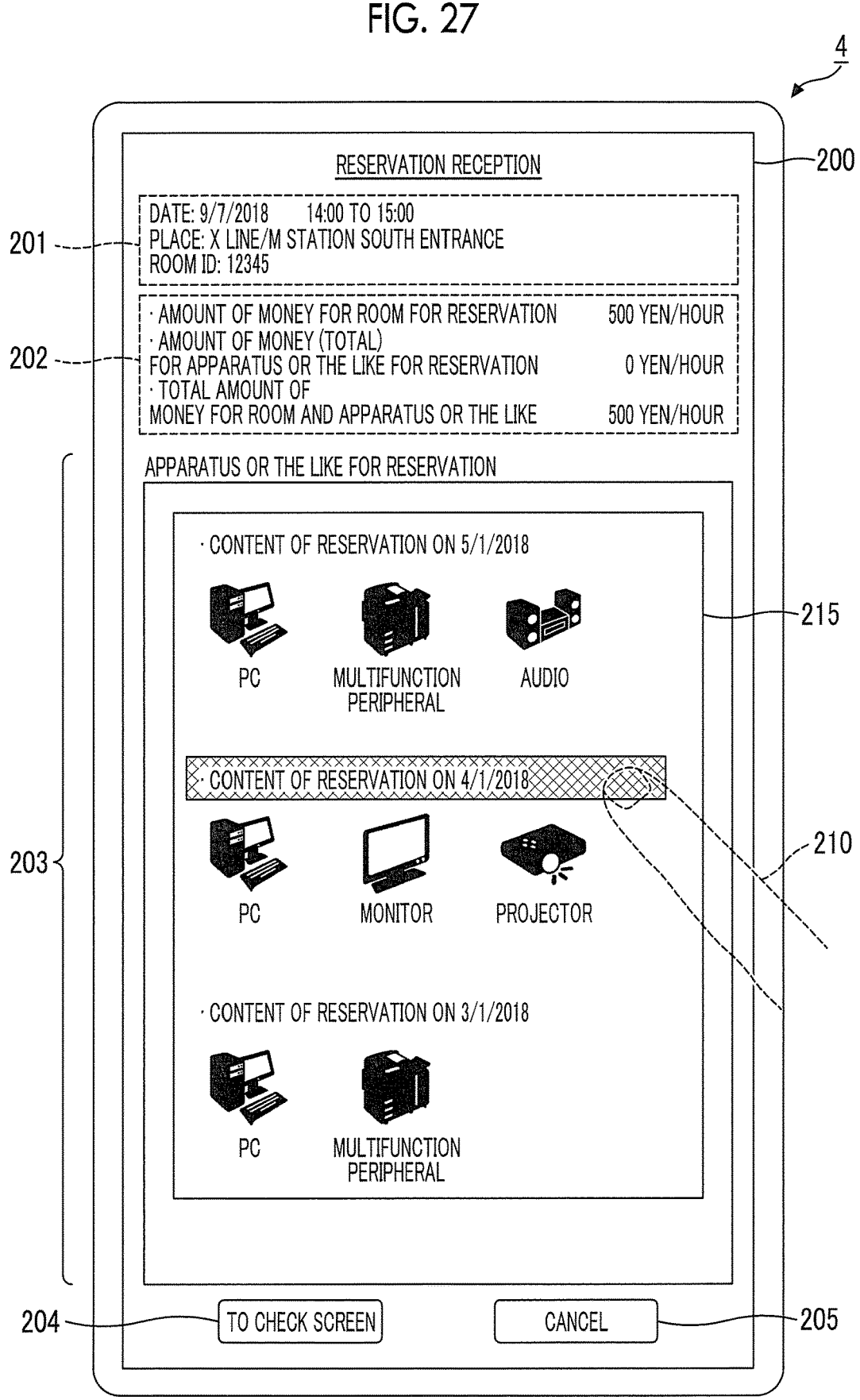
FIG. 27 is a diagram illustrating an example of the reception screen on which the display field showing the read content of the past reservation is displayed.

FIG. 27 is a diagram illustrating an example of the reception screen 200 on which a display field 215 showing the read content of the past reservation is displayed. In FIG. 27, parts corresponding to FIG. 6 are designated by corresponding reference signs.

In the display field 215 illustrated in FIG. 27, three dates are displayed as records of past reservations recorded for the reservation holder performing the operation. The dates are "Mar. 1, 2018", "Apr. 1, 2018", and "May 1, 2018" in order from the oldest. The time at which the past reservation is executed may also be displayed. This information is read from the reservation management database 120 (refer to FIG. 4) and displayed.

In the reservation on "Mar. 1, 2018", the reservation is made for the desktop type computer (PC) and the multifunction peripheral. In the reservation on "Apr. 1, 2018", the reservation is made for the desktop type computer (PC), the monitor, and the projector. In the reservation on "May 1, 2018", the reservation is made for the desktop type computer (PC), the multifunction peripheral, and the audio apparatus.

In FIG. 27, the reservation on "Apr. 1, 2018" is selected with the finger 210 among the three reservations. In FIG. 27, the selected state is represented by hatching the selection.

Example 10

While the above example assumes the case of making the reservation for one space 3 on the reception screen 200, the reservation can be made for the plurality of spaces 3 at once.

Figure 28:
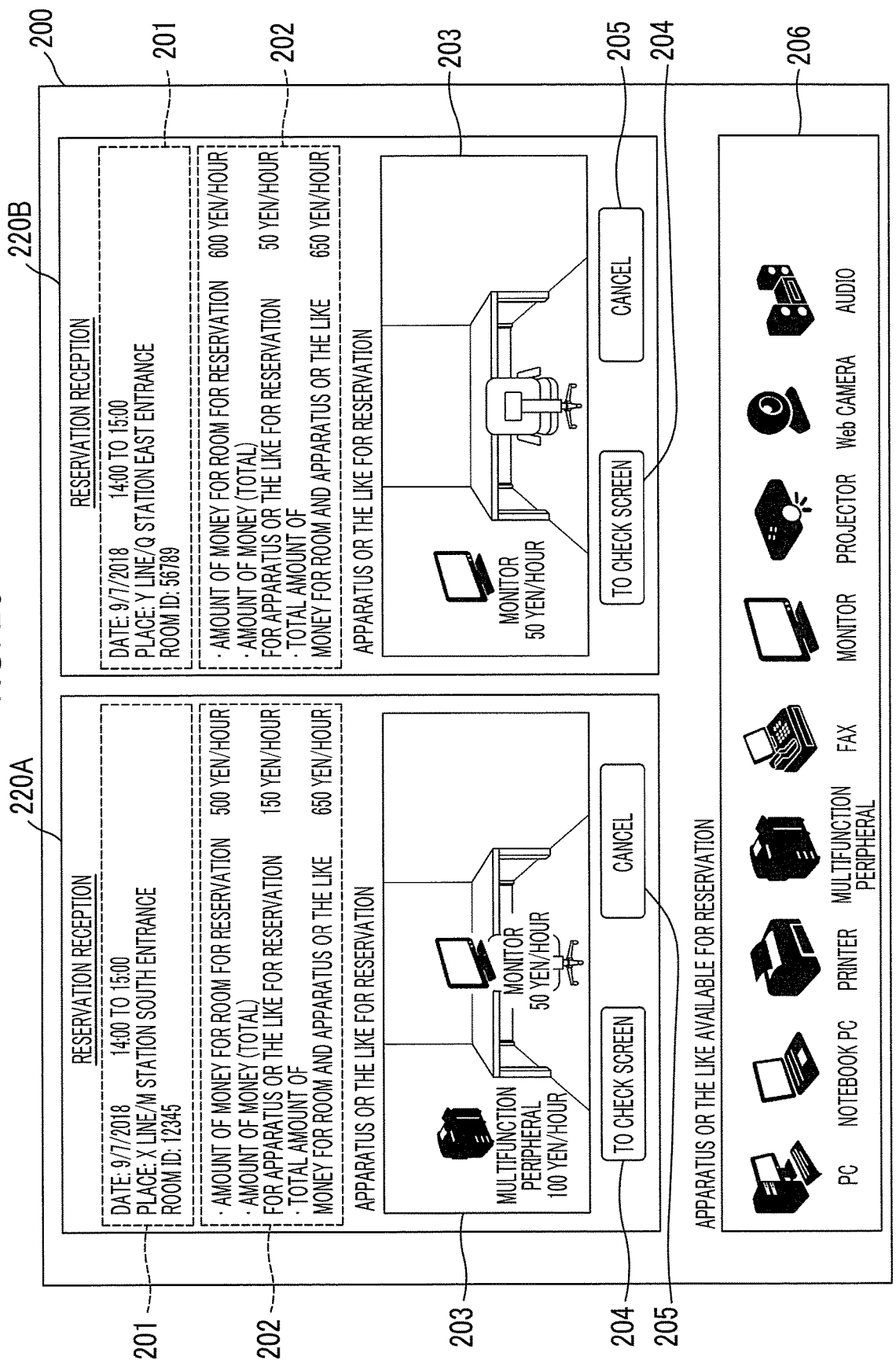
FIG. 28 is a diagram illustrating one example of a case where a plurality of screens corresponding to a plurality of spaces are arranged on the reception screen.

FIG. 28 is a diagram illustrating one example of a case where a plurality of screens 220A and 220B corresponding to the plurality of spaces 3 are arranged on the reception screen 200. In FIG. 28, parts corresponding to FIG. 6 are designated by corresponding reference signs.

The example in FIG. 28 is a case where the number of spaces 3 as the reservation target is two. In this example, each item of the reception screen 200 illustrated in FIG. 6 except the display field 206 is arranged in two screens 220A and 220B.

The screen 220A is for making the reservation for the space 3 managed by the room ID "12345", and the reservation is made for the use of the multifunction peripheral and the monitor. In addition, the screen 220B is for making the reservation for the space 3 managed by the room ID "56789", and the reservation is made for the use of the monitor.

Figure 29:
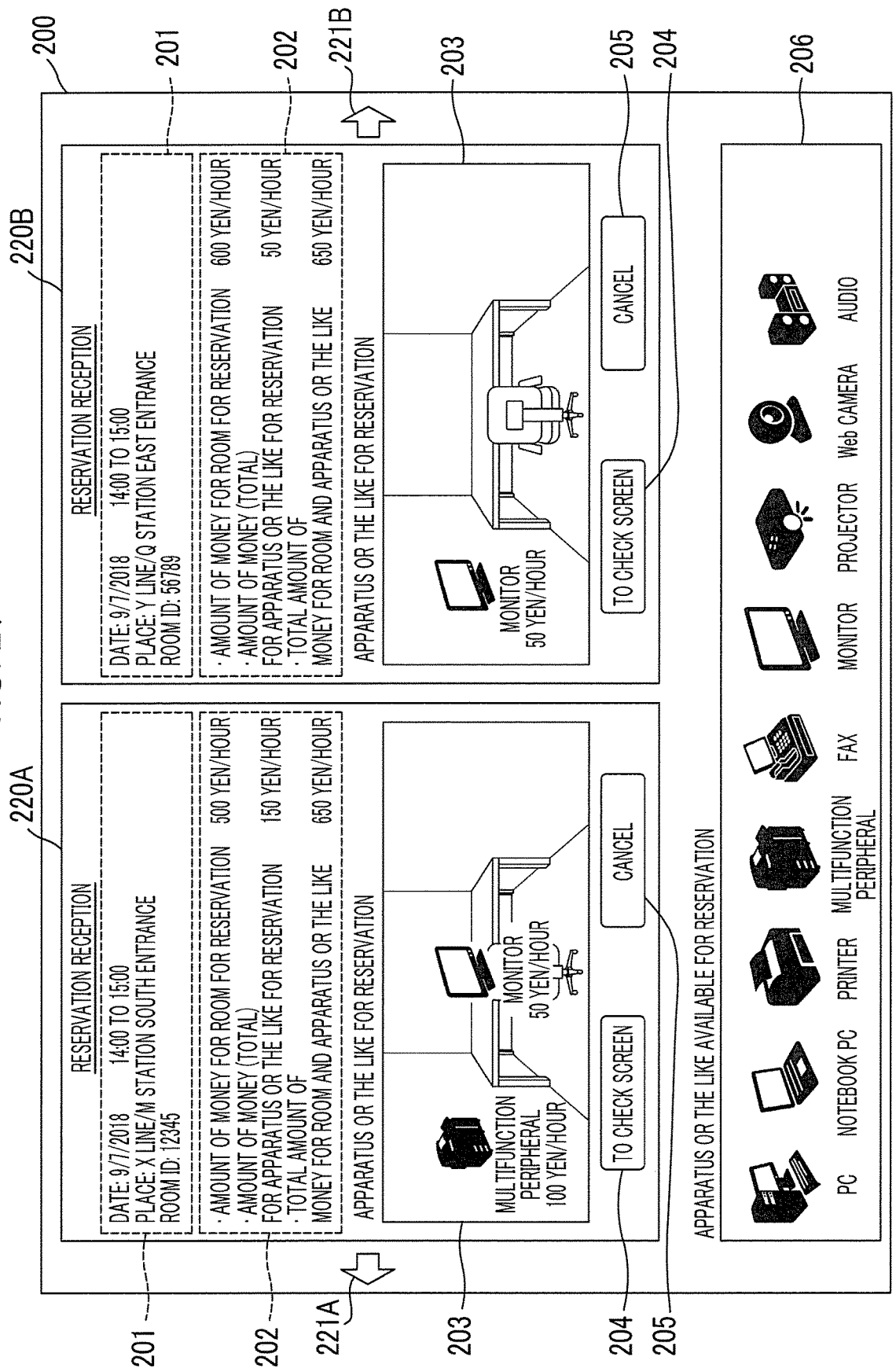
FIG. 29 is a diagram illustrating an example of the reception screen on which a case where a reservation is made for four or more spaces at once is assumed.

FIG. 29 is a diagram illustrating an example of the reception screen 200 on which a case where the reservation is made for four or more spaces 3 at once is assumed. In FIG. 29, parts corresponding to FIG. 28 are designated by corresponding reference signs.

In FIG. 29, the presence of a screen not displayed on the reception screen 200 is indicated by arrow 221A displayed on the left side of the screen 220A and arrow 221B displayed on the right side of the screen 220B. Instead of the display by arrow 221A and arrow 221B, the presence of the non-illustrated screen corresponding to the space 3 as the reservation target may be indicated using a scroll bar.

Figure 30:
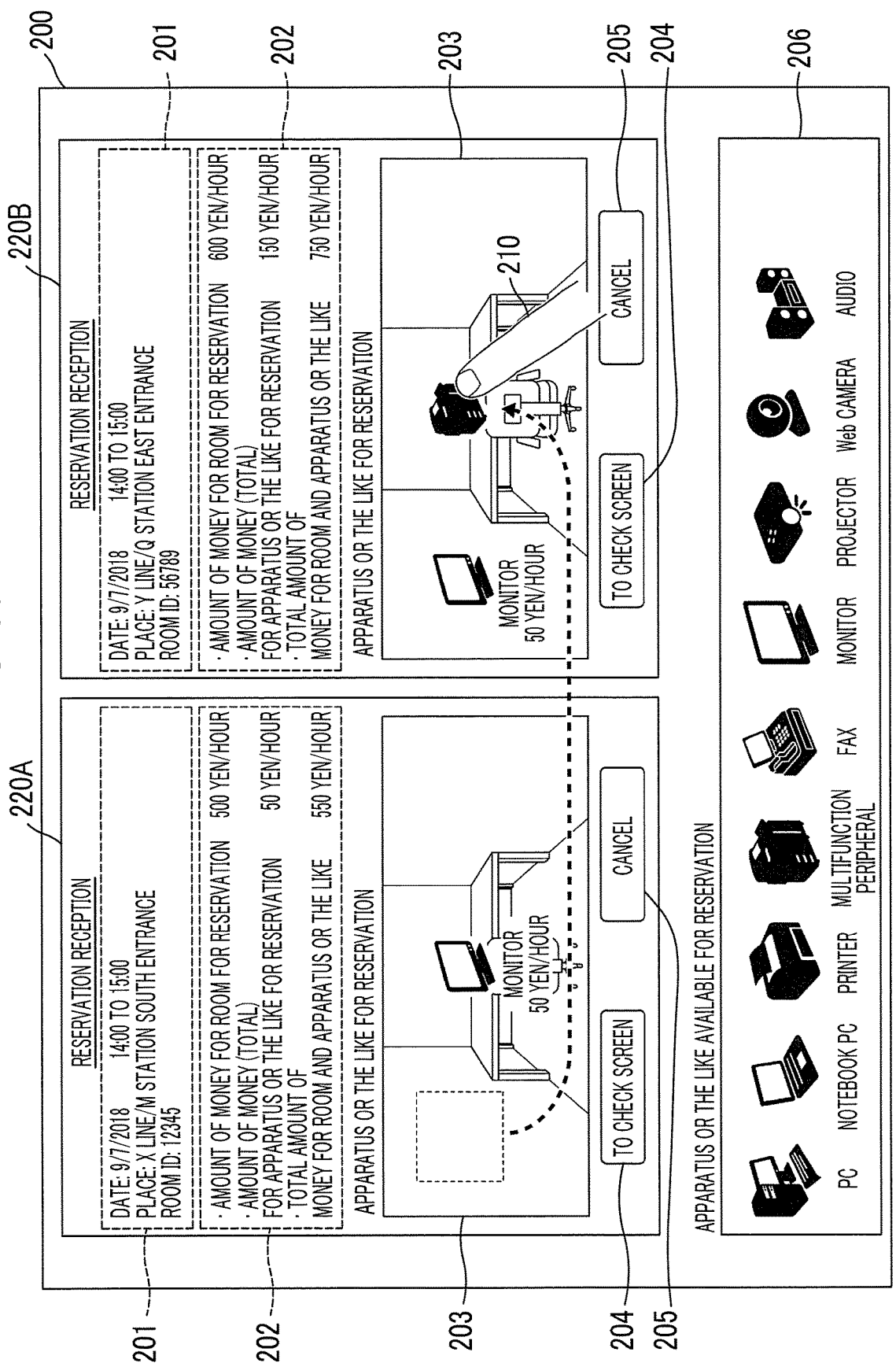
FIG. 30 is a diagram describing a movement of an icon between screens used in making a reservation for two spaces.

FIG. 30 is a diagram describing a movement of the icon between the screens 220A and 220B used in making the reservation for two spaces 3. In FIG. 30, parts corresponding to FIG. 28 are designated by corresponding reference signs.

The movement of the icon representing the apparatus as the reservation target can be performed not only in the display field 206 but also between the screens 220A and 220B corresponding to individual spaces 3. In FIG. 30, the icon of the multifunction peripheral arranged in the input field 203 of the space 3 managed by the room ID "12345" is dragged with the finger 210 into the input field 203 of the space 3 managed by the room ID "56789".

By this movement, the total amount of money for the apparatus for reservation among the amounts of money in the display field 202 of the space 3 managed by the room ID "12345" is changed from 150 yen per hour to 50 yen per hour. Consequently, the total amount of money accompanied by the reservation for the room and the apparatus is changed from 650 yen per hour to 550 yen per hour.

The total amount of money for the apparatus for reservation among the amounts of money in the display field 202 of the space 3 managed by the room ID "56789" is changed from 50 yen per hour to 150 yen per hour. Consequently, the total amount of money accompanied by the reservation for the room and the apparatus is changed from 650 yen per hour to 750 yen per hour.

This change in amount of money is implemented through the functions of the reception screen display control unit 113 (refer to FIG. 4) and the reservation information update control unit 115 (refer to FIG. 4) detecting the change of the image.

Figure 31:
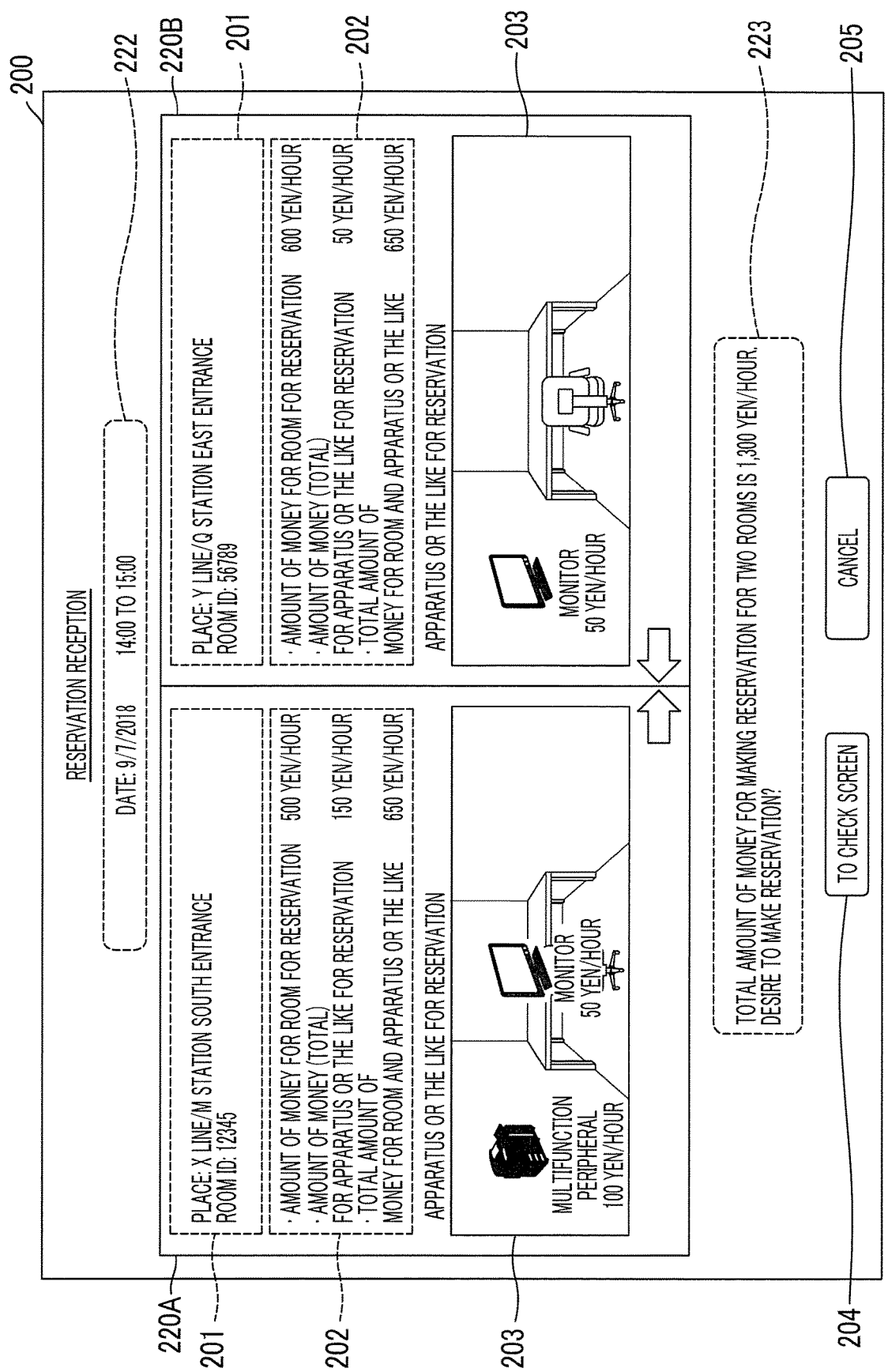
FIG. 31 is a diagram describing an example of the reception screen on which reservation screens corresponding to two spaces are connected.

FIG. 31 is a diagram describing an example of the reception screen 200 on which the reservation screens 220A and 220B corresponding to two spaces 3 are connected. In FIG. 31, parts corresponding to FIG. 30 are designated by corresponding reference signs.

For example, the connection between the screens 220A and 220B illustrated in FIG. 31 occurs in a case where an operation of approaching two reservation screens 220A and 220B together is performed as illustrated by arrows directed toward each other.

In FIG. 31, the date and time of reservation are the same. Thus, a display field 222 showing the date and time of reservation is separately disposed. For example, such display is used in a case where a web conference is performed between two spaces 3. In addition, the display is used in the case of finding the total amount of money for the reservation.

On the reception screen 200 illustrated in FIG. 31, a display field 223 that shows the total amount of money required in a case where the reservations corresponding to two connected screens 220A and 220B are confirmed is newly displayed. In the example in FIG. 31, the display field 223 shows that total 1,300 yen per hour is required.

The display in FIG. 31 is implemented in cooperation among the reception screen display control unit 113 (refer to FIG. 4), the reservation information update control unit 115 (refer to FIG. 4), and the plural reservation coordination unit 117 (refer to FIG. 4).

The display of the reception screen 200 illustrated in FIG. 31 is not limited to a case where the reservation holder performs the operation of connecting two screens 220A and 220B after arranging the icon for reservation in relation to each space 3 is arranged. For example, the display of the reception screen 200 is implemented by connecting two screens 220A and 220B corresponding to the spaces 3 as the reservation target in advance and then, arranging the icon representing the apparatus or the like to be associated with each space 3.

The latter is an example in which the reservation information is updated in response to a change of the display of the image associated with the space 3 caused by the arrangement of the icon.

The reception screen 200 illustrated in FIG. 31 may not only be implemented by the operation of connecting two screens 220A and 220B but also be implemented by operating a switch button, not illustrated.

In addition, a return to the reception screen 200 illustrated in FIG. 30 can be made from the reception screen 200 illustrated in FIG. 31.

Figure 32:
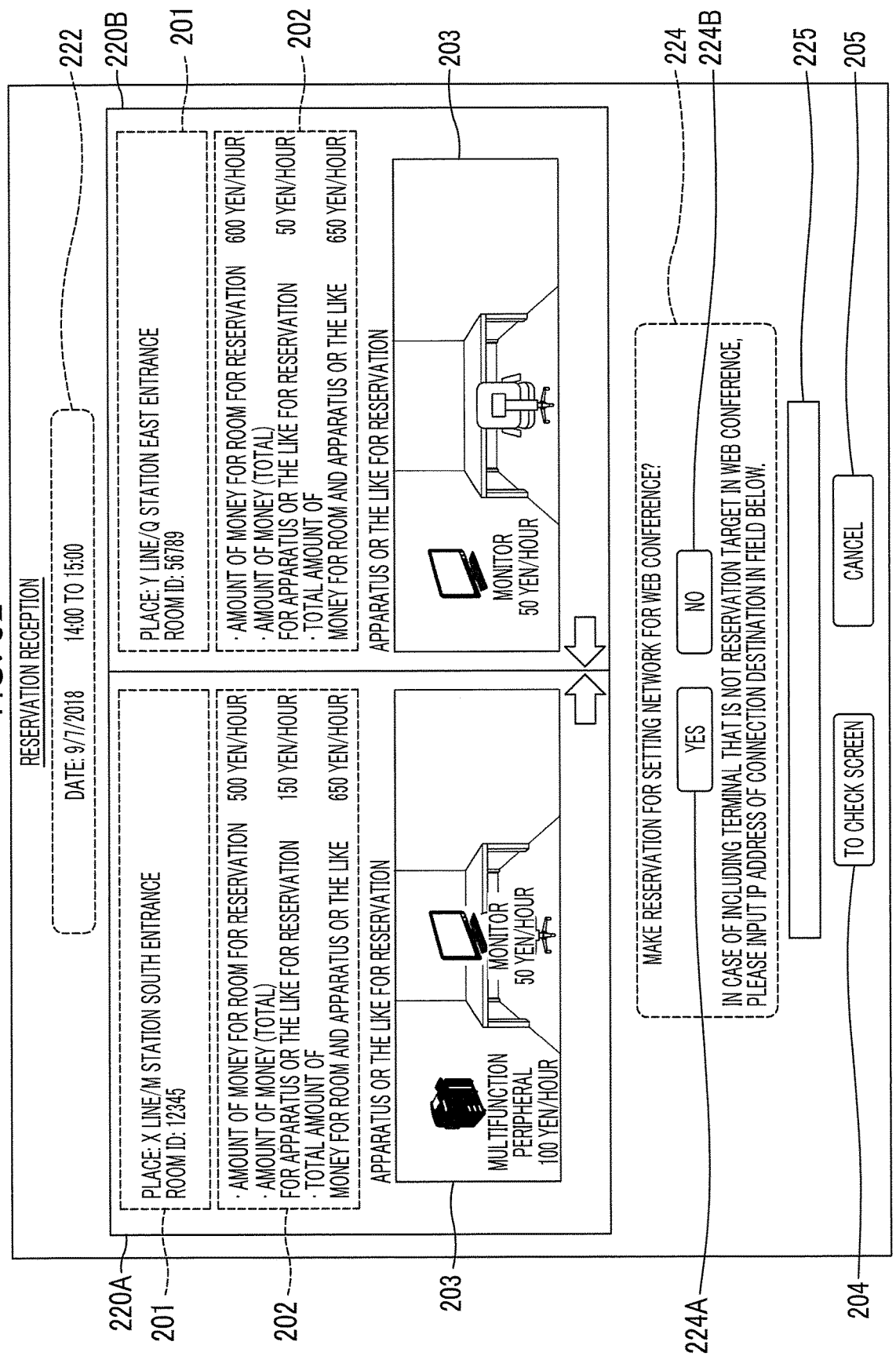
FIG. 32 is a diagram describing a case where a screen for checking whether or not to perform web conference communication setting between two spaces corresponding to two connected screens is displayed.

FIG. 32 is a diagram describing a case where a text screen 224 for checking whether or not to set communication for a web conference between two spaces 3 corresponding to two connected screens 220A and 220B is displayed. In FIG. 32, parts corresponding to FIG. 31 are designated by corresponding reference signs.

The text screen 224 displays an inquiry as to whether or not the reservation for setting the web conference is desired for the spaces 3 corresponding to two connected screens 220A and 220B. In a case where a button 224A for "yes" is tapped, setting of the network is remotely executed by the reservation management server 5 (refer to FIG. 1). A manual operation of the operation person on site is not impeded. In a case where a button 224B for "no" is tapped, the setting of the network for the web conference is not executed.

Furthermore, a field 225 for inputting an IP address required for including a terminal that is not the reservation target in the web conference is disposed on the text screen 224 illustrated in FIG. 32.

In a case where the reservation is made for the web conference, the reservation holder entering the space 3 at the time of reservation can start the web conference without an operation for the web conference.

While the reservation for setting the network for the web conference is checked by the reservation holder on the text screen 224 illustrated in FIG. 32, the setting of the network for the web conference may be executed between terminals installed in two spaces 3 without checking by the reservation holder in a case where two screens 220A and 220B corresponding to two spaces 3 are connected.

Figure 33:
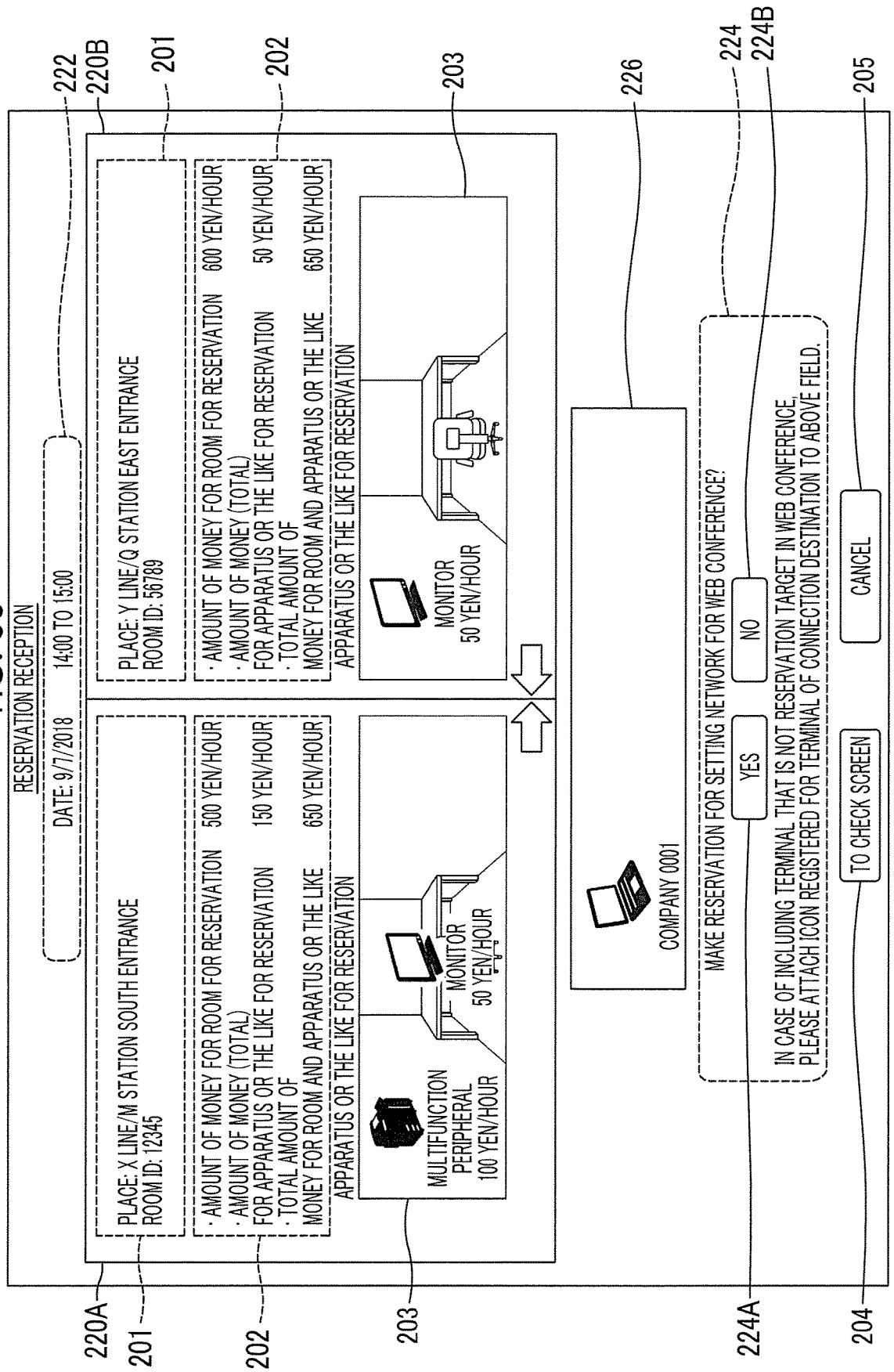
FIG. 33 is a diagram describing another display example of the screen for checking whether or not to perform web conference communication setting between two spaces corresponding to two connected screens.

FIG. 33 is a diagram describing another display example of the text screen 224 for checking whether or not to set communication for the web conference between two spaces 3 corresponding to two connected screens 220A and 220B.

In FIG. 33, parts corresponding to FIG. 32 are designated by corresponding reference signs.

In FIG. 33, an input field 226 for attaching an icon for specifying the terminal desired to be included in the web conference is prepared. Information such as the IP address of the terminal as a connection destination is registered in advance in the icon. In this case, the reservation for setting the network can be made by attaching the icon, in other words, without inputting the IP address. The icon attached to the input field 226 is one example of a third image.

Figure 34:
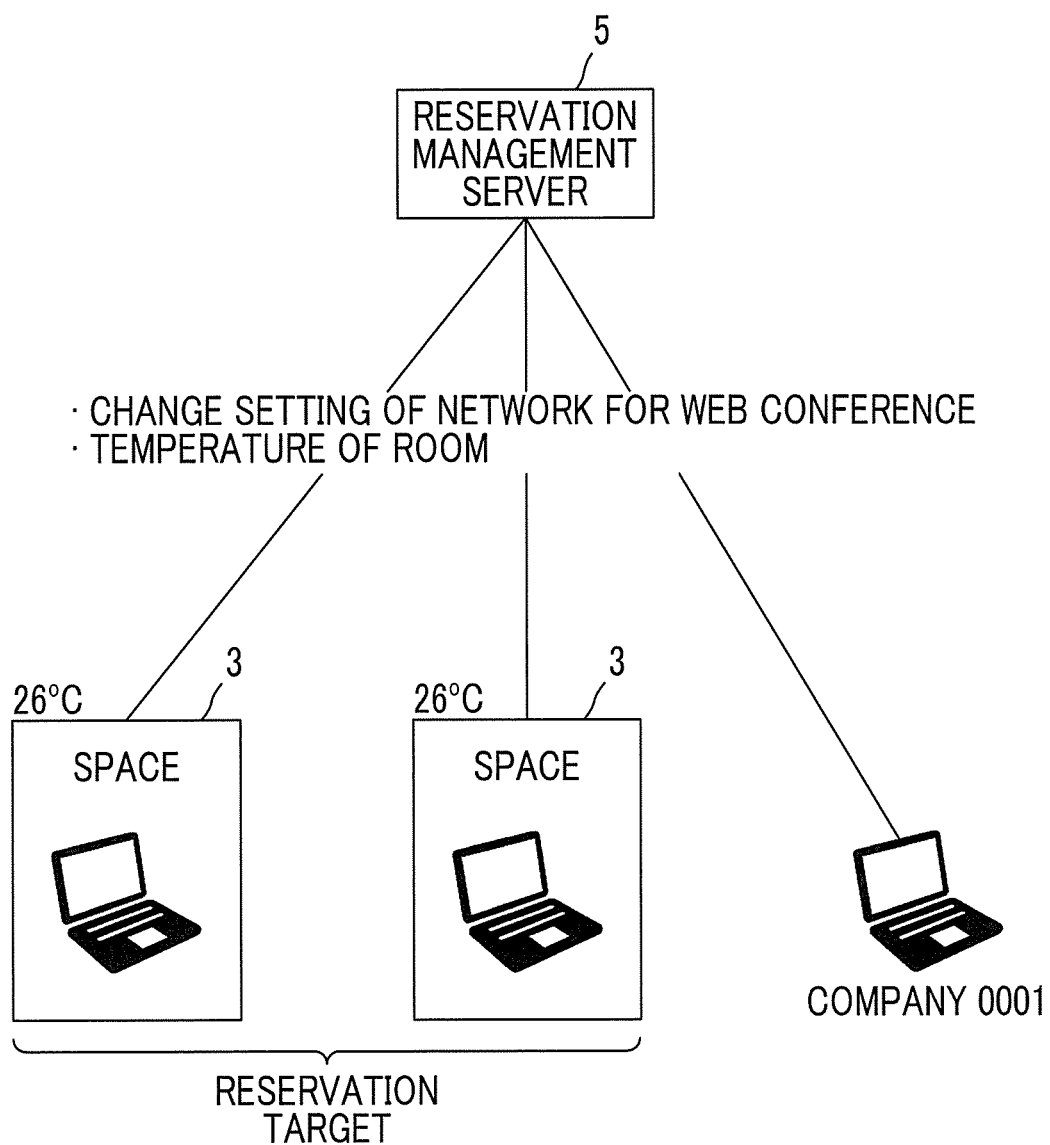
FIG. 34 is a diagram describing coordination between a plurality of terminals executed in a case where two screens used in making a reservation for two spaces are connected on the reception screen.

FIG. 34 is a diagram describing coordination between a plurality of terminals executed in a case where two screens 220A and 220B used in making the reservation for two spaces 3 are connected on the reception screen.

In the example in FIG. 34, the setting of the network for the web conference is changed between two spaces 3 as the reservation target and a company-side terminal that is not the reservation target.

In addition, in FIG. 34, an example of coordinating the room temperatures is illustrated as an example of an effect achieved by coordinating two spaces 3 as the reservation target. In the example in FIG. 34, the coordinated room temperatures of two spaces 3 are set to 26° C. In other words, the room temperatures of two spaces 3 are used in common. The value of the room temperature may be specified on the reception screen. In addition, the example of coordination includes matching the humidity, the illuminance, the brightness, and the like.

Example 11

While the above example describes an example in which the reservation is basically made for the object or the like together at the time of making the reservation for the space 3 by moving or attaching one icon corresponding to the object at a time except for a part of the examples, the reservation operation is complicated in a case where the number of types of objects available for reservation is increased.

Figure 35:
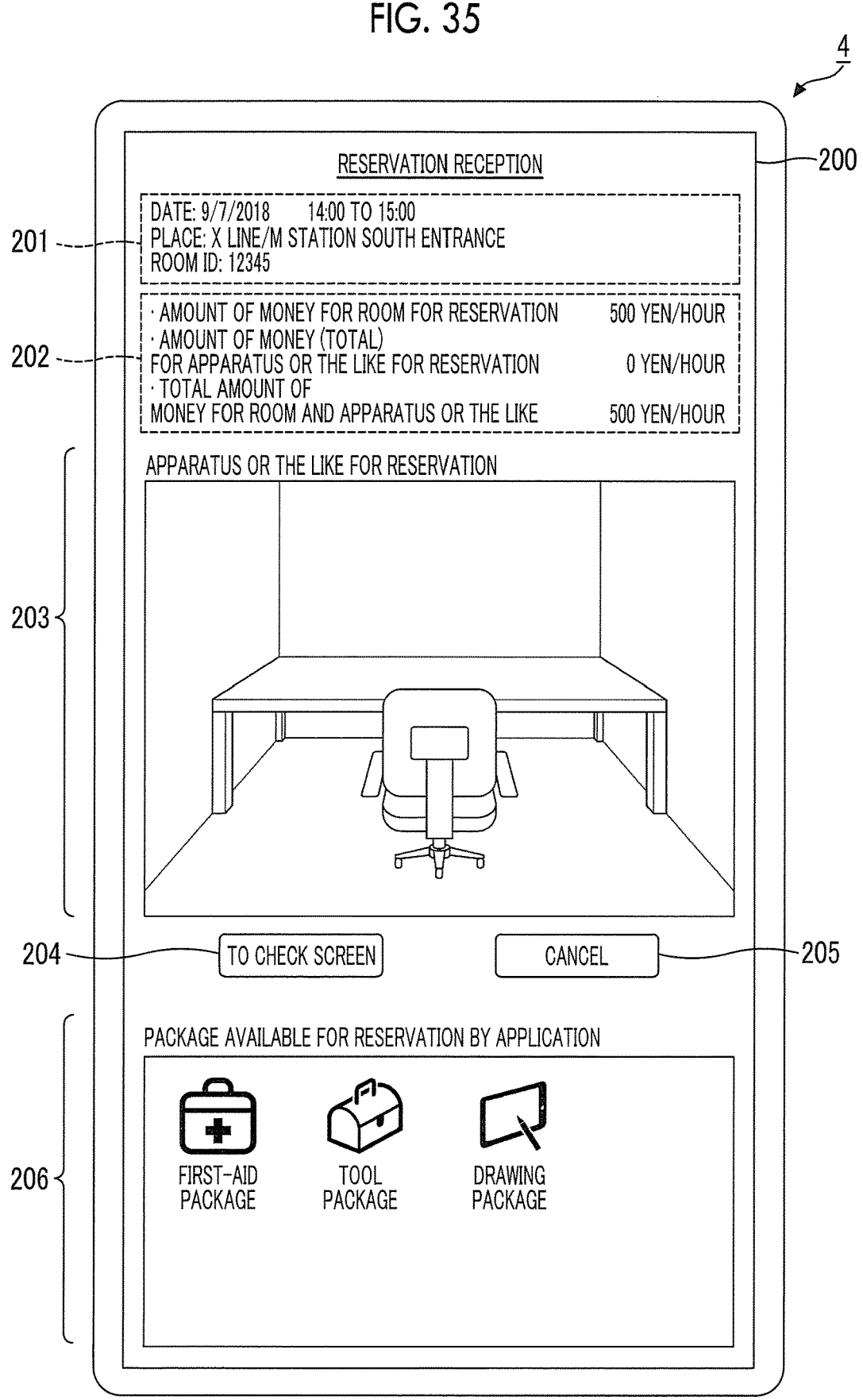
FIG. 35 is a diagram describing an example of the reception screen on which a reservation is received with a collection of a plurality of objects as a unit.

FIG. 35 is a diagram describing an example of the reception screen 200 on which the reservation is received with a collection (hereinafter, referred to as a "package" or a "set") of a plurality of objects as a unit. In FIG. 35, parts corresponding to FIG. 5 are designated by corresponding reference signs.

In FIG. 35, "package available for reservation by application" is used as the title of the display field 206 in which the candidates of the apparatus or the like available for reservation are displayed. While the object is classified by application in FIG. 35, a classification standard is not limited to application.

In FIG. 35, a first-aid package that is a collection of implements and equipment used for emergency treatment, a tool package that is a collection of various tools, and a drawing package that is a collection of software and implements for drawing are illustrated. Besides, a collection of equipment used for an assumed activity such as a crafting package in which crafting equipment is gathered, and a medical package in which medical implements are gathered may be provided as the package.

The content of the package cannot be checked by only the icon representing the collection of objects or the like.

Figure 36:
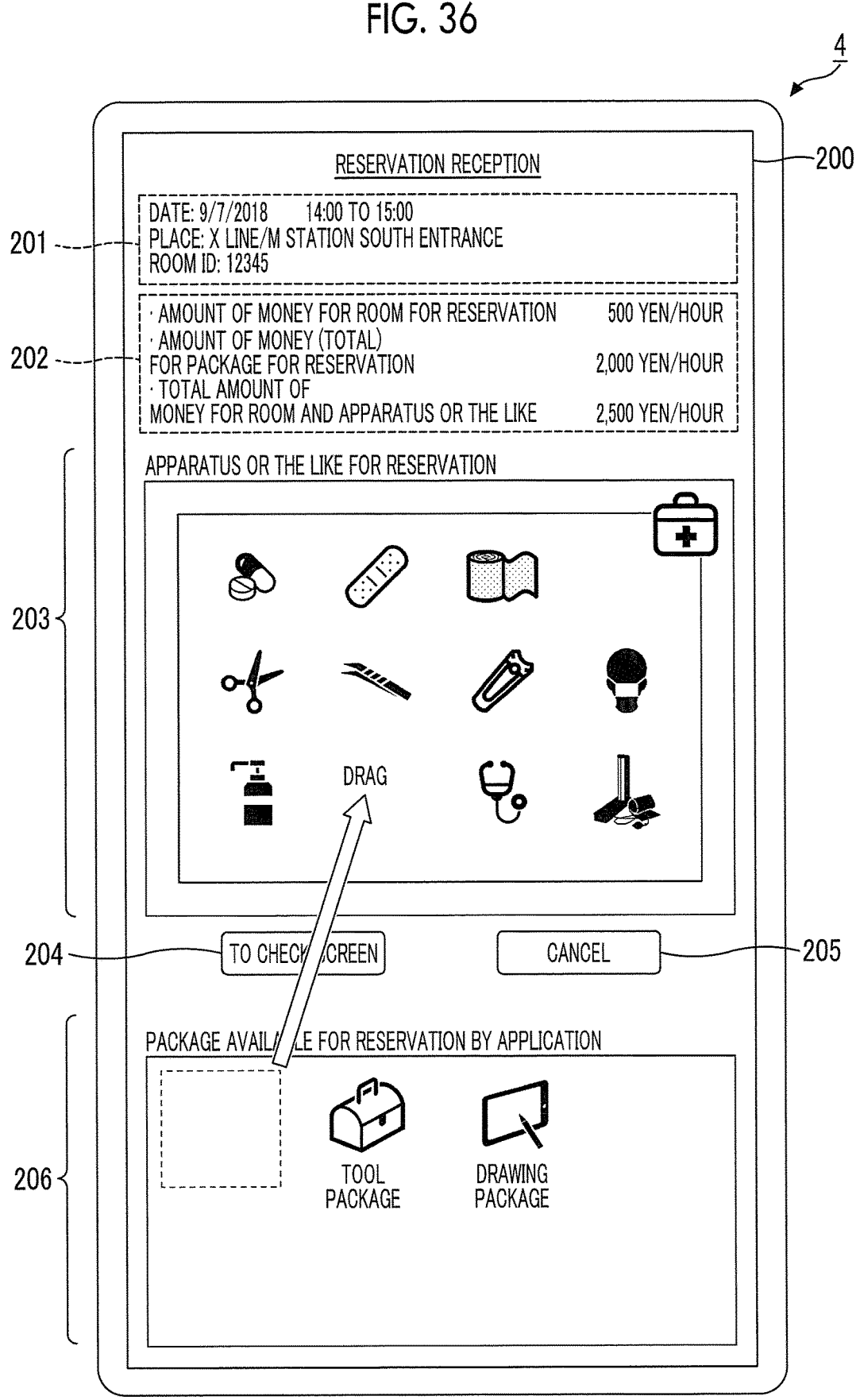
FIG. 36 is a diagram illustrating an example of a screen for checking the content of a package.

FIG. 36 is a diagram illustrating an example of a screen for checking the content of the package. In FIG. 36, parts corresponding to FIG. 30 are designated by corresponding reference signs.

The example in FIG. 36 assumes a case where an icon of the first-aid package is dragged into the input field 203 for reservation from the display field 206. In FIG. 36, in a case where the icon of the first-aid package moves to the region of the input field 203, the content of the first-aid package is expanded and displayed as a list. In a case where the area for displaying the content is insufficient, the icon may be changed to a smaller size depending on the area used for display. In addition, the presence of other contents may be indicated by displaying a scroll bar.

The first-aid package illustrated in FIG. 36 includes a commercially available medication such as a cold medicine, bandage, dressing, a scissor, tweezers, a nail clipper, a mask, a disinfectant, a stethoscope, and a blood pressure meter. Apparently, these are one example, and the combination of objects constituting the first-aid package is not limited.

In addition, the first-aid package may include an apparatus such as a computer for accessing medical data or a printer that prints a prescription.

The reservation holder may not desire expanding and displaying the content each time the icon of the package is dragged into the input field 203 or each time the icon of the package is copied & pasted.

FIG. 37 is a diagram describing an example in which the content is expanded and displayed as a list on condition that the reservation holder taps the icon with the finger 210. The tapping is one example. In a case where switching to the original icon representing the package is desired, for example, an icon of a first-aid box displayed at the upper right corner may be tapped.

Figure 38:
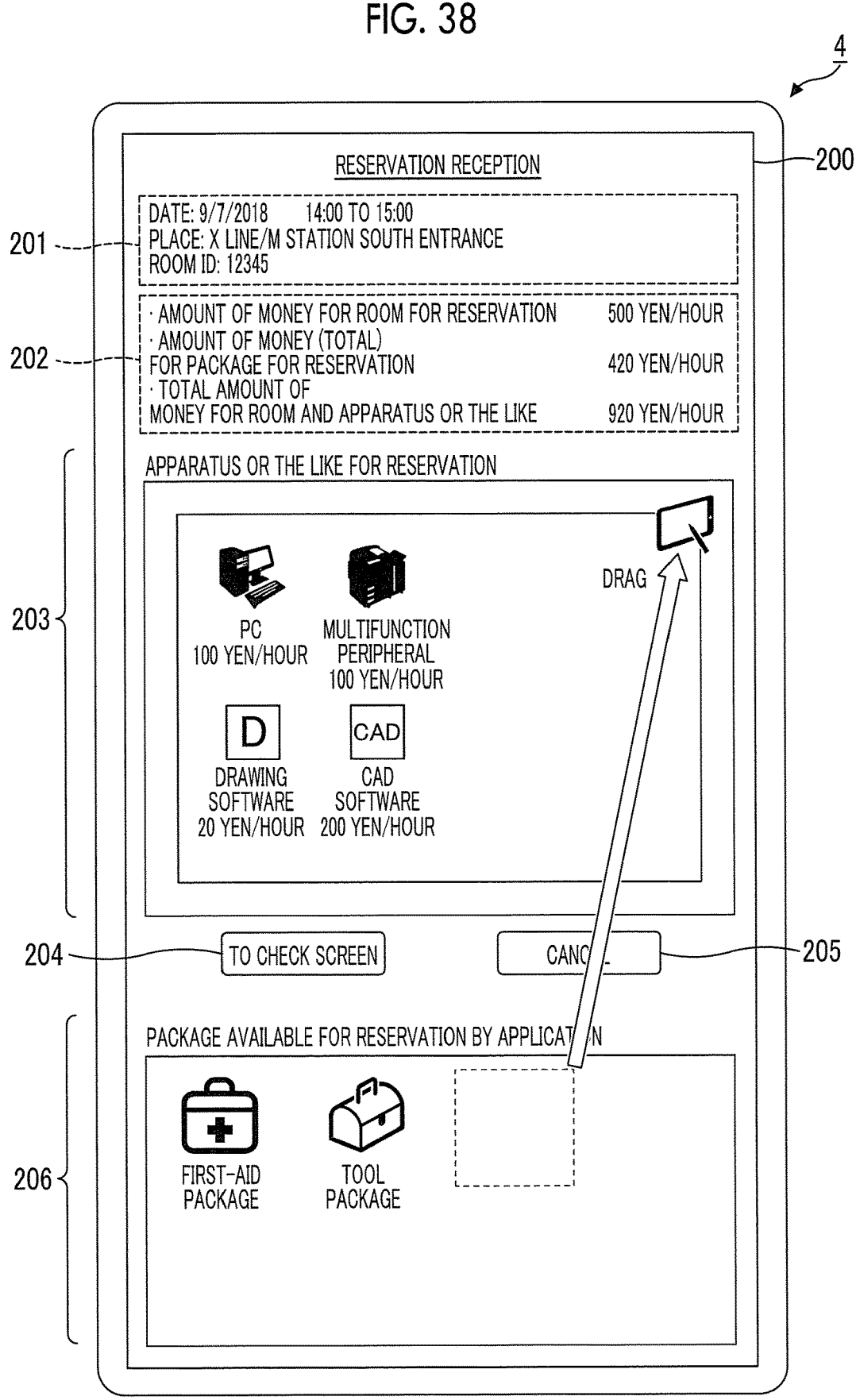
FIG. 38 is a diagram describing another example of the reception screen on which a reservation is received with a collection of a plurality of objects as a unit.

FIG. 38 is a diagram describing another example of the reception screen 200 on which the reservation is received with a collection (hereinafter, referred to as a "package" or a "set") of a plurality of objects as a unit. In FIG. 38, parts corresponding to FIG. 5 are designated by corresponding reference signs.

In FIG. 38, an icon of the drawing package is dragged into the input field 203. In the case of the drawing package illustrated in FIG. 38, the desktop type computer, the multifunction peripheral, the drawing software, and CAD software are displayed as the content of the drawing package. As in this example, the content of the package is not limited to only the object or only software.

Example 12

While the above example describes a case where the reservation is made for the object or the like related to the space 3 along with the space 3, an example in which the reservation can also be made for the arrangement of the object for reservation will be described below.

Figure 39:
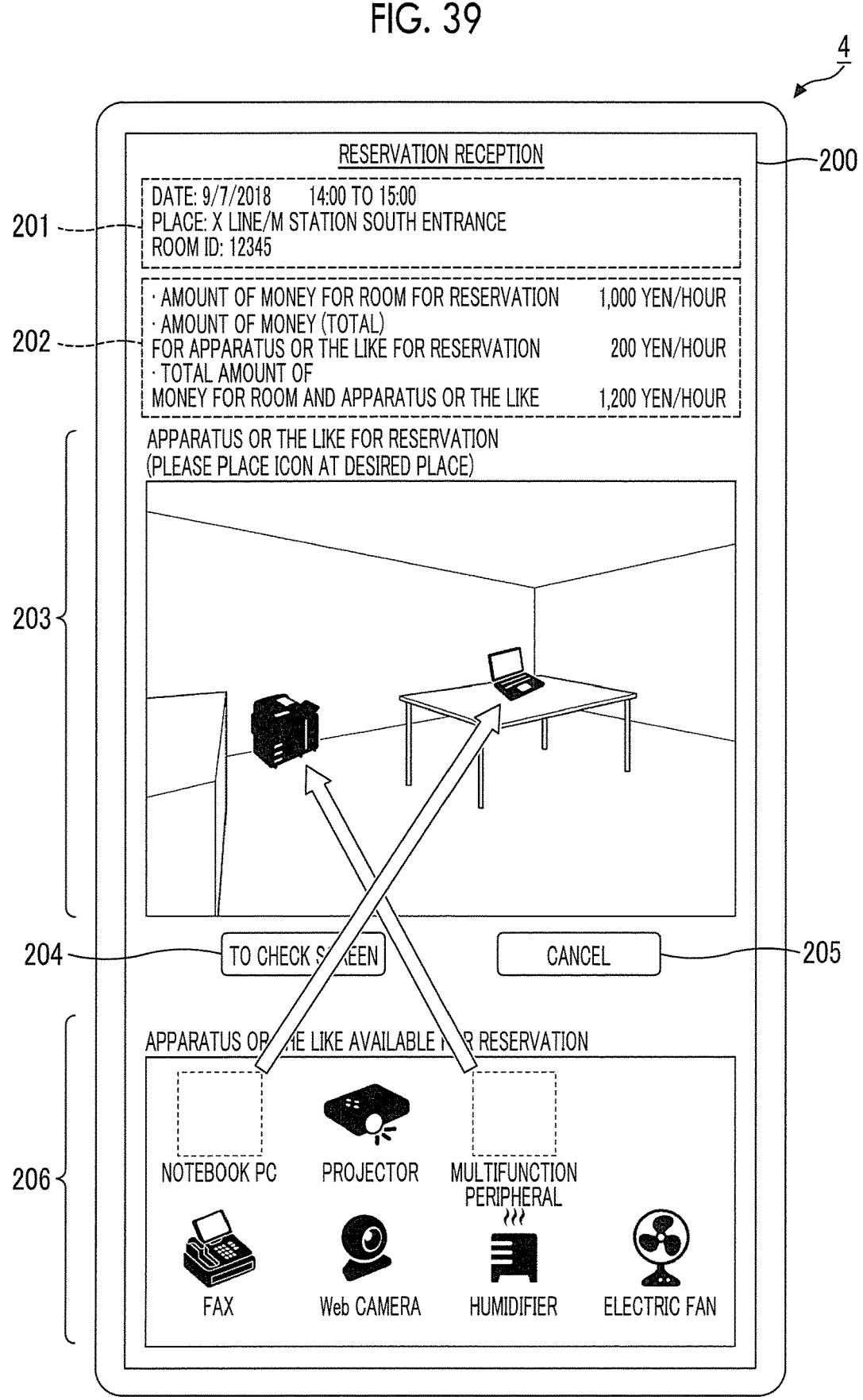
FIG. 39 is a diagram illustrating an example of the reception screen used in a case where the reservation is made for any object and arrangement of the object in a space reserved on an hourly basis.

FIG. 39 is a diagram illustrating an example of the reception screen 200 used in a case where the reservation is made for any object and arrangement of the object in the space reserved on an hourly basis. In FIG. 39, parts corresponding to FIG. 5 are designated by corresponding reference signs.

In this example, a photo or a floor plan of the actual space is displayed in the input field 203 of the apparatus or the like for reservation, and the reservation holder arranges the icon of the object for reservation at a desired position. In FIG. 39, a photo in which the actual space is imaged is displayed. For example, the photo is provided from the reservation management server 5 (refer to FIG. 1). The number of photos and the place of the subject may be in plural number.

In FIG. 39, the icon of the multifunction peripheral is arranged against a wall at an inner place in the photo, and the icon of the notebook type computer is arranged on a conference table. In a case where the reservation is confirmed, a manager arranges the reserved apparatus or the like based on information related to the photo in the input field 203.

Figure 40:
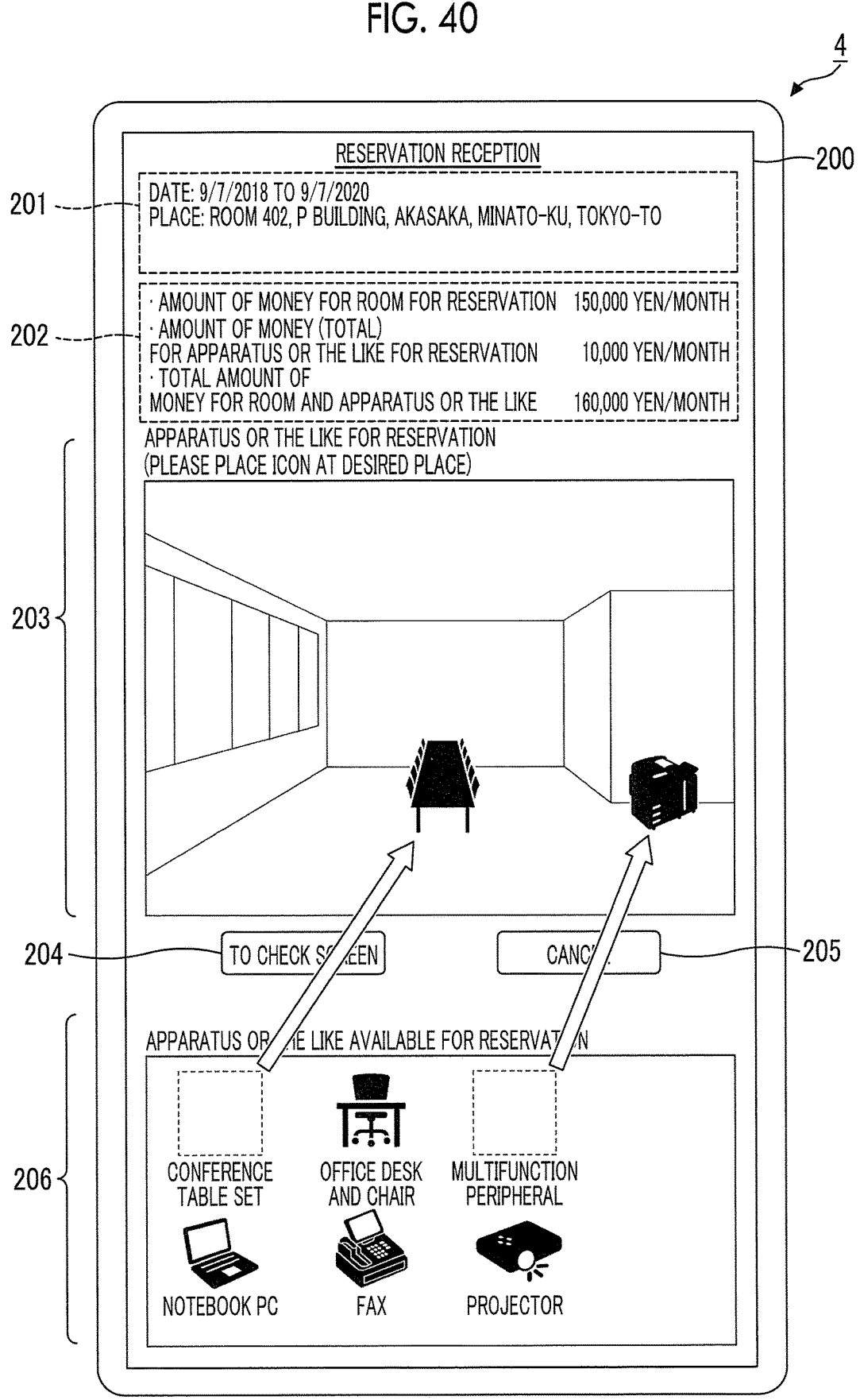
FIG. 40 is a diagram illustrating an example of the reception screen used in a case where the reservation is made for any object and arrangement of the object in a space reserved on a monthly basis.

FIG. 40 is a diagram illustrating an example of the reception screen 200 used in a case where the reservation is made for any object and arrangement of the object in the space reserved on a monthly basis. In FIG. 40, parts corresponding to FIG. 5 are designated by corresponding reference signs.

In FIG. 40, the photo in the input field 203 in which the icon of the object for reservation is arranged is a rented office. In the example in FIG. 40, an icon of a conference table set is arranged at the center of the photo, and the icon of the multifunction peripheral is arranged against a wall on the right side of the photo. The icons may be thumbnails or photos of the actual objects.

The example illustrated in FIG. 40 is an example in which the icon of the object for reservation is desired to be arranged at a desired position in the input field 203 each time the reservation holder makes the reservation. However, in a case where the same reservation holder uses the same space or a space having a similar layout in the past, it may be expected that the position of the icon is desired to be corrected to the same place as that in the past in a case where the icon of the object reserved in the past is arranged in the input field 203.

Figure 41:
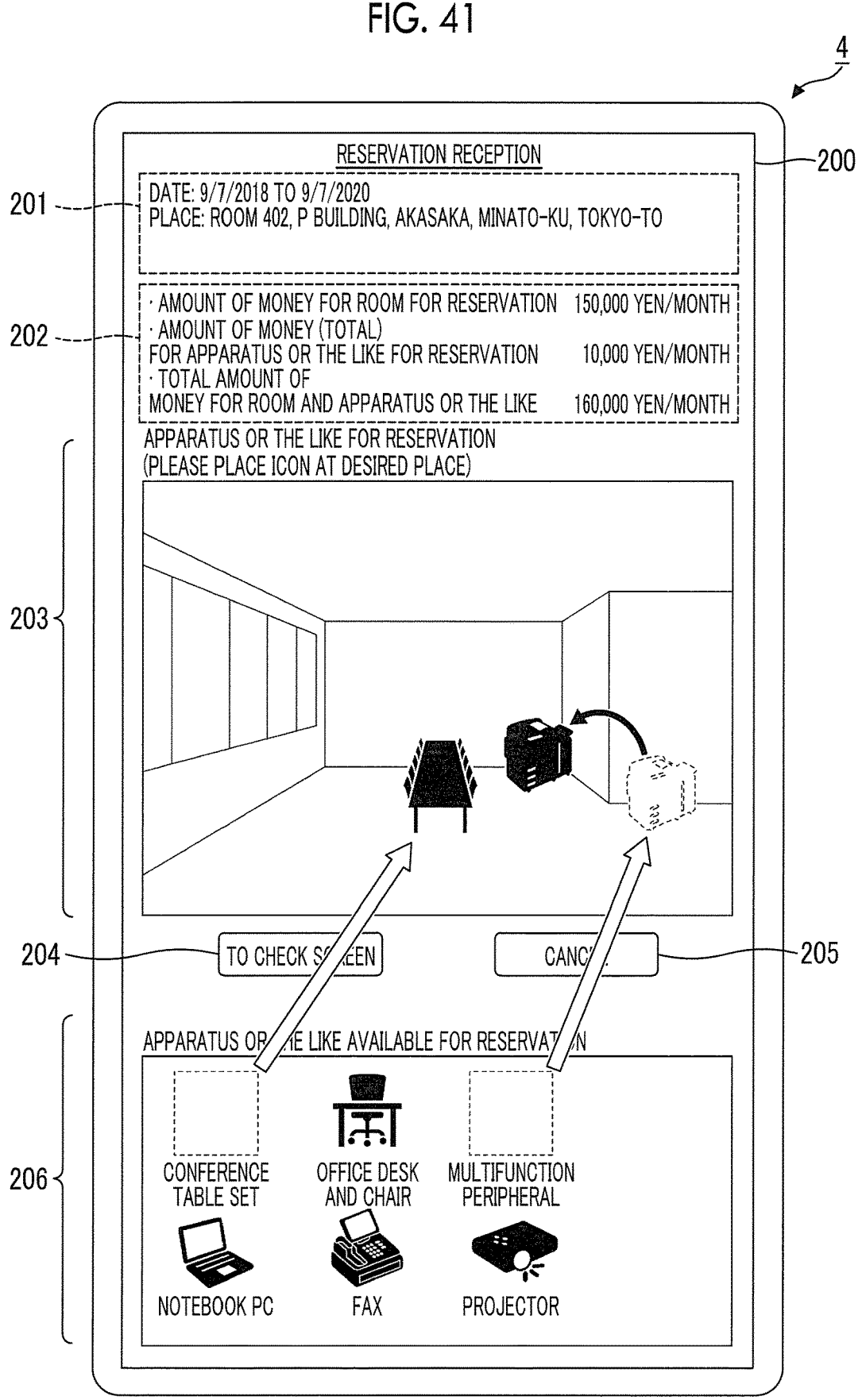
FIG. 41 is a diagram describing a function of correcting arrangement of icons to match arrangement in the same or similar room reserved in the past for the user.

FIG. 41 is a diagram describing a function of correcting arrangement of icons to match arrangement in the same or similar room reserved in the past for the user. In FIG. 41, parts corresponding to FIG. 40 are designated by corresponding reference signs.

The multifunction peripheral is dragged to the wall on the right side by the user in the example in FIG. 41. However, since the correction function is enabled, the multifunction peripheral is automatically moved to the right corner of a wall on an inner side that is the position at which the user arranges the multifunction peripheral in the past. Since the user remembers the preference of the user, the user can use the specified apparatus or the like in the preferred arrangement each time.

While a selection button or the like as to whether or not to enable the correction function is not displayed in FIG. 41, a description for operating the correction function may be included on the reception screen 200. Alternatively, the correction function can be set on a setting screen prepared for each user.

Figure 42:
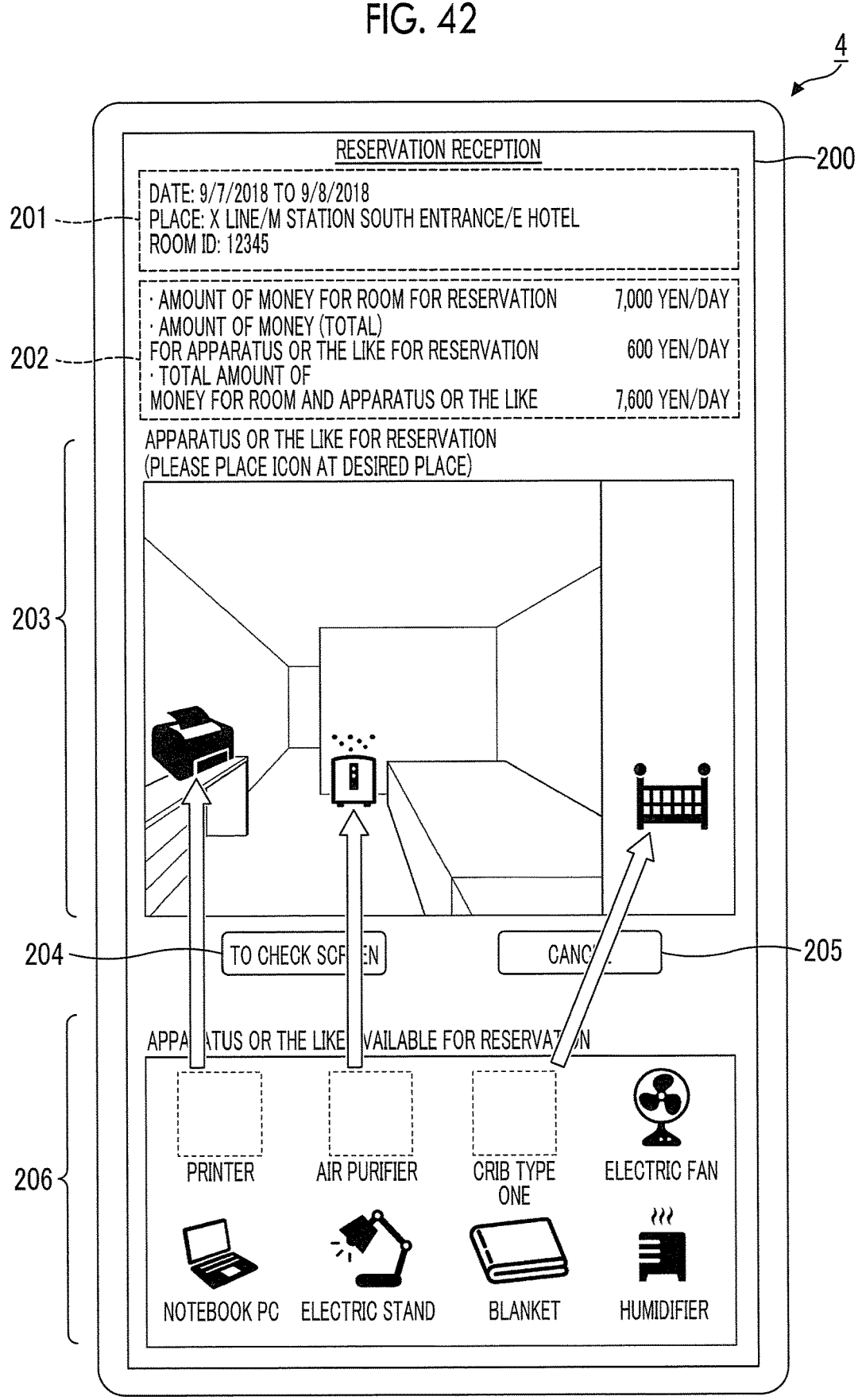
FIG. 42 is a diagram illustrating an example of the reception screen used in a case where the reservation is made for any object and arrangement of the object in a space reserved on a daily basis.

FIG. 42 is a diagram illustrating an example of the reception screen 200 used in a case where the reservation is made for any object and arrangement of the object in the space reserved on a daily basis. In FIG. 42, parts corresponding to FIG. 5 are designated by corresponding reference signs.

In FIG. 42, the photo in the input field 203 in which the icon of the object for reservation is arranged is a hotel room. In the example in FIG. 42, the icon of the printer is arranged on a closet arranged against a wall on the left side of the photo, and an icon of an air purifier is arranged at the center of the photo. An icon of a crib is arranged in a margin part of the input field 203 in which the photo is not displayed. The icon arranged outside the photo indicates a simple reservation and not a reservation for the arrangement place in the same manner as the above example.

The actual arrangement of the objects is performed by an operation person on site. Thus, it is desired to show that the arrangement position of the icon is a reference for arranging the actual object on the screen.

It may be necessary to change the room for reservation after specifying the position at which the object for reservation is arranged. For example, the number of people using the reserved room may be changed, and the currently reserved room may be too small or too large.

Figure 43:
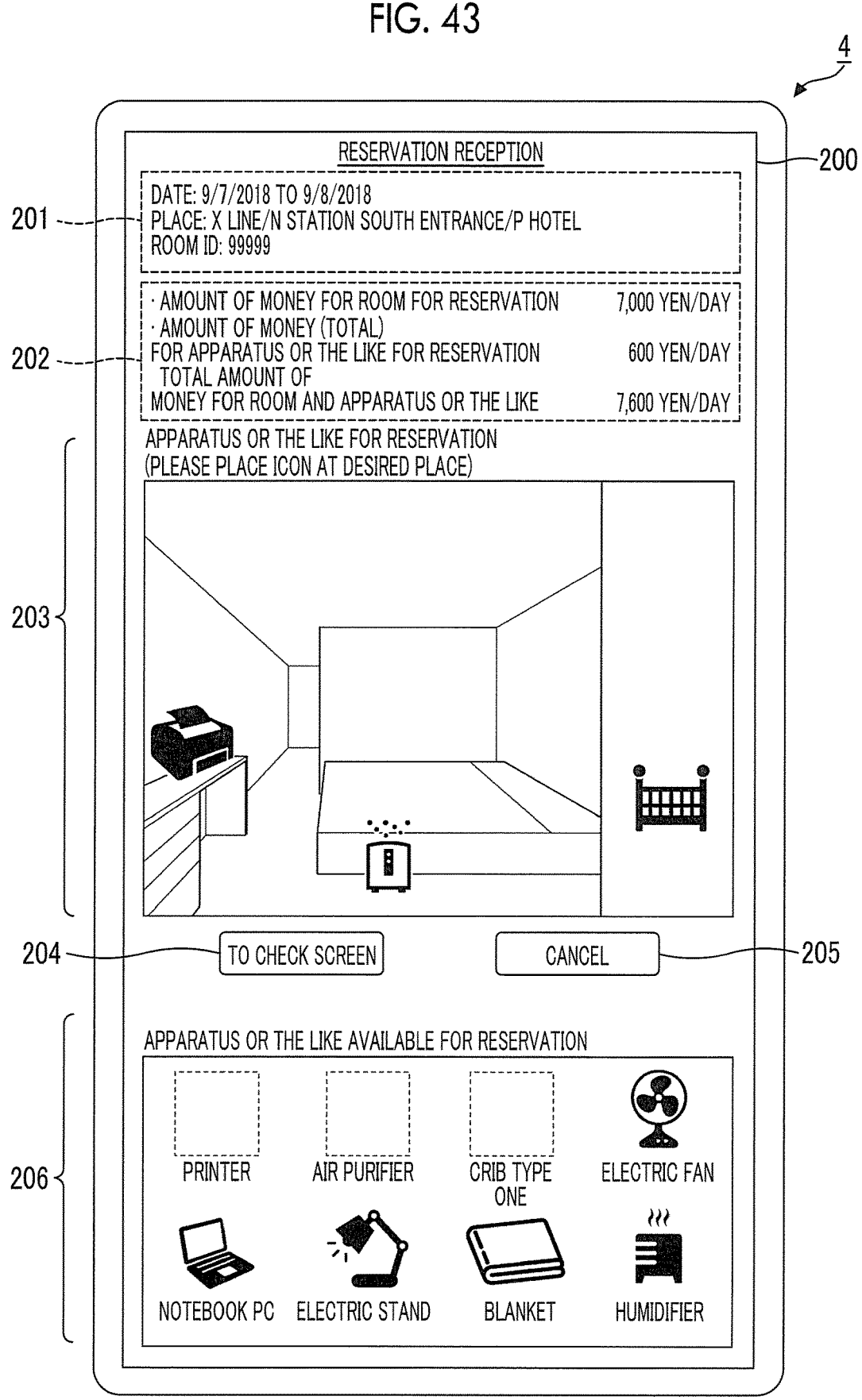
FIG. 43 is a diagram describing a screen example in a case where it is necessary to change a space for reservation in a stage where the reservation is made for arrangement of any object.

FIG. 43 is a diagram describing a screen example in a case where it is necessary to change the space for reservation in a stage where the reservation is made for the arrangement of any object. In FIG. 43, parts corresponding to FIG. 42 are designated by corresponding reference signs.

In FIG. 43, after the arrangements of the printer and the air purifier in the room are specified, the space 3 as the reservation target is changed from "E hotel at the south entrance of M station on X line" to "P hotel at the south entrance of N station on X line", and the room ID is also changed from "12345" to "99999" along with the change.

In a case where the room as the reservation target is changed, the object for reservation and the arrangement of the object may be specified again from the beginning. However, in a case where the specification of the reserved object and the arrangement of the object can be handed over and presented, the input operation of the user can be reduced.

The reception screen 200 illustrated in FIG. 43 represents a case where information related to the specification of the object and the arrangement of the object specified before the change of the reservation is received is handed over for the room after change. The reception screen display control unit 113 (refer to FIG. 4) controlling display of the reception screen 200 executes handover of the specification of the object and the arrangement of the object specified by an immediately previous operation to match the layout of the room newly specified as the reservation target.

In the example in FIG. 43, the reception screen display control unit 113 performs handover of the reservation for the object before change and the position at which the object is arranged. Thus, an arrow indicating dragging and dropping of the icon is not displayed.

In FIG. 43, the layout of the room specified by the room ID "99999" after the change of the reservation is similar to that before the reservation is changed (FIG. 42), but the direction of the arrangement of the bed is different. For example, while the head side of the bed in FIG. 42 is arranged on the front side of the drawing, the head side of the bed in FIG. 43 is arranged on a right wall surface side of the drawing.

Thus, a vacant space in which the icon of the air purifier can be arranged against the wall before the change of the reservation is not present in FIG. 43.

In the example in FIG. 43, the reception screen display control unit 113 compares the layout of the room and the layout of furniture before change with the layout of the room and the layout of furniture after change. Depending on the result of the comparison, the reception screen display control unit 113 estimates the arrangement of the object in the room after change and displays the estimated arrangement of the object in the input field 203.

For example, the position of the arrangement of the printer for which the reservation is handed over is on the closet arranged against the wall in the same manner as that before change. In addition, the reservation for the crib of which the arrangement position is not specified is handed over.

The reservation for the air purifier is also handed over. However, in FIG. 43, since the space specified against the wall before change is not present, the icon corresponding to the air purifier is displayed at a position on the front side of the screen at the foot of the bed by handing over information related to arrangement near the foot of the bed.

In a case where the user desires to change the arrangement presented by the reception screen display control unit 113, the user may change the position of the icon as a target in the input field 203.

In the method of handing over the position of the arrangement of the icon specified before change for the room after change, the user performing the operation may refer to a history at the time of specifying the arrangement of the same object in the past for the room after change. In a case where a plurality of candidates of arrangement are present, arrangement in a temporally close reservation may be prioritized, or an inquiry may be made to the user on the reception screen 200.

The function of referring to the history of arrangement can also be used in a case where the reservation is newly made for the room as in FIG. 42.

Even in a case where the user can freely specify the installation place, receiving the specification at a place not appropriate for installation is to be avoided.

Figure 44:
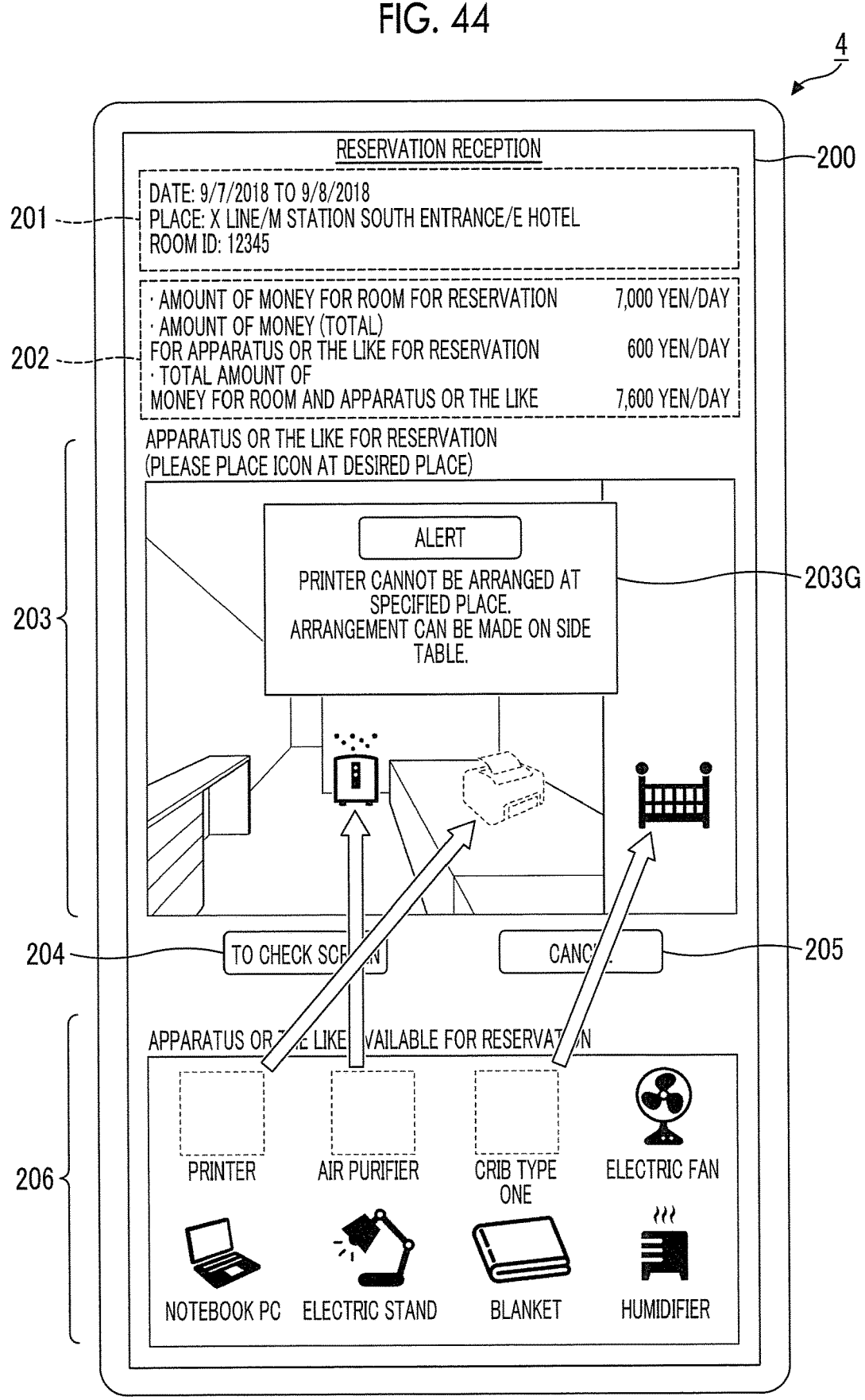
FIG. 44 is a diagram describing an alert screen in a case where an object is arranged at an unspecifiable position.

FIG. 44 is a diagram describing an alert screen 203G in a case where the object is arranged at an unspecifiable position. In FIG. 44, parts corresponding to FIG. 42 are designated by corresponding reference signs.

The example in FIG. 44 assumes a case where the reservation holder drags the icon such that the printer is installed on the bed.

The installation of the printer on the bed is performed at an inappropriate place from the viewpoint of safety for the user and also from the viewpoint of avoiding problems for the apparatus.

Therefore, an installable place is registered in advance for each apparatus, and the alert screen 203G is displayed in a case where the icon corresponding to the apparatus is dragged to a place other than the registered place.

In FIG. 44, for example, a description text "The printer cannot be arranged at the specified place. Arrangement can be made on a side table." is displayed as the alert screen 203G. That is, an arrangeable place is shown to the reservation holder, and the reservation holder is guided to the place.

Example 13

A case where payment of a charge is not required as a condition for confirming the reception of the reservation will be described. While the timing of the reservation basically matches the timing of payment of the charge, a case where the timing of the reservation does not match the timing of payment of the charge will be described below.

Figure 45:
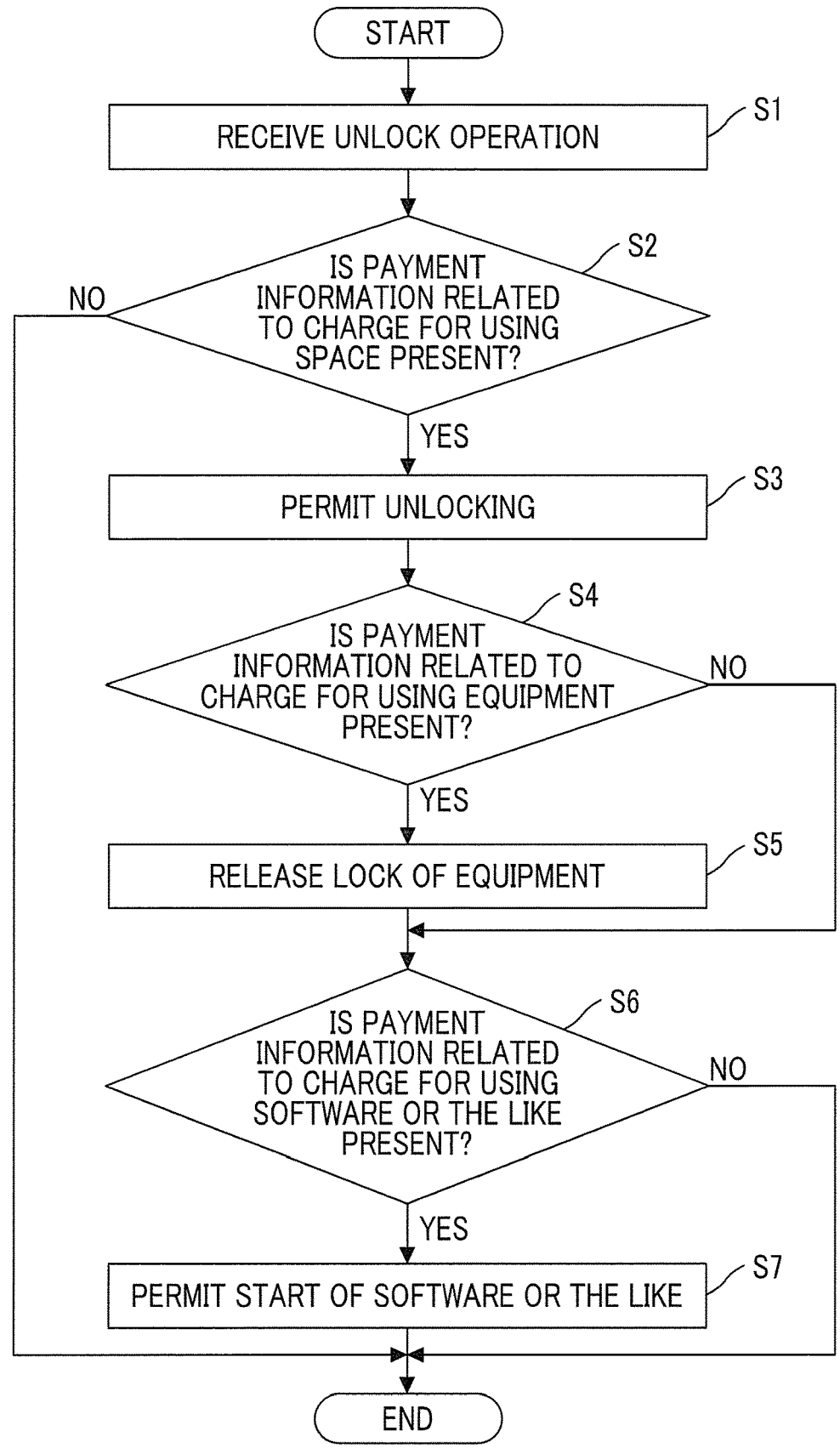
FIG. 45 is a flowchart describing an example of a procedure enabling the use of the reserved apparatus depending on payment of a charge.

FIG. 45 is a flowchart describing an example of a procedure enabling the use of the reserved apparatus depending on the payment of the charge. Symbol S shown in FIG. 45 represents step.

This process is implemented through execution of the program by the CPU 101 of the reservation management server 5 (refer to FIG. 1). More specifically, this function is implemented in cooperation between the payment information acquisition unit 116 (refer to FIG. 4) of the reservation management server 5 and the space management server 6 (refer to FIG. 1). For example, information related to the payment of the charge is obtained from the bill management server 7 (refer to FIG. 1).

In a case where the reservation management server 5 receives an unlock operation for the space 3 from the space management server 6 (step S1), the reservation management server 5 determines whether or not the payment information related to a charge for using the space 3 is present (step S2).

In a case where a negative result is obtained in step S2, the reservation management server 5 disables the unlock operation. In a case where it is determined that the unlock operation is disabled, the space management server 6 maintains the lock of the space 3.

In a case where a positive result is obtained in step S2, the reservation management server 5 permits unlocking of the space 3 (step S3). In a case where information or the like related to the electronic key required for the unlock operation is provided in advance to the control apparatus on the space 3 side, the processes of steps 2 and 3 are executed in the control apparatus in the space 3.

Next, the reservation management server 5 determines whether or not the payment information related to a charge for using the equipment is present (step S4). In a case where the reservation is not made for the equipment that can be controlled by an operation based on communication, or in a case where a negative result is obtained in step S4, the reservation management server 5 proceeds to a subsequent determination process.

In a case where a positive result is obtained in step S4, the reservation management server 5 releases a lock mechanism of the equipment (step S5).

In a case where a negative result is obtained in step S4, or after step S5, the reservation management server 5 determines whether or not the payment information related to a charge for using the software or the like is present (step S6). The software or the like is the software as the reservation target or the function of the apparatus as the reservation target.

In a case where a negative result is obtained in step S6, the reservation management server 5 finishes the process.

In a case where a positive result is obtained in step S6, the reservation management server 5 permits the start of the software or the like (step S7).

Figure 46:
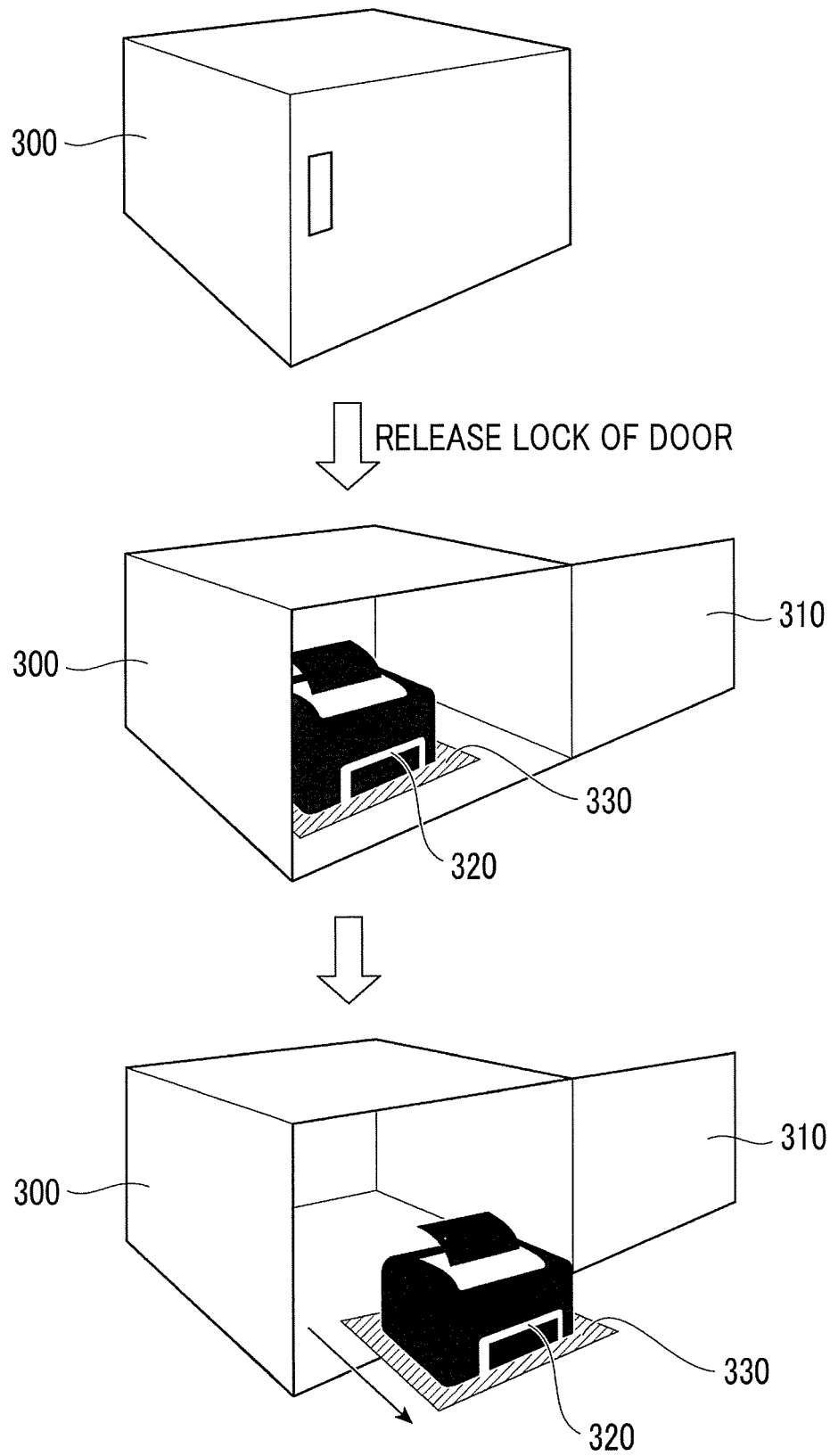
FIG. 46 is a diagram describing one example of control enabling the use of reserved equipment on condition that payment of a charge for use is checked.

FIG. 46 is a diagram describing one example of control enabling the use of the reserved equipment on condition that the payment of the charge for use is checked.

In FIG. 46, a printer 320 is accommodated inside a box 300. In a case where the payment of the charge for use is checked, a lock of a door 310 is released. In FIG. 46, the door 310 is driven to open by an opening and closing mechanism, not illustrated, and a state where the reservation holder can access the printer 320 accommodated in the box 300 is set.

In FIG. 46, after the door 310 moves to an open position, a shelf 330 on which the printer 320 is mounted moves such that the shelf 330 is withdrawn from the opening. Consequently, the reservation holder can more easily access the printer 320.

In a case where the time of reservation elapses, the printer 320 is moved to an accommodation position inside the box 300 along with the shelf 330. Next, the door 310 is driven to close by the opening and closing mechanism, not illustrated. Last, control is performed to set a lock state.

Access to the printer 320 is physically managed using a drive mechanism in FIG. 46. However, in a case where the charge for use is not paid, remote control may be performed such that the power supply of the printer 320 is not set to be in an ON state. In addition, a print button may be disabled. A print wizard screen may not be displayed. The printer 320 as the reservation target may not be seen as an output destination on the print wizard screen.

Figure 47:
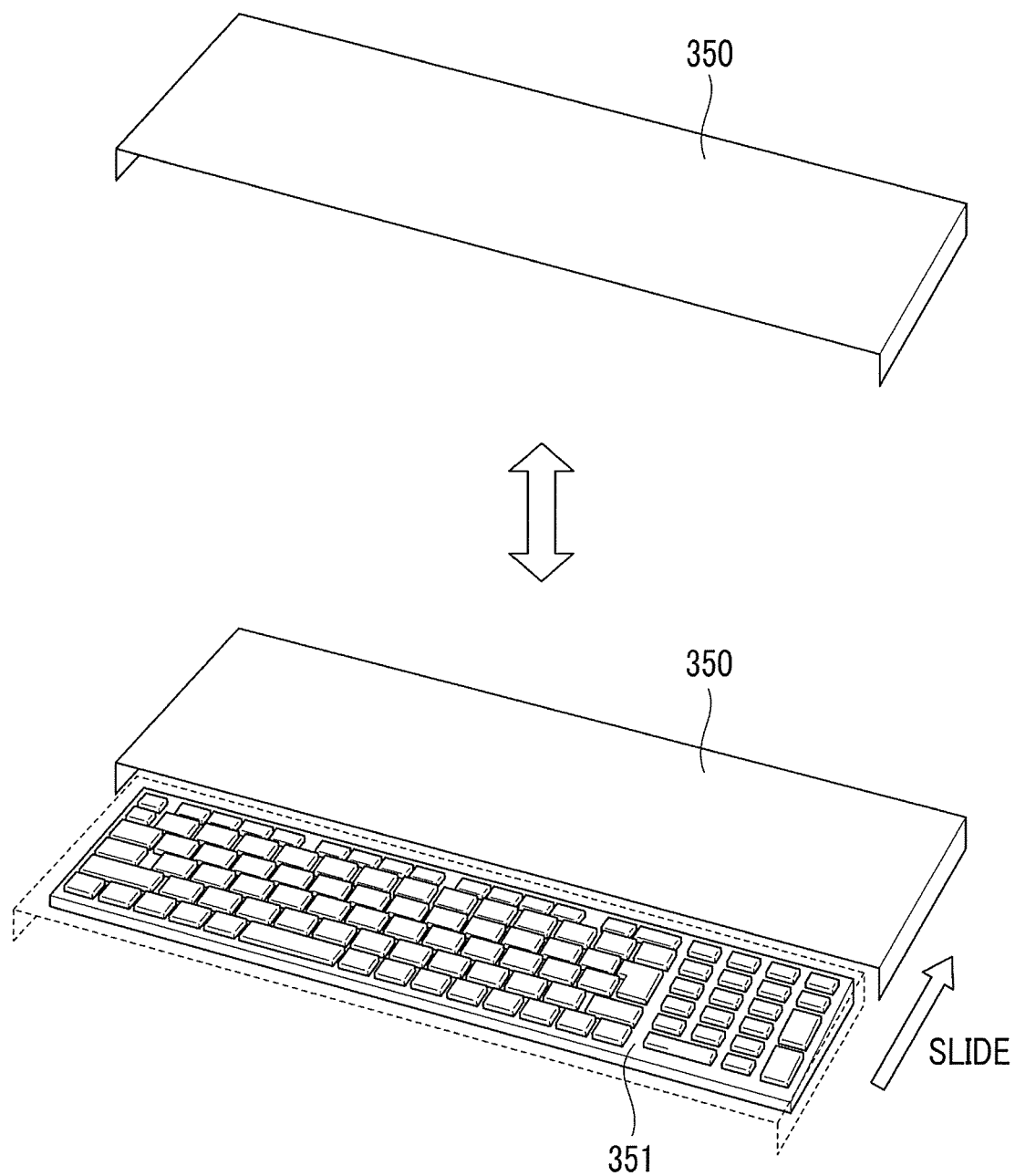
FIG. 47 is a diagram describing another example of control enabling the use of reserved equipment on condition that payment of the charge for use is checked.

FIG. 47 is a diagram describing another example of control enabling the use of the reserved equipment on condition that the payment of the charge for use is checked.

In a case where the charge for use is not paid, a movable type cover 350 covers an operation surface of a keyboard 351, and the operation of the keyboard 351 is disabled. In a case where the charge for use is paid, the movable type cover 350 recedes from the operation surface, and the operation of the keyboard 351 is enabled. The keyboard 351 is one example of an operator. Another example of the operator includes a power supply button, a mouse, and the like.

A mechanism that disables or hinders a physical operation is not limited to the sliding type cover 350. For example, the mechanism may be the cover 350 of an opening and closing type or may be a movable type member that disables or hinders an operation of a key having a high frequency of use.

In addition, input may be disabled even in a case where the operation of the key is enabled. The method of disabling input is also effective for mouse input.

FIG. 48 is a diagram describing an example of control enabling the use of the reserved software on condition that the payment of the charge for use is checked.

The example in FIG. 48 is a case where the reservation target is an icon 361 of spreadsheet software S. Even in a case where an icon displayed on an operation screen 360 is tapped with the finger 210, when the charge for use is not paid, a spreadsheet 362 is not displayed, and a screen 363 for informing the reservation holder of non-payment of the charge is displayed.

In a case where the charge for use is paid, the spreadsheet 362 is displayed on the operation screen 360.

While the icon 361 of the spreadsheet software S as the reservation target is displayed regardless of the payment of the charge for use in FIG. 48, the display of the icon 361 may be limited to a case where the charge for use is paid.

Exemplary Embodiment 2

While Exemplary Embodiment 1 assumes a case where the reservation is made from a place different from the space 3, a case where the user makes the reservation for the space 3 near a real place will be described in the present exemplary embodiment.

Figure 49:
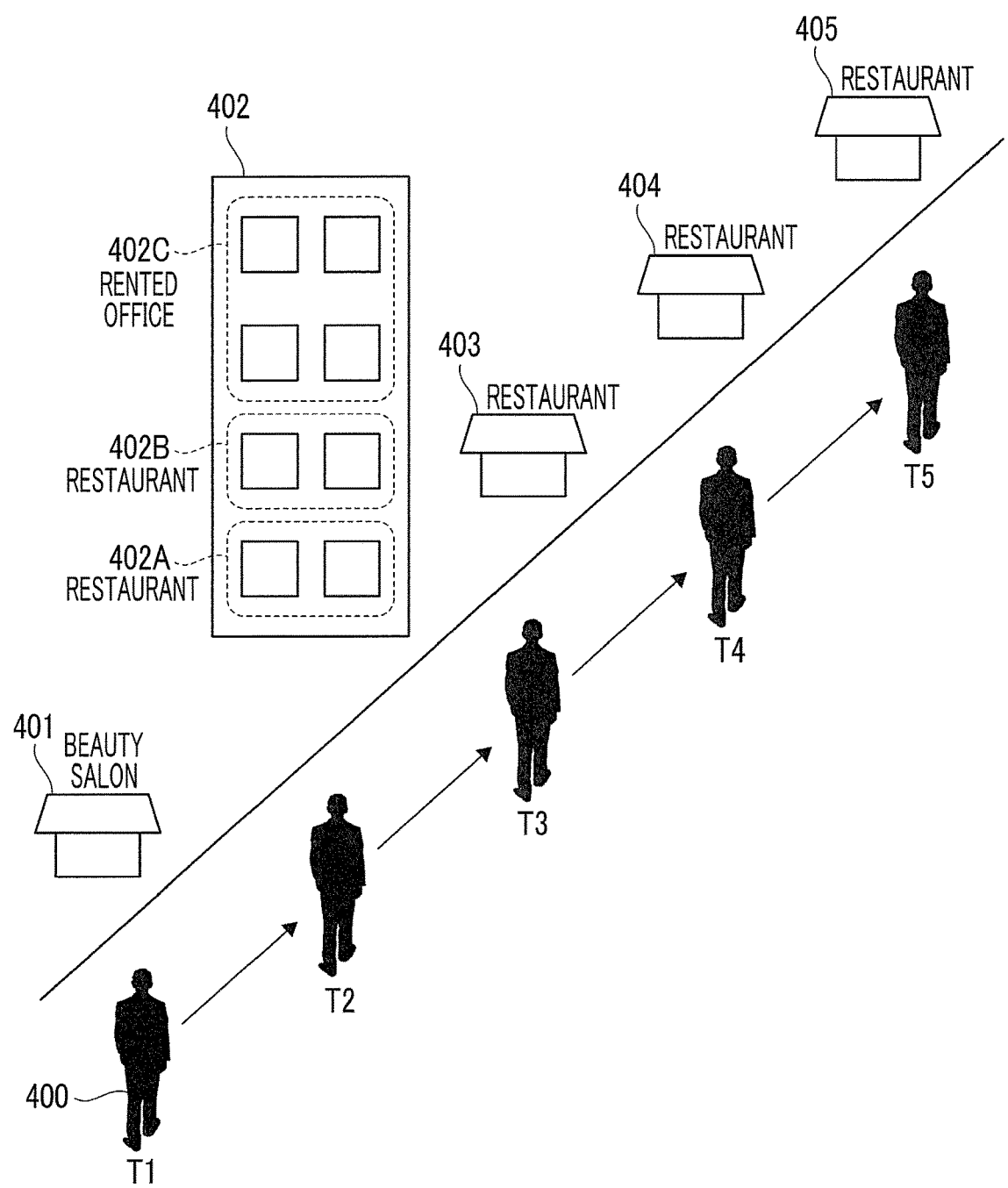
FIG. 49 is a diagram describing an example of a usage scene assumed in an exemplary embodiment.

FIG. 49 is a diagram describing an example of a usage scene assumed in the present exemplary embodiment.

In FIG. 49, a beauty salon 401, a building 402, and restaurants 403, 404, and 405 are lined up along a road on which a user 400 walks. The building 402 is a fourth-floor building. A restaurant 402A is on the first floor. Another restaurant 402B is on the second floor. The third floor and the fourth floor are used as a rented office 402C.

Each store illustrated in FIG. 49 participates in the reservation system 1 (refer to FIG. 1) described in Exemplary Embodiment 1.

For example, in the beauty salon 401, a seat is the reservation target as the space 3. In the restaurants 402A, 402B, 403, 404, and 405, a seat or a table are the reservation target as the space 3. In the rented office 402C, individual rooms are the reservation target as the space 3.

Even in the present exemplary embodiment, the reservation system 1 (refer to FIG. 1) is used for making the reservation for the space 3.

In FIG. 49, T1→T2→T3→T4→T5 indicates an elapse of time. Accordingly, along with the elapse of time, the user 400 moves from the position of the beauty salon 401 to the position of the restaurant 405.

Figure 50:
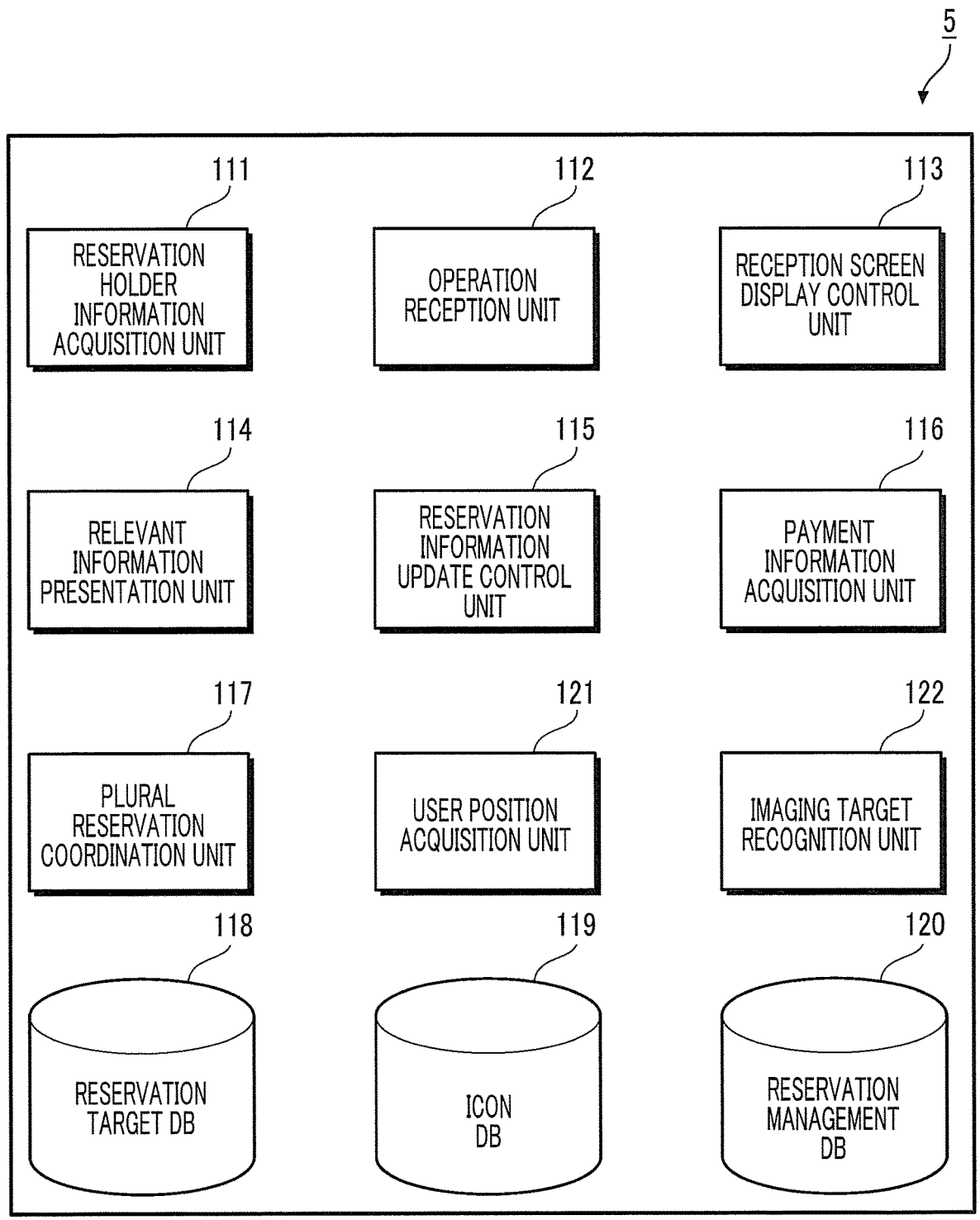
FIG. 50 is a diagram describing an example of a functional configuration of the reservation management server.

FIG. 50 is a diagram describing an example of a functional configuration of the reservation management server 5. In FIG. 50, parts corresponding to FIG. 4 are designated by corresponding reference signs.

The reservation management server 5 illustrated in FIG. 50 and the reservation management server 5 illustrated in FIG. 4 have two differences of a user position acquisition unit 121 obtaining the current position of the user and an imaging target recognition unit 122 recognizing an imaging target by processing the image captured by the user terminal 4 (refer to FIG. 1).

The functions of the user position acquisition unit 121 and the imaging target recognition unit 122 may be executed in the user terminal 4.

For example, the user position acquisition unit 121 obtains positional information that is related to the user terminal 4 and is measured by a GPS receiver receiving a signal from a global positioning system (GPS) satellite. The measured positional information may be either an outdoor location or an indoor location.

Even in the indoor location, for example, a technology for measuring the position from a difference in intensity of an electric wave from a WiFi (trademark) base station, a technology for measuring the position by determining the intensity of a beacon, a technology for measuring the position based on self-contained navigation using the output of sensors of acceleration, magnetism, angular velocity, and the like incorporated in the user terminal 4, or a technology for installing a transmitter transmitting an electric wave using the same protocol and the frequency as the GPS satellite in the indoor location and measuring the position by receiving the signal of the transmitter by the GPS receiver can be used.

The imaging target recognition unit 122 recognizes a target included in an imaging range using a scene and the exterior of a store registered in advance. The exterior of the store includes a signboard. In addition, the recognition target includes a patterned figure. The figure may be a figure in which information is coded based on a preset rule, or may be an indicator that specifies a display position of additional information by coordinating with preset software.

The reservation management server 5 (refer to FIG. 1) in the present exemplary embodiment combines the positional information related to the user terminal 4 with information and the like related to the store specified using image recognition technology and provides information related to the space 3 available for reservation to the user.

Example 1 of Reception Screen

Figure 51:
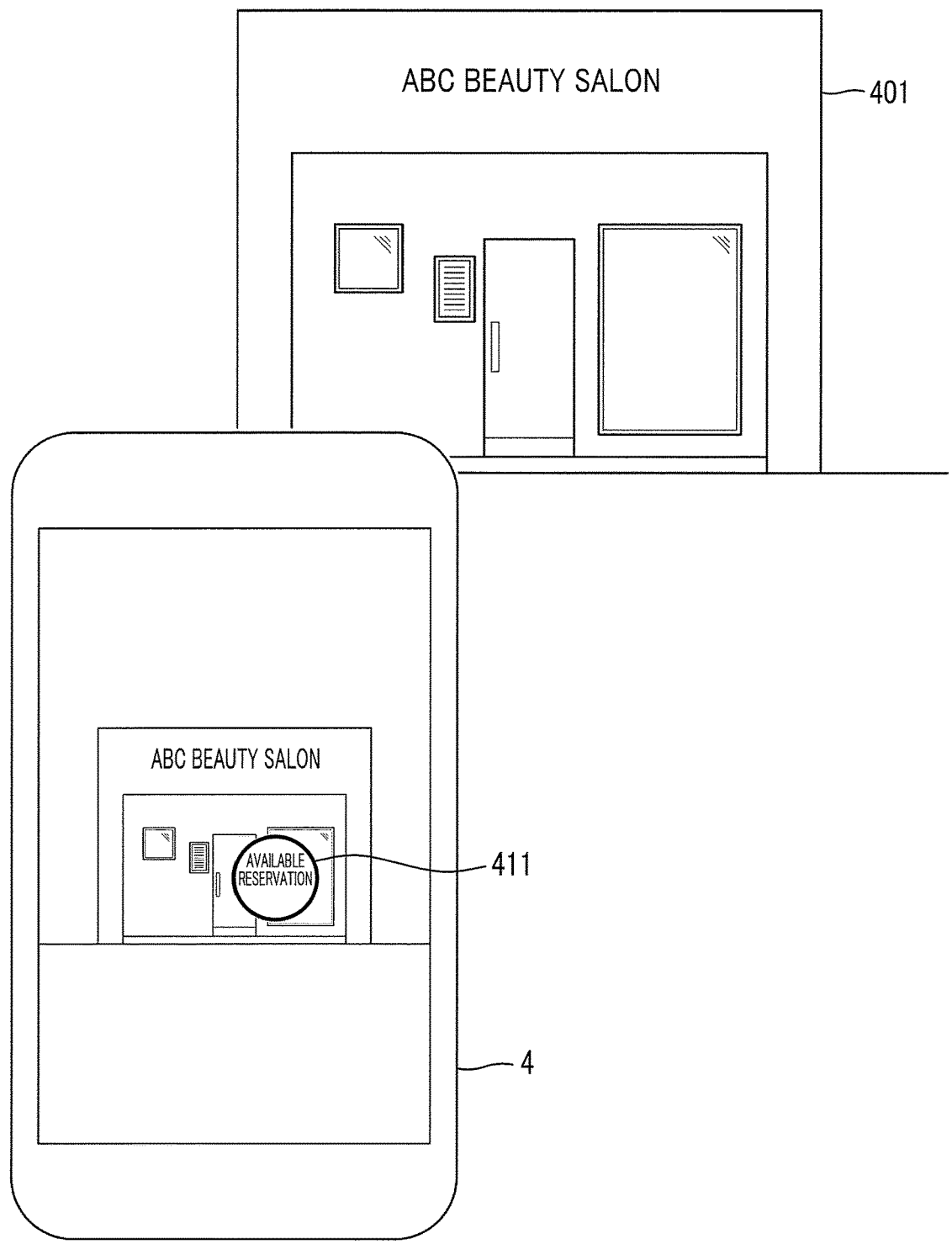
FIG. 51 is a diagram describing a relationship between ABC beauty salon positioned on a street and a captured image of ABC beauty salon.

FIG. 51 is a diagram describing a relationship between the ABC beauty salon 401 positioned on the street and a captured image of the ABC beauty salon 401.

In FIG. 51, a mark 411 of "available reservation" that is not present in the real space is added to an image in which the ABC beauty salon 401 is the subject. This technology may use a technology called augmented reality. This display can be made using location type augmented reality or markerless type augmented reality.

In the present exemplary embodiment, in a case where the reservation management server 5 (refer to FIG. 1) recognizes the ABC beauty salon 401 by image processing, the reservation management server 5 searches the reservation management database 120 (refer to FIG. 4) and displays the mark 411 of available reservation in a case where a condition set in advance by the user is satisfied. The mark 411 is one example of a virtual figure displayed in a superimposed manner on the image.

The condition set by the user includes whether or not to notify the user of a seat or the like available for reservation using augmented reality technology.

In addition, the condition for displaying the mark 411 of available reservation includes time or a period, a display target, and the like.

For example, the time or the period is provided such that the reservation is started from the current time, the reservation is started after 5 minutes from the current time, the reservation is started after 15 minutes from the current time, or the reservation is started after 30 minutes from the current time. In a case where it is desired to have a meal immediately, vacant seat information after a few days is meaningless. In the case of the beauty salon, the time or the period may be allowed up to a few hours. In the case of renting a room, the time or the period may be allowed on a daily or monthly basis.

For example, a restaurant, a beauty salon, a barbershop, or a rental can be specified as the display target. In addition, Japanese, western, Chinese, Italian, family restaurant, ramen, or the like can be specified for the restaurant. In addition, a rented office, a rented house, or the like can be specified for the rental.

Figure 52:
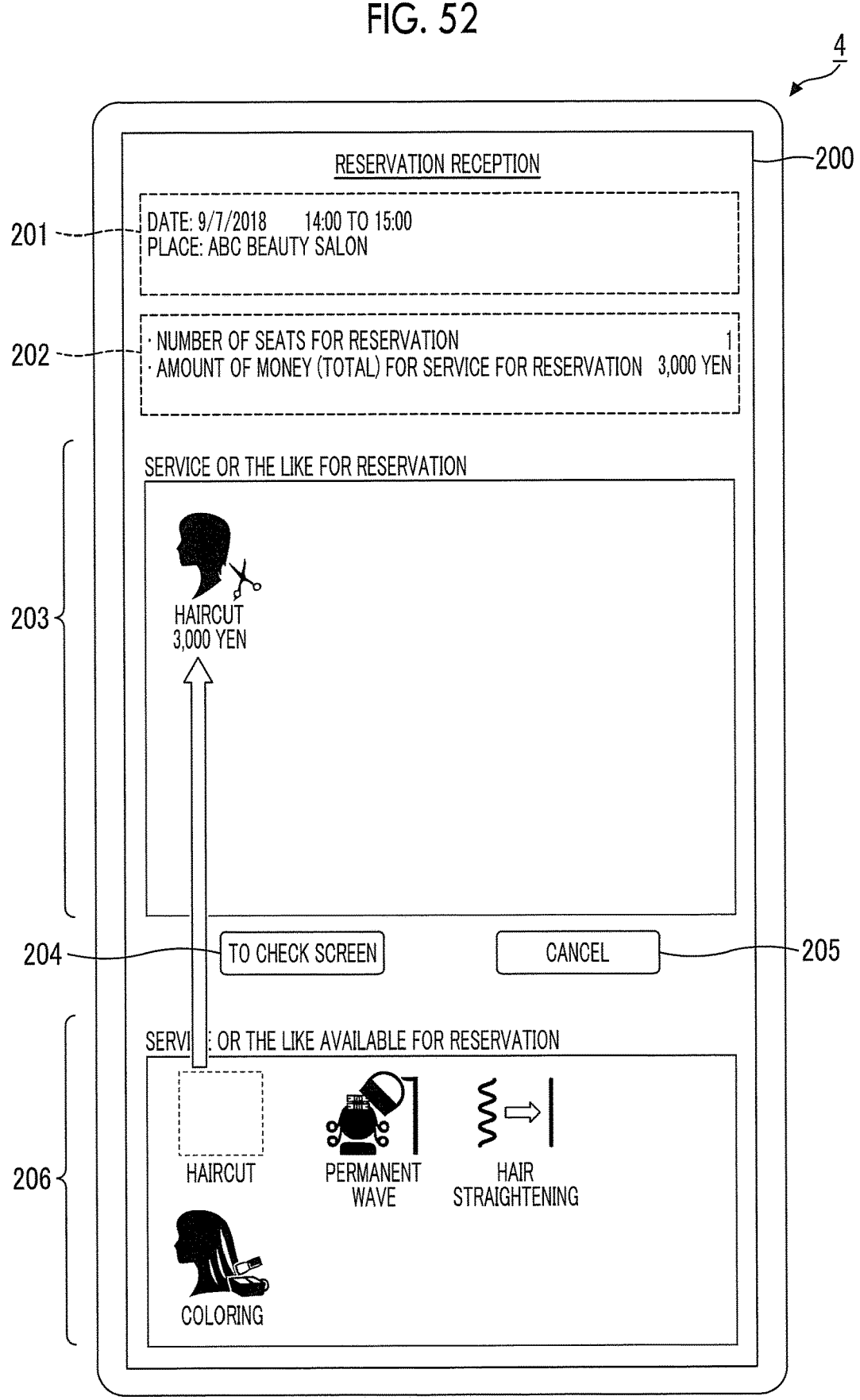
FIG. 52 is a diagram illustrating an example of the reservation reception screen displayed in a case where a mark displayed on the image of ABC beauty salon is tapped.

FIG. 52 is a diagram illustrating an example of the reservation reception screen 200 displayed in a case where the mark 411 (refer to FIG. 51) displayed on the image of the ABC beauty salon 401 (refer to FIG. 51) is tapped. In FIG. 52, parts corresponding to FIG. 5 are designated by corresponding reference signs.

However, in FIG. 52, the title of the input field 203 is changed to "service or the like for reservation", and the title of the display field 206 is changed to "service or the like available for reservation".

In FIG. 52, an icon of haircut is dragged into the input field 203 from the display field 206.

In FIG. 52, an icon of permanent wave, an icon of hair straightening, an icon of coloring are illustrated as an example of the service available for reservation.

In ABC beauty salon, a reservation fee for the seat is not collected. Thus, only the total amount of money for the reserved service is displayed in the display field 202 showing the cost of the reservation. In a case where the reservation fee for the seat is collected, an item of the reservation fee for the seat is added, and the total amount of money for the reservation fee for the seat and the reserved service is displayed.

Example 2 of Reception Screen

Figure 53:
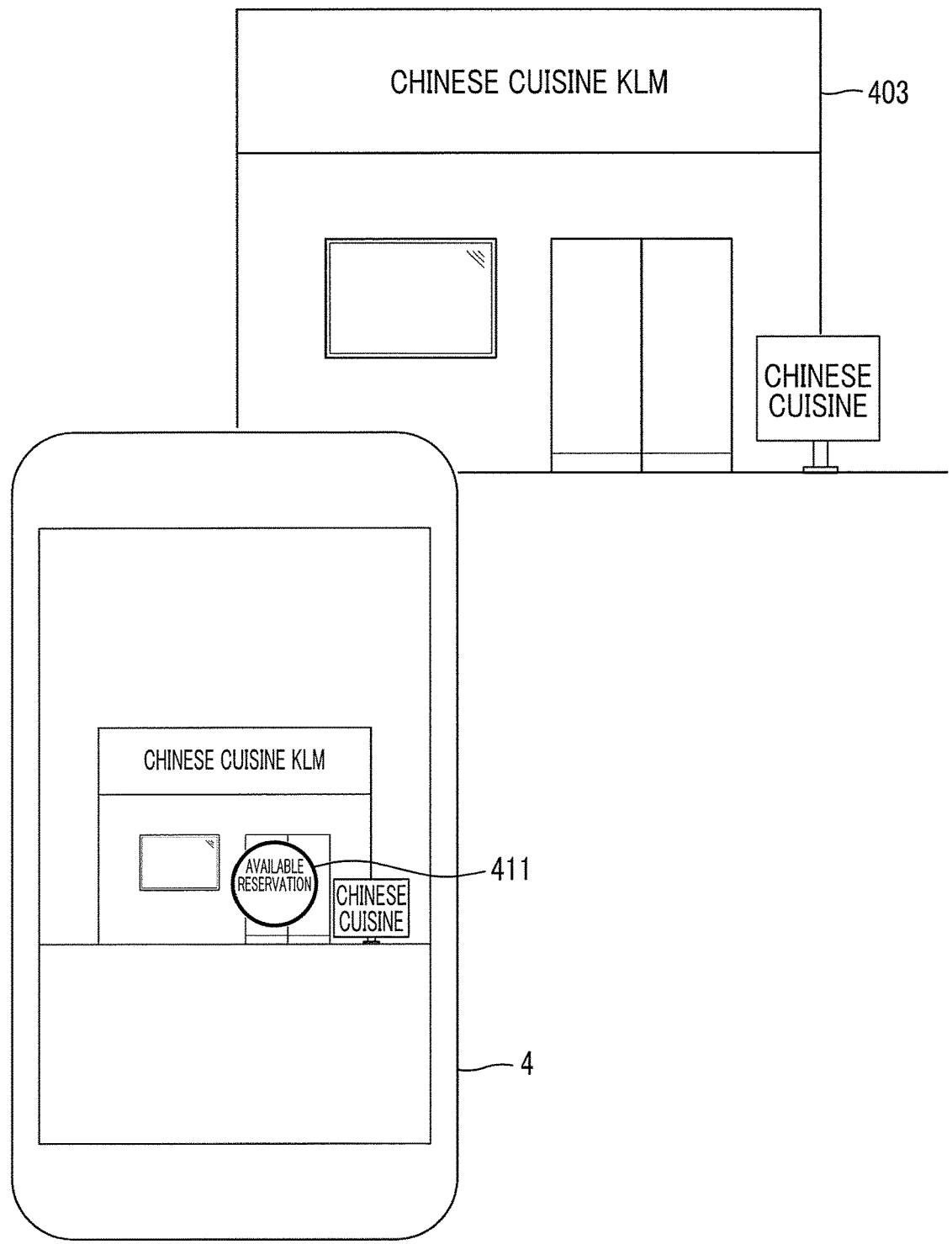
FIG. 53 is a diagram describing a relationship between a restaurant positioned on the street and a captured image of the restaurant.

FIG. 53 is a diagram describing a relationship between the restaurant 403 positioned on the street and a captured image of the restaurant 403.

In FIG. 53, the restaurant 403 is a Chinese restaurant. Accordingly, in FIG. 53, the mark 411 of "available reservation" not present in the real space is added to the image of the Chinese restaurant.

Figure 54:
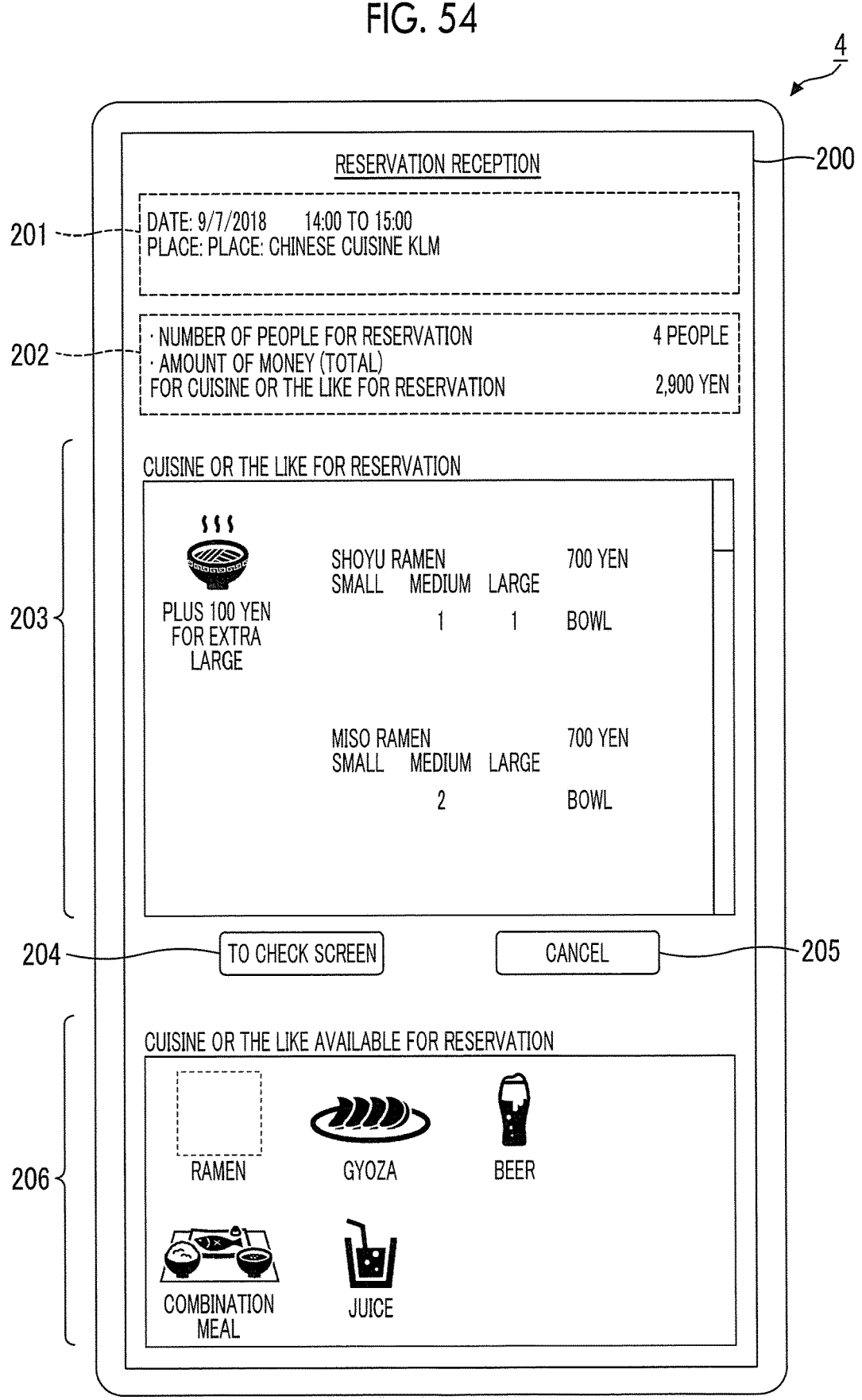
FIG. 54 is a diagram illustrating an example of the reservation reception screen displayed in a case where a mark displayed on the image of the Chinese restaurant is tapped.

FIG. 54 is a diagram illustrating an example of the reservation reception screen 200 displayed in a case where the mark 411 (FIG. 53) displayed on the image of the Chinese restaurant is tapped. In FIG. 54, parts corresponding to FIG. 5 are designated by corresponding reference signs.

However, in FIG. 54, the title of the input field 203 is changed to "cuisine or the like for reservation", and the title of the display field 206 is changed to "cuisine or the like available for reservation".

In FIG. 54, an icon of ramen is dragged into the input field 203 from the display field 206. Since there are various types of ramen, an input field for the number of orders for each type is displayed adjacent to the icon of ramen in FIG. 54. In the example in FIG. 54, the reservation is made for one bowl of medium size shoyu ramen, one bowl of large size shoyu ramen, and two bowls of medium size miso ramen.

In FIG. 54, an icon of gyoza, an icon of beer, an icon of set cuisine, and an icon of juice are illustrated as an example of the cuisine available for reservation. The icon of set cuisine is a collection of a plurality of single cuisines and is one type of package described in Example 11 of Exemplary Embodiment 1.

Even in FIG. 54, the reservation fee for the seat is not collected. Thus, only the total amount of money for the reserved service is displayed in the display field 202 showing the cost of the reservation. In a case where the reservation fee for the seat is collected, the item of the reservation fee for the seat is added, and the total amount of money for the reservation fee for the seat and the reserved cuisine is displayed.

In addition, while the reservation is made for the number of seats in FIG. 54, the reservation may also be made for a seat with a table in addition to the number of seats.

Example 3 of Reception Screen

Figure 55:
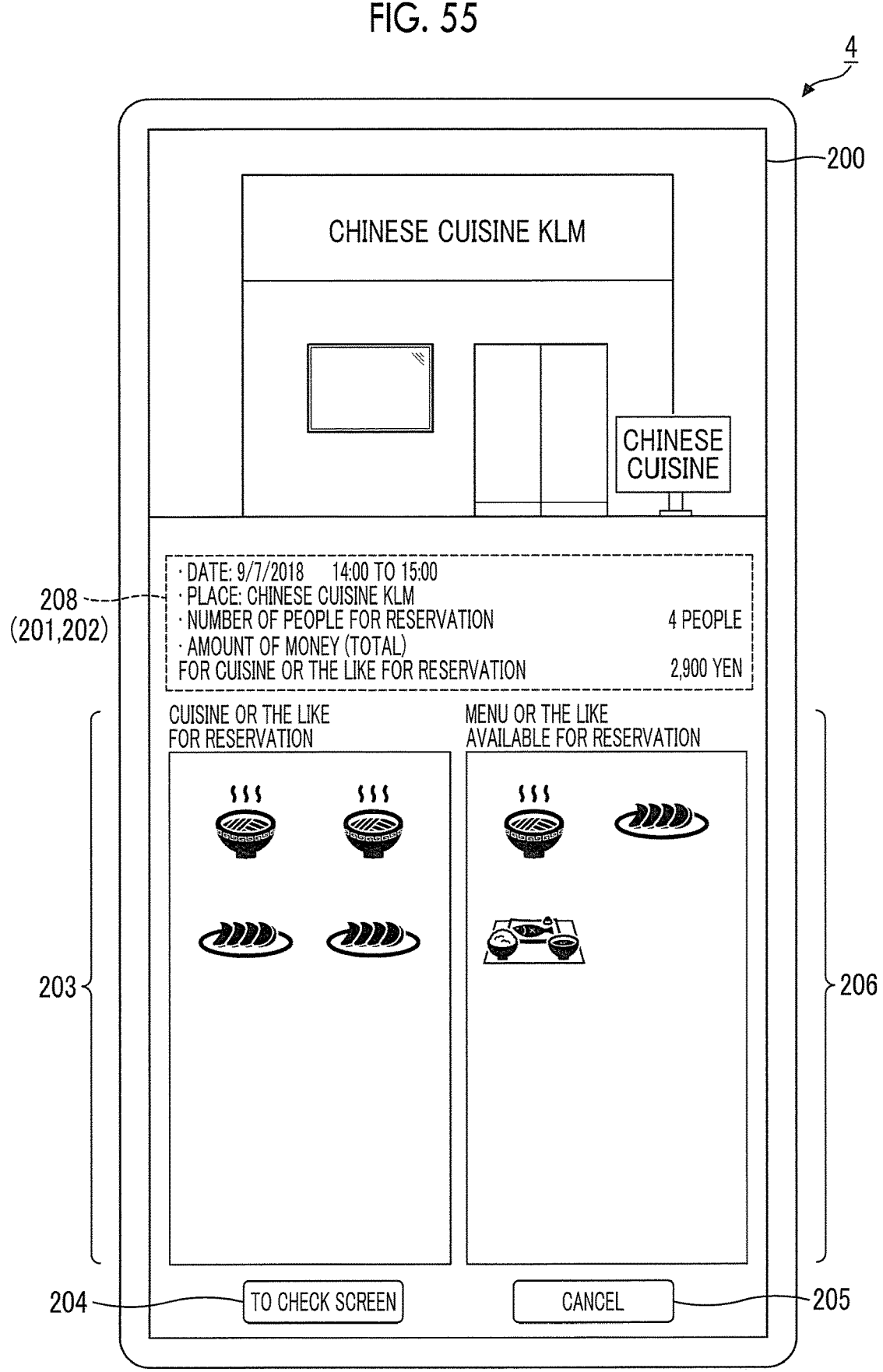
FIG. 55 is a diagram describing an example in which the reservation reception screen is displayed in overlay on the captured image.

FIG. 55 is a diagram describing an example in which the reservation reception screen 200 is displayed in overlay on the captured image. In FIG. 55, parts corresponding to FIG. 5 are designated by corresponding reference signs.

A display field 208 in which the display field 201 showing information related to the space 3 (refer to FIG. 1) as the reservation target is combined with the display field 202 showing the cost of the reservation is arranged in FIG. 55.

In the example in FIG. 55, each of the icon corresponding to ramen and the icon corresponding to gyoza is copied & pasted in the input field 203.

In addition, FIG. 55 is different from FIG. 54 such that icons are arranged only in number corresponding to the number of cuisines for reservation.

Example 4 of Reception Screen

Figure 56:
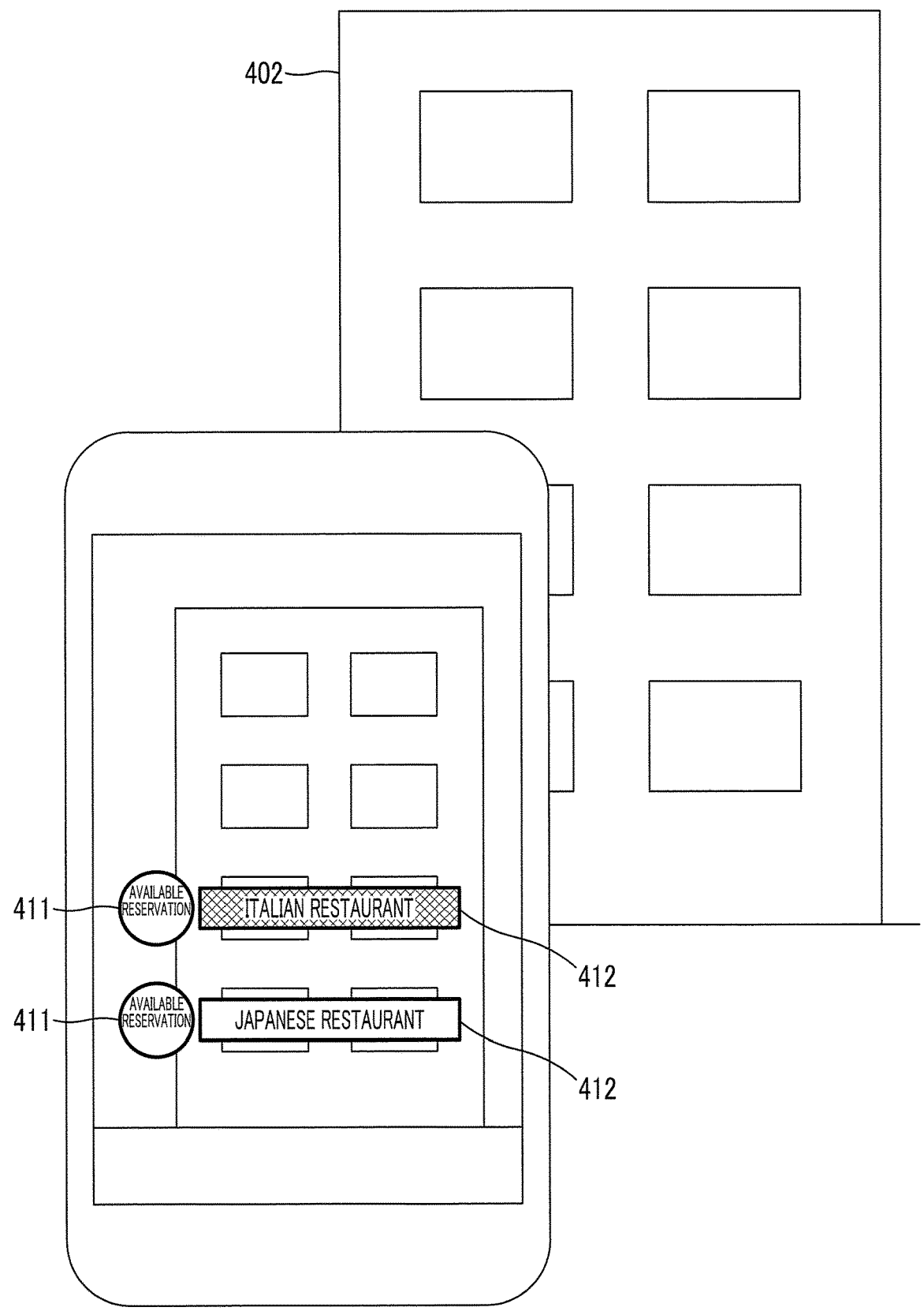
FIG. 56 is a diagram describing a relationship between a building positioned on the street and a captured image of the building.

FIG. 56 is a diagram describing a relationship between the building 402 positioned on the street and a captured image of the building 402.

In FIG. 56, a restaurant is specified as the display target. Thus, in FIG. 56, the mark 411 of "available reservation" not present in the real space is added to the first floor part and the second floor part of the image of the building.

In the example in FIG. 56, information 412 indicating the type of restaurant is also displayed. Italian restaurant is displayed on windows on the second floor, and Japanese restaurant is displayed on windows on the first floor. Even in FIG. 56, the reservation reception screen 200 (refer to FIG. 54 and FIG. 55) is displayed by tapping the mark 411 on the image.

In a case where a specific type of restaurant is specified as a display condition, the mark 411 of "available reservation" is added to only the specified type of restaurant among restaurants available for reservation.

Figure 57:
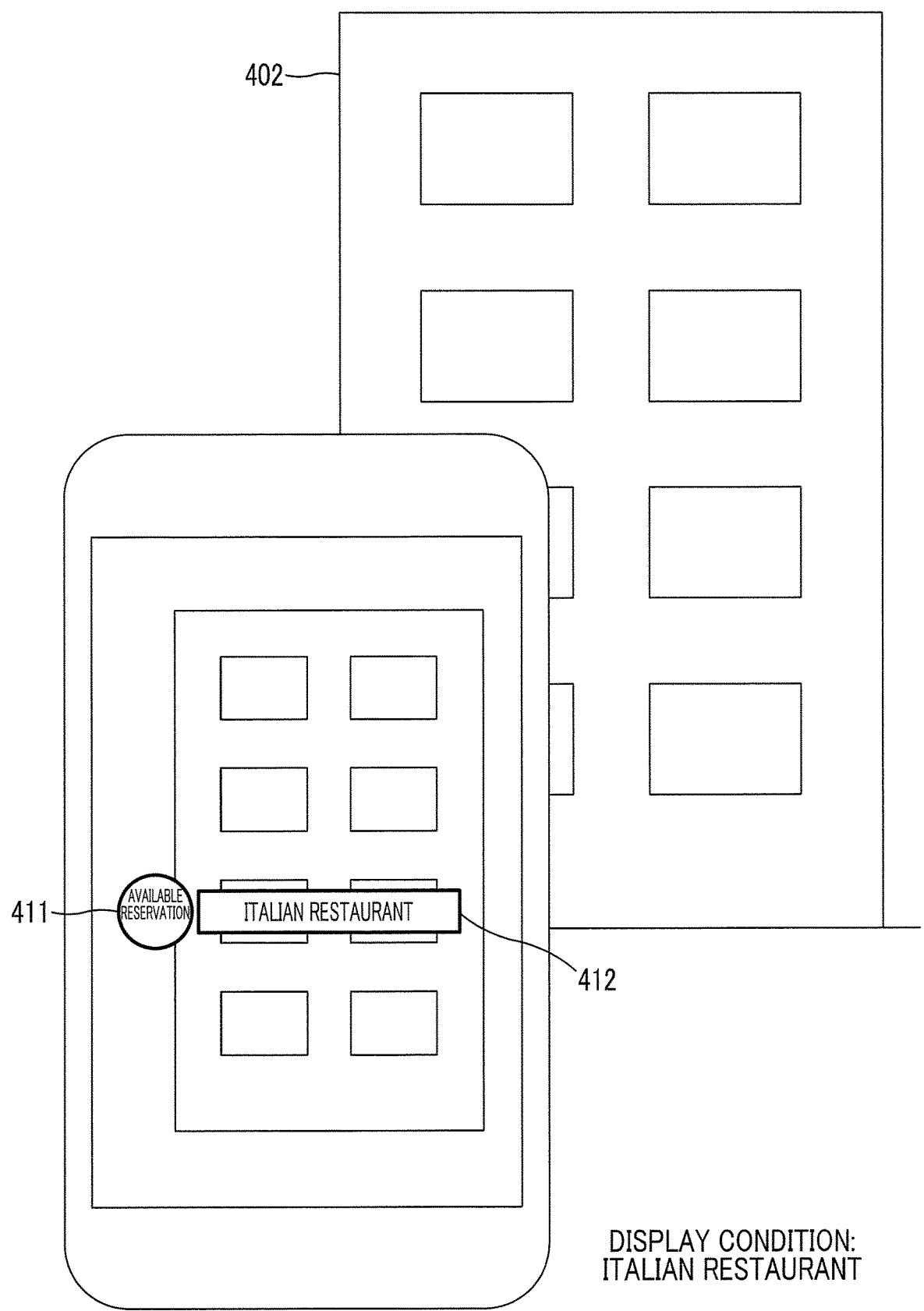
FIG. 57 is a diagram describing a relationship between the building and the captured image of the building in a case where Italian cuisine is specified as a condition for displaying information related to available reservation.

FIG. 57 is a diagram describing a relationship between the building 402 and the captured image of the building 402 in a case where Italian cuisine is specified as a condition for displaying information related to available reservation. In FIG. 57, parts corresponding to FIG. 56 are designated by corresponding reference signs.

In FIG. 57, the mark 411 of "available reservation" is displayed for only the Italian restaurant satisfying the condition specified by the user. Italian restaurant is displayed on the windows on the second floor, and the reservation target is clearly shown.

Example 5 of Reception Screen

Figure 58:
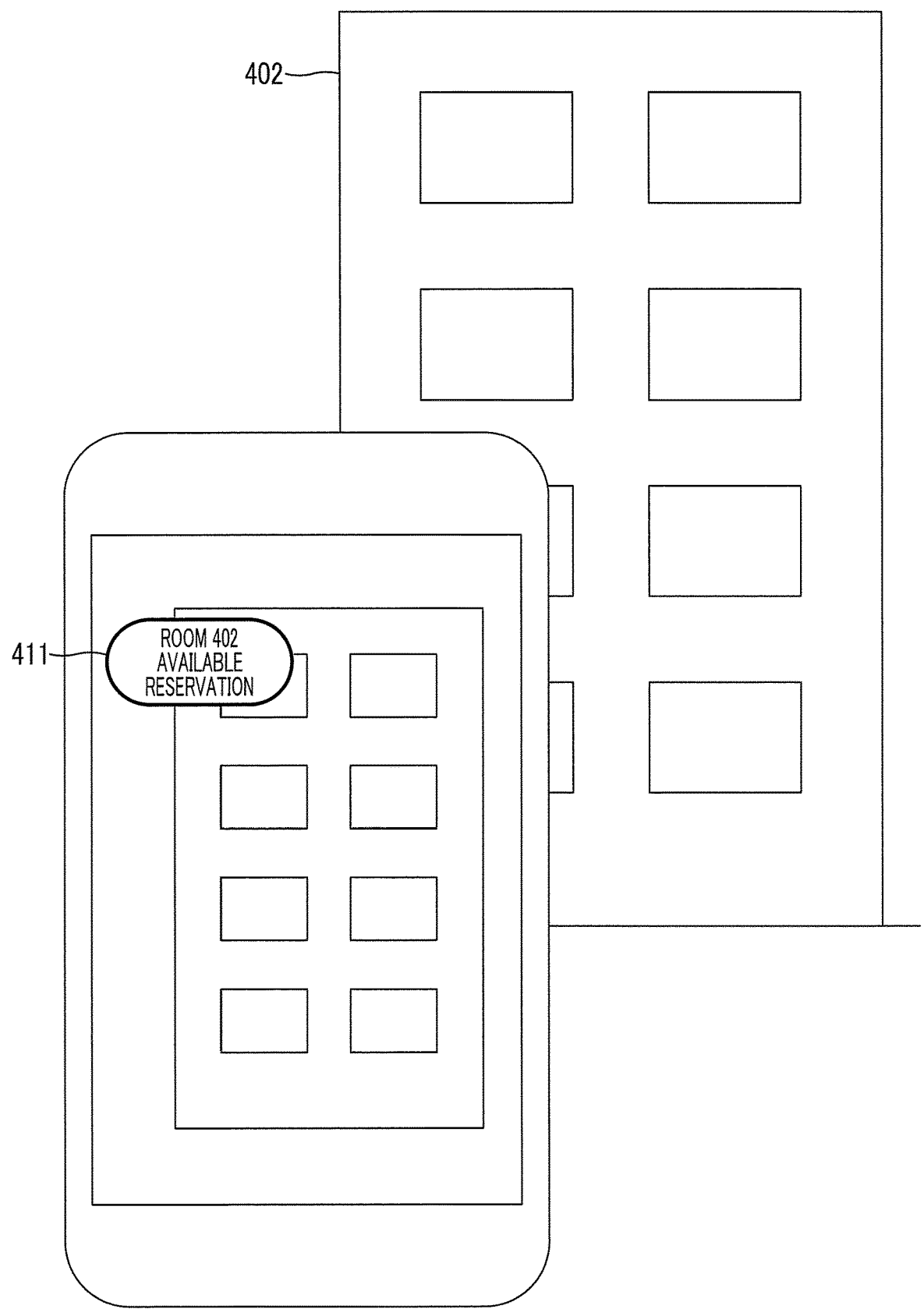
FIG. 58 is another diagram describing the relationship between the building positioned on the street and the captured image of the building.

FIG. 58 is another diagram describing the relationship between the building 402 positioned on the street and the captured image of the building 402. In FIG. 58, parts corresponding to FIG. 56 are designated by corresponding reference signs.

The example in FIG. 57 is a case where a rental is specified as the display target. Thus, in FIG. 58, the mark 411 of "room 402 available for reservation" not present in the real space is added to the fourth floor part of the image of the building 402 in which a vacant room available for reservation is present.

While the third floor part and the fourth floor part of the building 402 are used as the rented office 402C, information related to other rooms not available for reservation or not satisfying the reservation condition is not shown.

Other Exemplary Embodiments

While the exemplary embodiments of the present invention are described thus far, the technical scope of the present invention is not limited to the scope disclosed in the exemplary embodiments. It is apparent from the disclosure of the claims that the exemplary embodiments with various modifications or improvements carried out thereto also fall within the technical scope of the present invention.

For example, while the reservation reception screen in the exemplary embodiments is described on the premise that the user terminal 4 (refer to FIG. 1) is a smartphone, the reception screen may be displayed on the display screen of the desktop type computer or the notebook type computer. In this case, input can be provided using the mouse or the keyboard. For example, the candidates of the object or the service available for reservation may be displayed on the screen using a right click of the mouse.

While the icon is moved using the finger 210 (refer to FIG. 7) in any of the exemplary embodiments, an instruction to move the icon may be provided by voice.

While a case where the number of icons changes, a case where the color of the icon changes, and a case where the type of icon changes are described in the exemplary embodiments as an example in which the image corresponding to the input field 203 changes depending on the arrangement of icons, the shape or the dimension of the icon may be changed.

While an apparatus, an implement, a room, or the like as a rental target, a consumed cuisine, and a service of the beauty salon provided as a service are illustrated as the reservation target in the exemplary embodiments, the reservation target may include a purchased or sold object. Consumables include paper of the printer.

While the reservation reception screen is displayed in Exemplary Embodiment 2 by tapping the mark 411 (refer to FIG. 53) for available reservation displayed using augmented reality technology, the reservation reception screen may be displayed without any operation in a case where the reservation can be made. In addition, the image on which the mark 411 for available reservation is displayed in a superimposed manner using augmented reality technology is one example of the reception screen.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising: a display device, configured to display a reception screen including a first reservation screen, a second reservation screen, and a display field; and a processor, configured to: control a change of a display of the first reservation screen displaying a first reservation target and the second reservation screen displaying a second reservation target, such that the display of the first and second reservation screens are changed by moving at least one icon of a plurality of icons displayed in the display field, respectively, to the first and second reservation screens, wherein the plurality of icons comprises a first icon and a second icon, wherein the first and second reservation targets are associated with different spaces; display an authentication screen on the first reservation screen when the first icon representing a software that requires permission to use is being moved from the display field to the first reservation screen, and set communication for a web conference between the first and second reservation targets.

2. The information processing apparatus according to claim 1, wherein the processor receives an instruction to arrange the second icon in a place in the first reservation screen, wherein the second icon corresponds to an object.

3. The information processing apparatus according to claim 1, wherein the processor controls an arrangement of the second icon such that the second icon corresponding to an object is arranged in a manner specified in advance in the first reservation screen.

4. The information processing apparatus according to claim 1, wherein the second icon represents a service or an object or a collection of a plurality of services or objects for a reservation by a reservation holder.

5. The information processing apparatus according to claim 1, wherein the first icon representing the software is available for only an object on which the software is installed or an object on which the software is installable.

6. The information processing apparatus according to claim 1, wherein the second icon corresponds to an object or a service that can be rented, consumed, purchased, sold or provided.

7. The information processing apparatus according to claim 1,
wherein the change of the display of the first reservation screen is a change in number, color, shape, dimension, or type of the at least one icon.

8. The information processing apparatus according to claim 1, wherein the processor displays information indicating a cost of a reservation for a service or an object corresponding to the second icon in the reception screen.

9. The information processing apparatus according to claim 1,
wherein the processor displays information indicating a cost corresponding to each of the first and second reservation targets in the first and second reservation screens and also displays information indicating a total cost for a reservation of the first and second reservation targets in the first and second reservation screens.

10. The information processing apparatus according to claim 1, wherein, the processor further controls not to display the second icon corresponding to a service or an object not available for reservation in the first or second reservation screen when the second icon is being dragged from the display field to the first or second reservation screen, and in response to the second icon being dragged, display a description text indicating a reservation cannot be made for the second icon.

11. The information processing apparatus according to claim 1, the processor sets same environmental parameters for the first reservation target and the second reservation target.

12. A non-transitory computer readable medium storing a program causing a computer to execute: a function for displaying a reception screen including a first reservation screen, a second reservation screen, and a display field; a function for controlling a change of a display of the first reservation screen displaying a first reservation target and the second reservation screen displaying a second reservation target, such that the display of the first and second reservation screens are changed by moving at least one icon of a plurality of icons displayed in the display field, respectively, to the first and second reservation screens, wherein the first and second reservation targets are associated with different spaces, and the plurality of icons comprises a first icon; a function for displaying an authentication screen on the first reservation screen when the first icon representing a software that requires a permission to use is being moved from the display field to the first reservation screen; and a function for setting communication for a web conference between the first and second reservation targets.

* * * * *